(12) United States Patent
Bhagwatkar et al.

(10) Patent No.: US 9,919,723 B2
(45) Date of Patent: Mar. 20, 2018

(54) AERIAL CAMERA SYSTEM AND METHOD FOR DETERMINING SIZE PARAMETERS OF VEHICLE SYSTEMS

(71) Applicant: General Electric Company, Schenectady, NY (US)

(72) Inventors: Aadeesh Shivkant Bhagwatkar, Bangalore (IN); Sharon DSouza, Bangalore (IN); Krishna Chaitanya Narra, Bangalore (IN); Brad Thomas Costa, Melbourne, FL (US); Seneca Snyder, Melbourne, FL (US); Jerry Duncan, Melbourne, FL (US); Mark Bradshaw Kraeling, Melbourne, FL (US); Michael Scott Miner, Melbourne, FL (US); Shannon Joseph Clouse, Erie, PA (US); Anwarul Azam, Lawrence Park, PA (US); Matthew Lawrence Blair, Lawrence Park, PA (US); Nidhi Naithani, Bangalore (IN); Dattaraj Jagdish Rao, Banglaore (IN); Anju Bind, Banglaore (IN); Sreyashi Dey Chaki, Banglaore (IN); Scott Daniel Nelson, Melbourne, FL (US); Nikhil Uday Naphade, Maharashtra (IN); Wing Yeung Chung, Erie, PA (US); Daniel Malachi Ballesty, Wattsburg, PA (US); Glenn Robert Shaffer, Erie, PA (US); Jeffrey James Kisak, Erie, PA (US); Dale Martin DiDomenico, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 14/884,233

(22) Filed: Oct. 15, 2015

(65) Prior Publication Data

US 2016/0039436 A1  Feb. 11, 2016

Related U.S. Application Data

(60) Continuation-in-part of application No. 14/624,069, filed on Feb. 17, 2015, and a continuation-in-part of
(Continued)

(51) Int. Cl.
*B61L 23/00* (2006.01)
*G06K 9/00* (2006.01)
(Continued)

(52) U.S. Cl.
CPC ........... *B61L 23/00* (2013.01); *A63H 17/395* (2013.01); *A63H 19/24* (2013.01); *A63H 30/04* (2013.01);
(Continued)

(58) Field of Classification Search
CPC .. B61L 23/00; B61L 15/0027; B61L 15/0072; B61L 23/041; B61L 23/044;
(Continued)

(56) References Cited

U.S. PATENT DOCUMENTS 2,701,610 A  2/1955  Carlson
3,581,071 A  5/1971  Payseure
(Continued)

FOREIGN PATENT DOCUMENTS

CN  201325416 Y  10/2009
CN  201821456 U  5/2011
(Continued)

OTHER PUBLICATIONS

Ildar Urazghildiiev, Rolf Ragnarsson, Pierre Ridderström, Anders Rydberg, Eric Öjefors, Kjell Wallin, Per Enochsson, Magnus Ericson, and Göran Löfqvist, "Vehicle Classification Based on the Radar Measurement of Height Profiles", IEEE Transactions on Intelligent Transportation Systems, vol. 8, No. 2, Jun. 2007.*

(Continued)

Primary Examiner — Jamie Atala
Assistant Examiner — Ayman Abaza
(74) *Attorney, Agent, or Firm* — GE Global Patent Operation; John A. Kramer

(57) ABSTRACT

An aerial system and method use a distance sensor to measure spatial distances between the distance sensor and plural vehicles in a vehicle system formed from the vehicles operably coupled with each other during relative movement between the distance sensor and the vehicle system. The spatial distances measured by the distance sensor are used to determine a size parameter of the vehicle system based on the spatial distances that are measured.

21 Claims, 33 Drawing Sheets

Related U.S. Application Data application No. 14/541,370, filed on Nov. 14, 2014, and a continuation-in-part of application No. 14/217,672, filed on Mar. 18, 2014, and a continuation-in-part of application No. 14/253,294, filed on Apr. 15, 2014, and a continuation-in-part of application No. 14/457,353, filed on Aug. 12, 2014, and a continuation-in-part of application No. 14/479,847, filed on Sep. 8, 2014, now abandoned, and a continuation-in-part of application No. 14/485,398, filed on Sep. 12, 2014, now abandoned, and a continuation-in-part of application No. 13/109,209, filed on May 17, 2011, now Pat. No. 8,913,131, which is a division of application No. 11/146,831, filed on Jun. 6, 2005, now Pat. No. 7,965,312, and a continuation-in-part of application No. 10/361,968, filed on Feb. 10, 2003, now abandoned.

(60) Provisional application No. 61/940,813, filed on Feb. 17, 2014, provisional application No. 61/940,660, filed on Feb. 17, 2014, provisional application No. 61/940,610, filed on Feb. 17, 2014, provisional application No. 60/626,573, filed on Nov. 10, 2004, provisional application No. 60/385,645, filed on Jun. 4, 2002, provisional application No. 61/940,696, filed on Feb. 17, 2014.

(51) Int. Cl.

| | | |
|---|---|---|
| *B64D 47/08* | (2006.01) | |
| *B61K 9/00* | (2006.01) | |
| *B64C 39/02* | (2006.01) | |
| *H04N 7/18* | (2006.01) | |
| *B61L 15/00* | (2006.01) | |
| *B61L 27/00* | (2006.01) | |
| *A63H 30/04* | (2006.01) | |
| *A63H 17/395* | (2006.01) | |
| *A63H 19/24* | (2006.01) | |
| *B61L 23/04* | (2006.01) | |

(52) U.S. Cl.
CPC ............ *B61K 9/00* (2013.01); *B61L 15/0027* (2013.01); *B61L 15/0072* (2013.01); *B61L 23/041* (2013.01); *B61L 23/044* (2013.01); *B61L 23/045* (2013.01); *B61L 23/047* (2013.01); *B61L 23/048* (2013.01); *B61L 27/0088* (2013.01); *B64C 39/024* (2013.01); *B64D 47/08* (2013.01); *G06K 9/00651* (2013.01); *G06K 9/00771* (2013.01); *H04N 7/185* (2013.01); *B61L 23/04* (2013.01); *B64C 2201/123* (2013.01); *B64C 2201/208* (2013.01)

(58) Field of Classification Search
CPC .... B61L 23/045; B61L 23/047; B61L 23/048; B61L 27/0088; B61L 23/04; A63H 17/395; A63H 19/24; A63H 30/04; B61K 9/00; B64C 39/024; B64C 2201/123; B64C 2201/208; B64D 47/08; G06K 9/00651; G06K 9/00771; H04N 7/185
USPC ........................................................ 348/148
See application file for complete search history.

(56) References Cited

U.S. PATENT DOCUMENTS

| | | |
|---|---|---|
| 3,641,338 A | 2/1972 | Peel |
| 5,337,289 A | 8/1994 | Fasching |
| 5,379,224 A | 1/1995 | Brown et al. |
| RE35,590 E | 8/1997 | Bezos et al. |
| 5,735,492 A | 4/1998 | Pace |
| 5,786,750 A | 7/1998 | Cooper |
| 5,867,717 A | 2/1999 | Milhaupt et al. |
| 5,893,043 A | 4/1999 | Moehlenbrink et al. |
| 5,954,299 A | 9/1999 | Pace |
| 5,961,571 A | 10/1999 | Gorr et al. |
| 6,067,031 A * | 5/2000 | Janky .................. G08G 1/166 |
| | | 180/169 |
| 6,081,769 A | 6/2000 | Curtis |
| 6,150,930 A | 11/2000 | Cooper |
| 6,259,375 B1 | 7/2001 | Andras |
| 6,263,266 B1 | 7/2001 | Hawthorne |
| 6,384,742 B1 | 5/2002 | Harrison |
| 6,453,223 B1 | 9/2002 | Kelly et al. |
| 6,487,500 B2 | 11/2002 | Lemelson et al. |
| 6,519,512 B1 | 2/2003 | Haas et al. |
| 6,631,322 B1 | 10/2003 | Arthur et al. |
| 6,712,312 B1 | 3/2004 | Kucik |
| 6,831,573 B2 | 12/2004 | Jones |
| 7,039,367 B1 | 5/2006 | Kucik |
| 7,348,895 B2 | 3/2008 | Lagassey |
| 7,403,296 B2 | 7/2008 | Farritor et al. |
| 7,527,495 B2 | 5/2009 | Yam et al. |
| 7,545,322 B2 | 6/2009 | Newberg et al. |
| 7,707,944 B2 | 5/2010 | Bounds |
| 7,772,539 B2 | 8/2010 | Kumar |
| 7,826,969 B2 | 11/2010 | Hein et al. |
| 7,908,114 B2 | 3/2011 | Ruggiero |
| 8,355,834 B2 | 1/2013 | Duggan et al. |
| 8,576,069 B2 | 11/2013 | Nadeem et al. |
| 2001/0050324 A1 | 12/2001 | Greene, Jr. |
| 2002/0003510 A1 | 1/2002 | Shigetomi |
| 2002/0031050 A1 | 3/2002 | Blevins |
| 2002/0037104 A1 | 3/2002 | Myers et al. |
| 2002/0135471 A1 | 9/2002 | Corbitt et al. |
| 2004/0064241 A1 | 4/2004 | Sekiguchi |
| 2004/0093196 A1 | 5/2004 | Hawthorne et al. |
| 2004/0182970 A1 | 9/2004 | Mollet et al. |
| 2004/0263624 A1 | 12/2004 | Nejikovsky et al. |
| 2005/0012745 A1 | 1/2005 | Kondo et al. |
| 2005/0110628 A1 | 5/2005 | Kernwein et al. |
| 2005/0125113 A1 | 6/2005 | Wheeler et al. |
| 2005/0284987 A1 | 12/2005 | Kande et al. |
| 2006/0244830 A1 | 11/2006 | Davenport et al. |
| 2007/0013497 A1* | 1/2007 | Watanabe .............. B60Q 9/008 |
| | | 340/435 |
| 2007/0085703 A1 | 4/2007 | Clark et al. |
| 2007/0129858 A1* | 6/2007 | Herzog .................. E01B 27/02 |
| | | 701/19 |
| 2007/0170315 A1 | 7/2007 | Manor et al. |
| 2007/0200027 A1 | 8/2007 | Johnson |
| 2007/0216771 A1 | 9/2007 | Kumar |
| 2008/0169939 A1 | 7/2008 | Dickens et al. |
| 2008/0304065 A1 | 12/2008 | Hesser et al. |
| 2009/0020012 A1 | 1/2009 | Holten et al. |
| 2009/0021423 A1* | 1/2009 | Cheng .................. G01S 7/003 |
| | | 342/25 A |

(56) References Cited

U.S. PATENT DOCUMENTS

| | | |
|---|---|---|
| 2009/0037039 A1 | 2/2009 | Yu et al. |
| 2009/0189981 A1 | 7/2009 | Siann et al. |
| 2009/0314883 A1 | 12/2009 | Arlton et al. |
| 2010/0039514 A1 | 2/2010 | Brand |
| 2010/0073480 A1 | 3/2010 | Hoek et al. |
| 2011/0115913 A1 | 5/2011 | Lang et al. |
| 2011/0285842 A1 | 11/2011 | Davenport et al. |
| 2012/0263342 A1 | 10/2012 | Haas et al. |
| 2012/0274772 A1 | 11/2012 | Fosburgh et al. |
| 2012/0303237 A1* | 11/2012 | Kumar .................... B61L 3/006 701/93 |
| 2013/0233964 A1 | 9/2013 | Woodworth et al. |
| 2013/0286204 A1 | 10/2013 | Cheng |
| 2014/0036063 A1 | 2/2014 | Kim et al. |
| 2014/0067167 A1 | 3/2014 | Levien et al. |
| 2014/0266882 A1 | 9/2014 | Metzger |

FOREIGN PATENT DOCUMENTS

| | | |
|---|---|---|
| DE | 19529986 A1 | 2/1997 |
| DE | 102005029956 A1 | 2/2006 |
| EP | 0093322 A2 | 11/1983 |
| EP | 0117763 A2 | 9/1984 |
| EP | 0605848 A1 | 7/1994 |
| EP | 0761522 A1 | 3/1997 |
| EP | 0893322 A1 | 1/1999 |
| GB | 2384379 A | 7/2003 |
| GB | 2403861 A | 1/2005 |
| KR | 20130119633 A | 11/2013 |
| KR | 20140017735 A | 2/2014 |
| WO | 02058984 A1 | 8/2002 |
| WO | 2007096273 A1 | 8/2007 |
| WO | 2012150591 A2 | 11/2012 |

OTHER PUBLICATIONS

Nicholls et al., "Applying Visual Processing to GPS Mapping of Trackside Structures," Proc. 9th British Machine Vision Conference, Southampton, pp. 841-851, 1998.

Saab A Map Matching Approach for Train Positioning Part I: Development and Analysis, IEEE Transactions on Vehicular Technology, vol. No. 49, Issue No. 2, pp. 467-475, Mar. 2000.

Hirokawa et al., "Threading the Maze," GPS World, pp. 20-26, Nov. 2004.

PCT Search Report and Written Opinion issued in connection with related PCT Application No. PCT/US2007/068780 dated Jan. 2, 2008.

PCT Search Report and Written Opinion issued in connection with related PCT Application No. PCT/US2008/061478 dated Jul. 24, 2008.

Rahmani et al., "A Novel Network Design for Future IP-Based Driver Assistance Camera Systems", Networking, Sensing and Control, 2009. ICNSC '09. International Conference on, IEEE Xplore, pp. 457-462, Mar. 2009.

European Office Action issued in connection with related EP Application No. 07783663.3 dated Jun. 10, 2009.

Unofficial English Translation of Chinese Office Action issued in connection with related CN Application No. 200780024969.0 dated Jul. 26, 2010.

Masuko et al., "Autonomous Takeoff and Landing of an Unmanned Aerial Vehicle", System Integration (SII), 2010 IEEE/SICE International Symposium on, pp. 248-253, Dec. 21-22, 2010.

U.S. Non-Final Office Action issued in connection with related U.S. Appl. No. 11/479,559 dated Feb. 3, 2011.

U.S. Non-Final Office Action issued in connection with related U.S. Appl. No. 11/750,681 dated May 18, 2011.

U.S. Final Office Action issued in connection with related U.S. Appl. No. 11/479,559 dated Aug. 16, 2011.

Guofang et al., "Research on Real-Time Location-Tracking of Underground Mine Locomotive Based on Wireless Mobile Video", Mechatronic Science, Electric Engineering and Computer (MEC), 2011 International Conference on, IEEE Xplore, pp. 625-627, Aug. 19-22, 2011.

U.S. Final Office Action issued in connection with related U.S. Appl. No. 11/750,681 dated Oct. 14, 2011.

U.S. Non-Final Office Action issued in connection with related U.S. Appl. No. 13/194,517 dated Dec. 19, 2012.

U.S. Final Office Action issued in connection with related U.S. Appl. No. 13/194,517 dated Jul. 15, 2013.

PCT Search Report and Written Opinion issued in connection with related PCT Application No. PCT/US2015/013720 dated Apr. 28, 2015.

PCT Search Report and Written Opinion issued in connection with related PCT Application No. PCT/US2015/013735 dated May 1, 2015.

European Search Report and Opinion issued in connection with related EP Application No. 15184083.2 dated Jun. 16, 2016.

Nidhi Naithani et al., Mar. 18, 2014, U.S. Appl. No. 14/217,672.

Mark Bradshaw Kraeling et al., Nov. 14, 2014, U.S. Appl. No. 14/541,370.

Brad Thomas Costa et al., Feb. 17, 2015, U.S. Appl. No. 14/624,069.

Nidhi Naithani et al., Sep. 8, 2014, U.S. Appl. No. 14/479,847.

Mark Bradshaw Kraeling et al., Sep. 12, 2014, U.S. Appl. No. 14/485,398.

Mark Bradshaw Kraeling et al., Feb. 17, 2014, U.S. Appl. No. 61/940,610.

Mark Bradshaw Kraeling et al., Aug. 12, 2014, U.S. Appl. No. 14/457,353.

Nidhi Naithani et al., Apr. 15, 2014, U.S. Appl. No. 14/253,294.

Jeffrey James Kisak et al., Feb. 10, 2003, U.S. Appl. No. 10/361,968.

David M. Davenport et al., Jun. 30, 2006, U.S. Appl. No. 11/479,559.

Ajith Kuttannair Kumar, May 18, 2007, U.S. Appl. No. 11/750,681.

* cited by examiner

LEGEND
102 = CAMERA UNIT
174 = AERIAL DEVICE
176 = CAMERA DOCK
178 = VEHICLE DOCK
180 = CONNECTOR
1100 = CAMERA SYSTEM

LEGEND
902 = ROUTE
1701 = IMAGE DATA
1702 = PIXELS
1704 = RAILS

LEGEND
902 = ROUTE
1700 = IMAGE DATA
1704 = RAILS
1801 = GAUGE DISTANCE

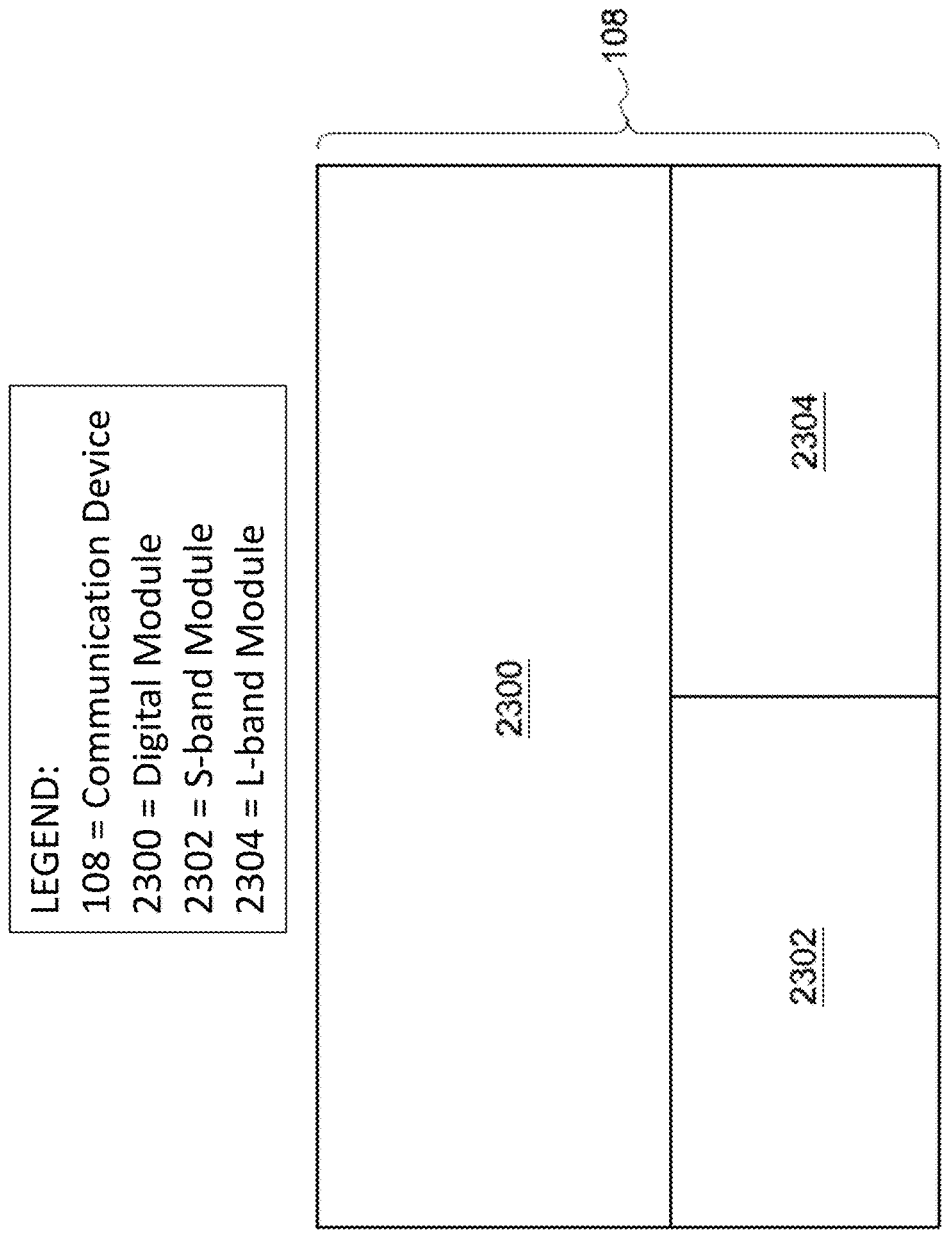

US 9,919,723 B2

AERIAL CAMERA SYSTEM AND METHOD FOR DETERMINING SIZE PARAMETERS OF VEHICLE SYSTEMS

CROSS-REFERENCE TO RELATED APPLICATIONS

This application is a continuation-in-part of U.S. patent application Ser. No. 14/624,069, which was filed on 17 Feb. 2015 (the "'069 Application").

The '069 Application claims priority to U.S. Provisional Application Nos. 61/940,813; 61/940,660; 61/940,610; and 61/940,696, all of which were filed on 17 Feb. 2014, and the entire disclosures of which are incorporated herein by reference. The '069 Application also is a continuation-in-part of U.S. patent application Ser. No. 14/541,370, which was filed on 14 Nov. 2014 (the "'370 Application"), and which claims priority to U.S. Provisional Application No. 61/940,813 filed on 17 Feb. 2014.

The '370 Application is a continuation-in-part of each of: U.S. patent application Ser. No. 14/217,672, which was filed on 14 Mar. 2014 (the "'672 Application"); U.S. patent application Ser. No. 14/253,294, which was filed on 15 Apr. 2014 (the "'294 Application"); U.S. patent application Ser. No. 14/457,353, which was filed on 12 Aug. 2014 (the "'353 Application"); U.S. patent application Ser. No. 14/479,847, which was filed on 8 Sep. 2014 (the "'847 Application"); U.S. patent application Ser. No. 14/485,398 (the "'398 Application"), which was filed on 12 Sep. 2014; and U.S. patent application Ser. No. 13/109,209, which was filed on 17 May 2011 (the "'209 Application") and is now U.S. Pat. No. 8,913,131 issued 16 Dec. 2014.

The '209 Application is a divisional application of U.S. patent application Ser. No. 11/146,831, which was filed on 6 Jun. 2005 (the "'831 Application") and is now U.S. Pat. No. 7,965,312 (issued 21 Jun. 2011), which claims priority to U.S. Provisional Application No. 60/626,573, which was filed on 10 Nov. 2004 (the "'573 Application").

The '831 Application also is a continuation-in-part of U.S. patent application Ser. No. 10/361,968, which was filed on 10 Feb. 2003 (the "'968 Application"), and which claims priority to U.S. Provisional Application No. 60/385,645, which was filed on 4 Jun. 2002 (the "'645 Application").

The entire disclosures of these applications (e.g., the '069 Application, the '370 Application, the '672 Application, the '294 Application, the '353 Application, the '847 Application, the '398 Application, the '209 Application, the '831 Application, the '573 Application, the '968 Application, and the '645 Application) are incorporated herein by reference.

FIELD

Embodiments of the subject matter disclosed herein relate to obtaining and communicating image and/or video data using one or more aerial devices. The data may be associated with equipment of a transportation network, such as by representing the health or condition of a route over which a vehicle is moving. Optionally, the data may be used to determine size parameters of vehicle systems formed from one or more vehicles.

BACKGROUND

Equipment may be sometimes outfitted with camera units for capturing and storing video data of the environment around a vehicle. For example, law enforcement vehicles may be provided with "dashboard cams" to record a view out the front windshield of the vehicle, to capture video data of interactions between a law enforcement officer and (for example) the occupants of another vehicle. As another example, passenger automobiles may be provided with fixed-position rear view cameras for capturing a video stream of the region directly behind the automobile, which is displayed on a console display screen to aid the driver in safely backing up.

In addition to in-vehicle cameras, transportation networks (referring to infrastructure for movement of vehicles, e.g., railroad track networks for rail vehicles, or highway and other road networks for automobiles, semi-trailer trucks, and other on-highway vehicles) are sometimes outfitted with wayside cameras for capturing video data of the transportation network. For example, a camera may be affixed to a mast at the side of a highway, to capture video data of the highway for traffic tracking and reporting purposes.

For both in-vehicle and wayside camera systems, it is typically the case that the camera systems are fixed in place, to capture video data only of a designated field of view, e.g., to the front or rear of a vehicle, or a designated segment of road. For vehicles, this is because the camera systems are designated for capturing video data that may be safety critical (rear view) or important from a public-policy standpoint (law enforcement dashboard cams). For wayside camera systems, this is because the designated field of view must be constantly monitored (e.g., view of a tollgate), or to keep data consistent (e.g., roadway monitoring over time).

BRIEF DESCRIPTION

In one embodiment, a system (e.g., an aerial system) includes a distance sensor and a controller. The distance sensor is configured to measure spatial distances between the distance sensor and plural vehicles in a vehicle system formed from the vehicles operably coupled with each other during relative movement between the distance sensor and the vehicle system. The controller is configured to obtain the spatial distances measured by the distance sensor and determine a size parameter of the vehicle system based on the spatial distances that are measured.

In another embodiment, a system (e.g., an aerial optics system) includes an optical sensor and a controller. The optical sensor is configured to generate optic data representative of plural vehicles in a vehicle system formed from the vehicles operably coupled with each other. The controller is configured to obtain the optic data generated by the optic sensor and determine a size parameter of the vehicle system based on the optic data.

In another embodiment, a system (e.g., an electromagnetic system) includes an electromagnetic sensor and a controller. The electromagnetic sensor is configured to interrogate one or more electromagnetic tags coupled with a vehicle system formed from plural vehicles in order to determine a number of the vehicles in the vehicle system. The controller is configured to determine a size parameter of the vehicle system based on the number of the vehicles.

In another embodiment, a system (e.g., a location determining system) includes a global positioning system receiver and a controller. The global positioning system receiver is configured to determine a moving speed of a vehicle system formed from plural vehicles traveling together along a route and plural different locations of the vehicle system at different times. The controller is configured to determine a size parameter of the vehicle system based on the moving speed of the vehicle system and the different locations of the vehicle system.

In another embodiment, a method (e.g., for determining a size parameter of a vehicle system) includes measuring spatial distances between a distance sensor and plural vehicles in a vehicle system formed from the vehicles operably coupled with each other during relative movement between the distance sensor and the vehicle system. The spatial distances are measured using the distance sensor. The method also includes determining a size parameter of the vehicle system based on the spatial distances that are measured.

In another embodiment, another method (e.g., for determining a size parameter of a vehicle system) includes electromagnetically interrogating one or more electromagnetic tags coupled with a vehicle system formed from plural vehicles in order to determine a number of the vehicles in the vehicle system and determining a size parameter of the vehicle system based on the number of the vehicles.

In another embodiment, another method (e.g., for determining a size parameter of a vehicle system) includes determining a moving speed of a vehicle system formed from plural vehicles traveling together along a route, determining plural different locations of the vehicle system at different times during movement of the vehicle system, and determining a size parameter of the vehicle system based on the moving speed of the vehicle system and the different locations of the vehicle system.

In another embodiment, a system (e.g., an aerial camera system) includes a first aerial device, a first camera unit, and one or more image analysis processors. The first aerial device is configured to be disposed onboard a non-aerial vehicle as the non-aerial vehicle moves along a route. The first aerial device also can be configured to fly above the route during movement of the vehicle along the route. The first camera unit is configured to be disposed onboard the first aerial device and to generate first image data during flight of the first aerial device. The one or more image analysis processors are configured to examine the first image data and to identify a hazard disposed ahead of the non-aerial vehicle along a direction of travel of the non-aerial vehicle based on the first image data.

In another embodiment, a method (e.g., a method for identifying route-related hazards) includes generating first image data from a first camera unit disposed onboard a first aerial device that is configured to land on a non-aerial vehicle during movement of the non-aerial vehicle along a route. The first image data can be generated during flight of the first aerial device above the route being traveled by the non-aerial vehicle. The method also can include examining (using one or more image analysis processors) the first image data to identify a hazard disposed ahead of the non-aerial vehicle along a direction of travel of the non-aerial vehicle based on the first image data.

In another embodiment, another system (e.g., another camera system) includes a first aerial device configured to land and dock to a non-aerial vehicle as the non-aerial vehicle moves along a route. The first aerial device also can be configured to fly off of the non-aerial vehicle and fly ahead of the non-aerial vehicle along a direction of travel of the non-aerial vehicle along the route. The system also can include a first camera unit configured to be disposed onboard the first aerial device and to generate first image data representative of a portion of the route ahead of the non-aerial vehicle during movement of the non-aerial vehicle along the route. The system also can include a second aerial device configured to land and dock to the non-aerial vehicle as the non-aerial vehicle moves along a route. The second aerial device also can be configured to fly off of the non-aerial vehicle and fly ahead of the non-aerial vehicle along the direction of travel of the non-aerial vehicle along the route. A second camera unit configured to be disposed onboard the second aerial device and to generate second image data representative of the portion of the route ahead of the non-aerial vehicle during movement of the non-aerial vehicle along the route also can be included in the system. The system can include one or more image analysis processors configured to be disposed onboard the non-aerial vehicle and to receive the first image data and the second image data. The one or more image analysis processors can be configured to identify a hazard along the route ahead of the non-aerial vehicle.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments described herein relate to video units for capturing and communicating video data in a transportation system or network. For example, the camera may be connected or otherwise disposed onboard an aerial device (e.g., a drone, helicopter, or airplane) to allow the camera unit to fly The aerial device can fly above the route ahead of a non-aerial vehicle and communicate image data back to the non-aerial vehicle. The non-aerial vehicle includes a vehicle that is restricted to propelling itself along non-airborne routes, such as rail vehicles, other off-highway vehicles (e.g., mining vehicles or other ground-based vehicles that are not designed and/or not legally permitted to travel on public roadways), marine vessels, automobiles, or the like. This image data can include still images (e.g., snapshots), videos (e.g., data that shows movement), or a combination thereof. The image data can provide an operator of the non-aerial vehicle a view of the route well in advance of the arrival of the non-aerial vehicle. For very high speed non-aerial vehicles, the stopping distance may be beyond the visibility provided from the vantage of the non-aerial vehicle. The view from the aerial device, then, may extend or supplement that visible range. In addition, the camera itself may be repositionable and may have the ability to pan left, right, up and down, as well as the ability to zoom in and out.

As used herein, a camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

Figure 1:
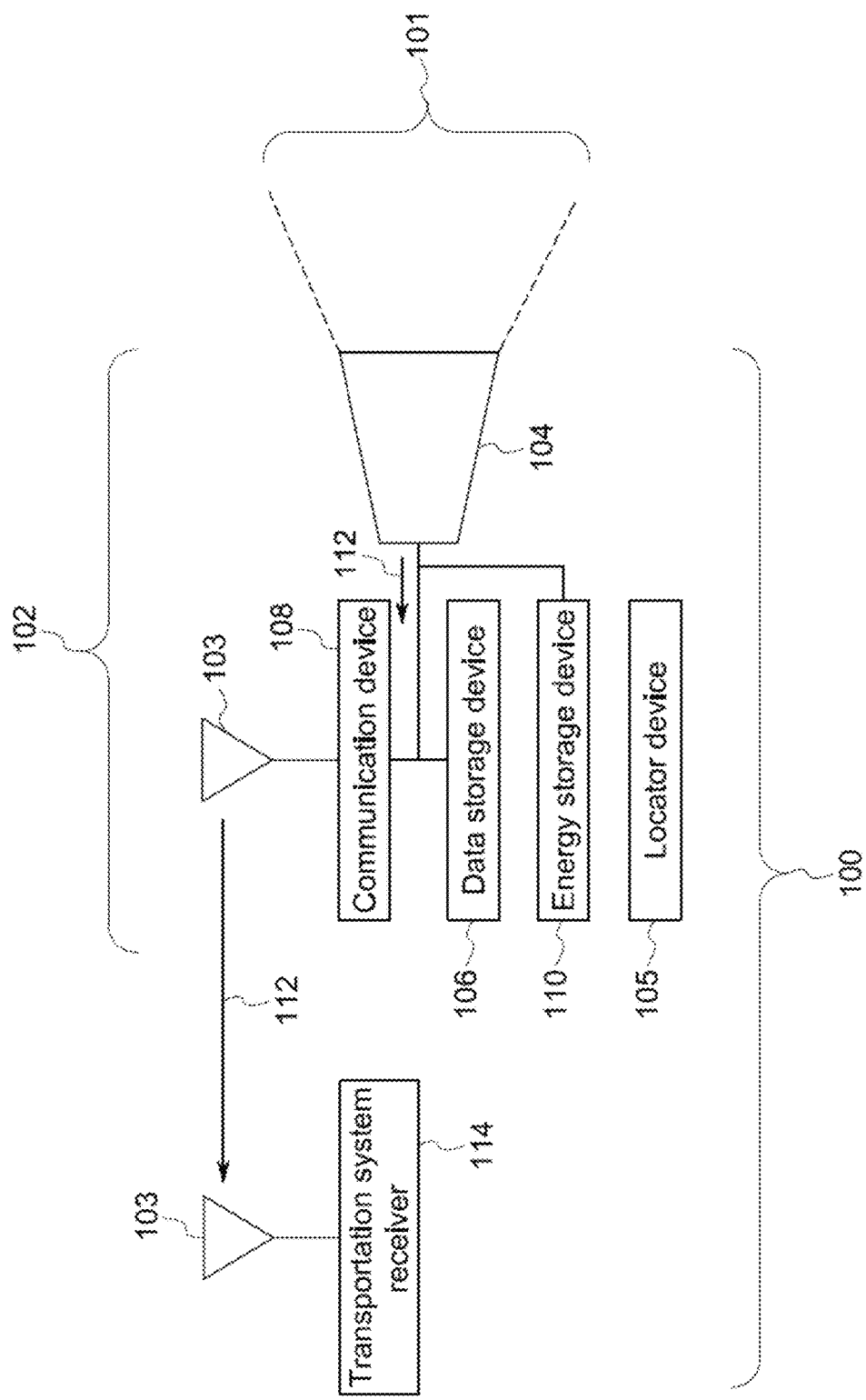
FIG. 1 illustrates a camera system for capturing and communicating transportation data related to vehicles or otherwise to a transportation system according to one embodiment.

FIG. 1 illustrates a camera system 100 for capturing and communicating transportation data related to vehicles or otherwise to a transportation system according to one embodiment. The system includes a portable camera unit 102 having a camera 104, a data storage device 106 and/or a communication device 108, and a battery or other energy storage device 110. The camera unit may be portable in that the camera unit is small and/or light enough to be carried by a single adult human. The camera unit is configured to capture and/or generate image data 112 of a field of view 101 of the camera unit. For example, the field of view may represent the solid angle through which the camera unit is sensitive to light, electromagnetic radiation, or other energy that is used to form images, videos, or the like. The image data can include still images, videos (e.g., moving images or a series of images representative of a moving object), or the like, of one or more objects within the field of view of the camera unit. In any of the embodiments of any of the camera systems described herein, data other than image data may be captured and communicated, e.g., the portable camera unit may have a microphone for capturing audio data, a vibration sensor for capturing vibration data, and so on.

A suitable portable camera unit may be an Internet protocol camera unit, such as a camera that can send video data via the Internet or another network. In one aspect, the camera can be a digital camera capable of obtaining relatively high quality image data (e.g., static or still images and/or videos). For example, the camera may be Internet protocol (IP) cameras that generate packetized image data. The camera can be a high definition (HD) camera capable of obtaining image data at relatively high resolutions. For example, the camera may obtain image data having at least 480 horizontal scan lines, at least 576 horizontal scan lines, at least 720 horizontal scan lines, at least 1080 horizontal scan lines, or an even greater resolution. Alternatively, the camera may be another type of camera.

The data storage device may be electrically connected to the camera unit and configured to store the image data. The data storage device may include one or more computer hard disk drives, removable drives, magnetic drives, read only memories, random access memories, flash drives or other solid state storage devices, or the like. Optionally, the data storage device may be disposed remote from the camera unit, such as by being separated from the camera unit by at least several centimeters, meters, kilometers, as determined at least in part by the application at hand.

The communication device may be electrically connected to the camera unit and configured to wirelessly communicate (e.g., transmit, broadcast, or the like) the image data to a transportation system receiver 114 located off-board the camera unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 103, that include and/or are connected with one or more processors (e.g., microprocessors, controllers, or the like). In one embodiment, the antenna 103 includes a vertical dipole antenna operating at gain or focus of 4 dBi (or another value).

In one aspect, the communication device includes a low cost, light weight, low power and/or long range L/S band transceiver. FIG. 23 (including sub-figures/sub-parts FIG. 23A, FIG. 23B, FIG. 23C, FIG. 23D, and FIG. 23E) illustrates a block diagram of one embodiment of the communication device 108 shown in FIG. 1. The embodiment of the communication device shown in FIG. 23 is but one example of a communication device that can be used in connection with one or more embodiments described herein. Optionally, the communication device shown in FIG. 23 may be included in the receiver 114. The block diagram shown in FIG. 23 includes a digital module or section 2300, an S-band module or section 2302, and an L-band module or section 2304. The digital section 2300 can process baseband video and/or serial data for both the communication device 108 and the receiver 114, or alternatively, for just one of the communication device 108 and receiver 114. The receiver 114 may process data inversely to the communication device 108 (e.g., with inverse function and/or order), but the processing performed by the communication device 108 and/or receiver 114 may otherwise be the same or similar.

The processing functions performed by the communication device 108 and/or receiver 114 can include, but are not limited to, serial interface buffering, digital data interleaving, encryption and/or decryption (e.g., using the Advanced Encryption Standard, or AES), forward error correction/restoration, framing and synchronization, digital interface encoding/decoding, video compression, or the like. The digital section 2300 can support a serial I/O interface. One or more communication processors 2306 (e.g., a field programmable gate array or other device) of the digital module 2300 can provide an adaptive transmit power feature of the communication device shown in FIG. 23. This feature can include receiving an indication of a signal level from a receiver (e.g., the antenna 103) and encoding a back channel command to the digital module 2300, using a dedicated control word in the up-linked serial data line, to command the antenna 103 that is transmitting a data signal to adjust the power level at which the data signal is being wirelessly communicated according to the signal level from the receiver (e.g., the received signal strength).

The digital module 2300 may default to a designated upper limit on transmitted power levels in the event that an uplink signal is not received, which could occur prior to synchronizing the receiver 114 and the communication device 108. The digital module 2300 may include one or more video inputs (e.g., analog National Television System Committee video inputs) while the S-band and L-band modules 2302, 2304 may include another type of output device, such as a Universal Serial Bus (USB) connection. Plural interface chips (e.g., processors) can be provided to support digitizing and converting video at the front end of the processor 2306. If video compression is used, decompression may not be used for the modules 2302, 2304. An external computing device 2308, such as a laptop computer, desktop computer, or the like, may be connected with the digital module 2300 to perform video de-compression. The digital module 2300 can interface with one or more of the modules 2302, 2304 using a common (e.g., the same) interface (e.g., a 70 MHz digital I/F) to either an L band or an S band transceiver module.

The communication device 108 shown in FIG. 23 can communicate video or image data using single frequency radio operation in the L band or S band by communicating the data using the corresponding module 2304, 2302. The digital module 2300 can use a software-based switch to select the operating band to be used (e.g., the L band or the S band). This software-based switch may be included in one or more sets of instructions for the processor 2306, and may be stored in the data storage device 106 or in another location. The communication device 108 may use 100 MHz of continuous band spectrum space supporting four sub channels (e.g., 25 MHz each channel) for the communication of image data.

The communicating range of the communication device 108 may be relatively large, such as up to 5 km, up to 10 km, or another distance. The communication device 108 can adapt the power at which signals are wirelessly communicated to the receiver 114. The resolution of the video and/or images communicated by the communication device 108 may be on the order of 15 frames per second (or another rate) and/or 320×240 resolution (or another resolution). Multiple serial full duplex channels of the communication device 108 can communicate or process the data at a rate up to 19,200 bits per second (bps), up to 57,000 bps, or another rate.

As described herein, the communication device 108 can be disposed onboard an aerial device. Due to the relatively small size of one or more of the aerial devices described herein, the size and/or weight of the communication device 108 may be relatively small and/or light. For example, the outer dimensions of the communication device 108 may be up to 1.5 inches by 1.5 inches by 0.25 inches, or one or more other dimensions. The total weight of the communication device may be up to 20 grams or another weight. In order to conserve power, the communication device 108 may consume electric power at less than 10 watts or another limit. The communication device can use time division multiplexing (TDM) to encode and wirelessly communicate the image data described herein. Alternatively, another encoding technique may be used.

The energy storage device may be electrically connected to the camera unit, the data storage device, and/or the communication device. The energy storage device can represent one or more devices that store and/or generate electric current to power the camera unit, the data storage device, and/or the communication device. For example, the energy storage device can include one or more batteries, pantographs (e.g., that receive current from an off-board source via a catenary or overhead line), conductive shoes (e.g., that contact a conductive body, such as an electrified rail, to receive current from an off-board source), generators, alternators, or the like.

In one embodiment, the camera unit comprises the camera, the data storage device, and the energy storage device, but not the communication device. In such an embodiment, the camera unit may be used for storing captured image data for later retrieval and use. In another embodiment, the camera unit comprises the camera, the communication device, and the energy storage device, but not the data storage device. In such an embodiment, the portable camera unit may be used to communicate the image data to a vehicle or other location for immediate use (e.g., being displayed on a display screen), and/or for storage remote from the portable camera unit (this is, for storage not within the portable camera unit). In another embodiment, the camera unit comprises the camera, the communication device, the data storage device, and the energy storage device. In such an embodiment, the portable camera unit may have multiple modes of operation, such as a first mode of operation where image data is stored within the portable camera unit on the data storage device 106, and a second mode of operation where the image data is transmitted off the portable camera unit for remote storage and/or immediate use elsewhere.

The camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device configured for portable energy storage for use in an electronic device. Another suitable energy storage device, albeit more of an energy provider than storage, include a piezoelectric vibration harvester and a solar panel, where energy is generated and then provided to the camera system.

The camera unit can include a locator device 105 that generates data used to determine the location of the camera unit. The locator device 105 can represent one or more hardware circuits or circuitry that include and/or are connected with one or more processors (e.g., controllers, microprocessors, or other electronic logic-based devices). In one example, the locator device 105 represents a global positioning system (GPS) receiver that determines a location of the camera unit, a beacon or other communication device that broadcasts or transmits a signal that is received by another component (e.g., the transportation system receiver) to determine how far the camera unit is from the component that receives the signal (e.g., the receiver), a radio frequency identification (RFID) tag or reader that emits and/or receives electromagnetic radiation to determine how far the camera unit is from another RFID reader or tag (e.g., the receiver), or the like. The receiver can receive signals from the locator device 105 to determine the location of the locator device 105 relative to the receiver and/or another location (e.g., relative to a vehicle or vehicle system). Additionally or alternatively, the locator device 105 can receive signals from the receiver (e.g., which may include a transceiver capable of transmitting and/or broadcasting signals) to determine the location of the locator device 105 relative to the receiver and/or another location (e.g., relative to a vehicle or vehicle system).

The image data may be autonomously examined by one or more image data analysis systems or image analysis systems described herein. For example, one or more of the transportation receiver system 114, a vehicle, and/or the camera unit may include an image data analysis system (also referred to as an image analysis system) that examines the image data for one or more purposes described herein.

Figure 2:
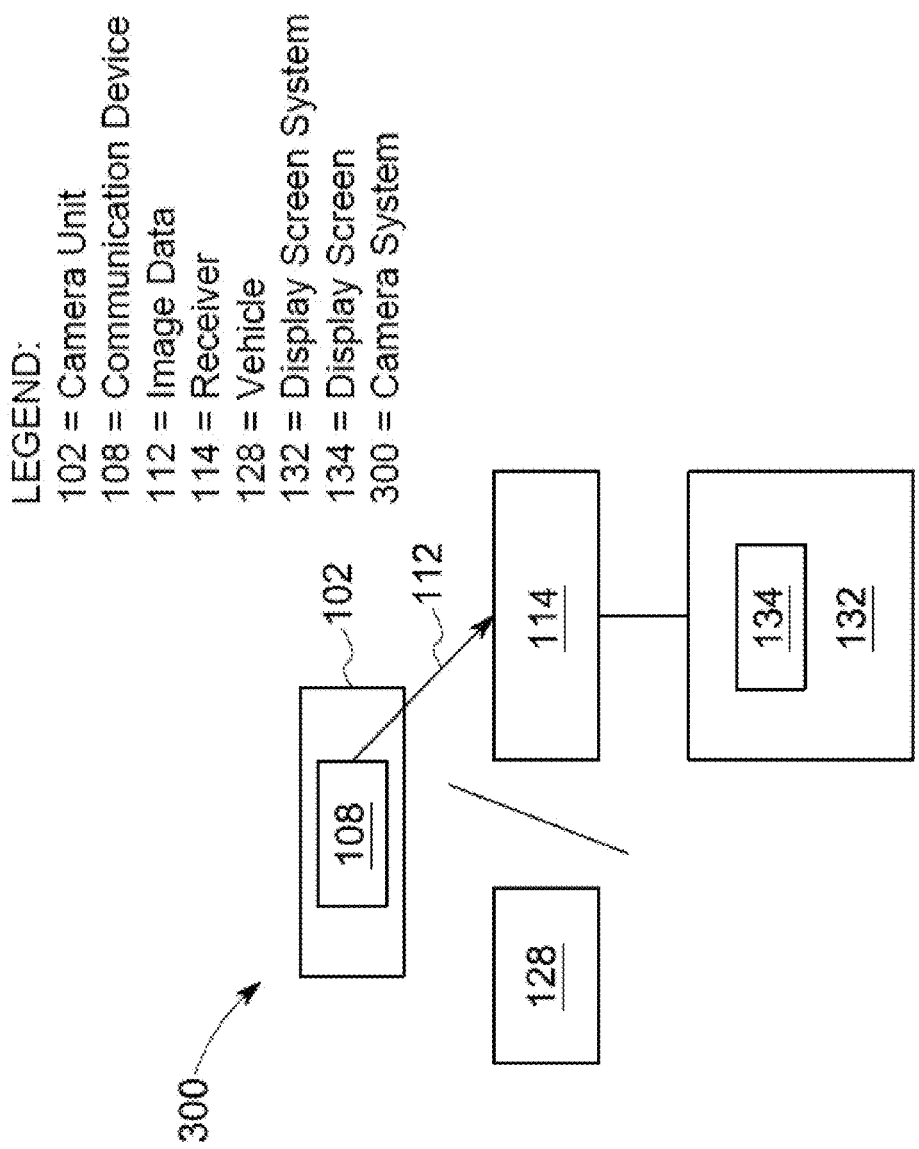
FIG. 2 illustrates another embodiment of a camera system.

FIG. 2 illustrates another embodiment of a camera system 300. The system can include a display screen system 132 located remote from the portable camera unit and/or the non-aerial vehicle. Optionally, the display screen system 132 is at least partially disposed onboard the non-aerial vehicle. The display screen system receives the image data from the transportation system receiver as a live feed and display the image data (e.g., converted back into moving images) on a display screen 134 of the display screen system. The live feed can include image data representative of objects contemporaneous with capturing the video data but for communication lags associated with communicating the image data from the portable camera unit to the display screen system. Such an embodiment may be used, for example, for communicating image data, captured by the portable camera unit disposed onboard an aerial device flying ahead of the non-aerial vehicle to a remote human operator viewing the display screen. The remote human operator, for example, may be onboard the non-aerial vehicle that is moving behind the aerial device, an expert in the particular task or tasks, or another person, that can examine the image data and/or provide advice or instructions to the on-scene human operator based on the image data.

In another embodiment, the system has the display screen disposed onboard the non-aerial vehicle, such as in an operator cab of the non-aerial vehicle. The communication device of the portable camera unit can wirelessly transmit the image data to the transportation system receiver which may be located onboard the non-aerial vehicle and operably connected to the display screen, for the image data to be displayed on the display screen. Such an embodiment may be used for one operator of the non-aerial vehicle to view the image data captured by an aerial device flying ahead of the non-aerial vehicle.

Figure 3:
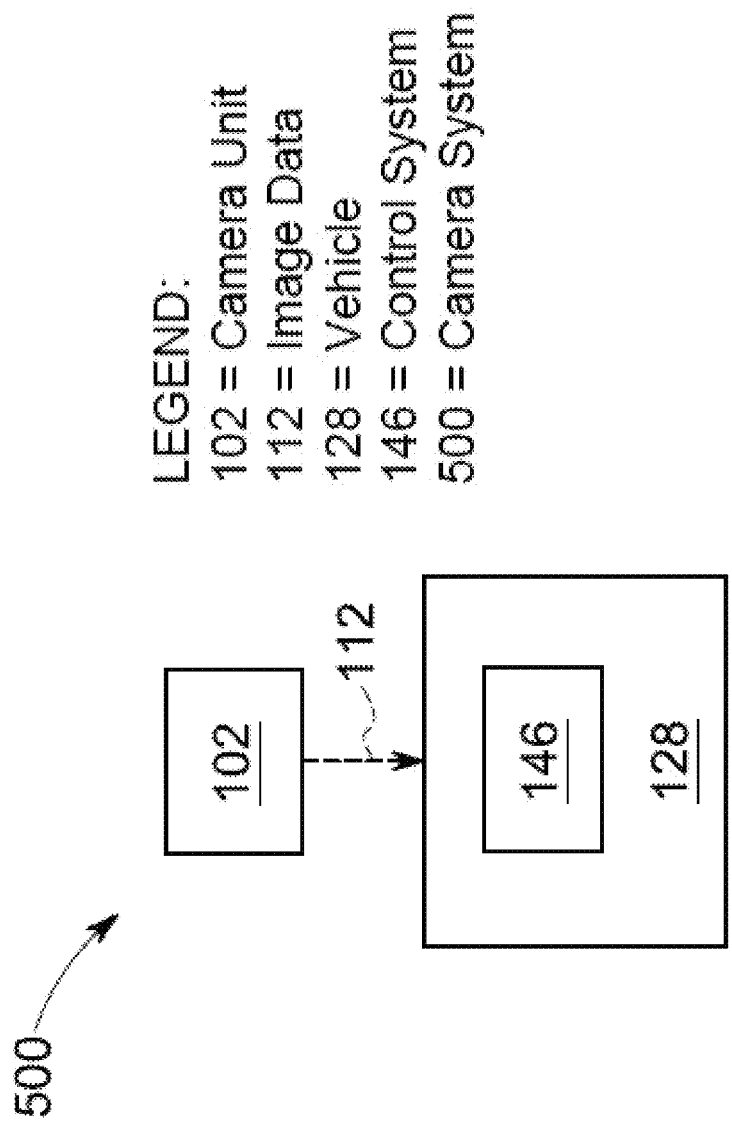
FIG. 3 illustrates another embodiment of a camera system.

FIG. 3 illustrates another embodiment of a camera system 500. A control system 146 onboard the vehicle may be provided for controlling movement of the non-aerial vehicle. The control system can include or represent the control unit, and can include hardware circuits or circuitry that include and/or are connected with one or more processors (e.g., microprocessors, controllers, or the like). The control system can control operations of the non-aerial vehicle, such as by communicating command signals to a propulsion system of the vehicle (e.g., motors, engines, brakes, or the like) for controlling output of the propulsion system.

The control system can prevent movement of the non-aerial vehicle responsive to a first data content of the image data and allow movement of the non-aerial vehicle responsive to a different, second data content of the image data. For example, the control system onboard the non-aerial vehicle may engage brakes and/or prevent motors from moving the non-aerial vehicle to prevent movement of the non-aerial vehicle responsive to the first data content of the image data indicating the image data from the portable camera unit (e.g., onboard an aerial device flying ahead of the non-aerial vehicle) indicating that one or more segments of the route ahead of the non-aerial vehicle along a direction of travel are damaged, obstructed by one or more obstacles, occupied by one or more other vehicles, or otherwise unsafe to travel over.

Figure 4:
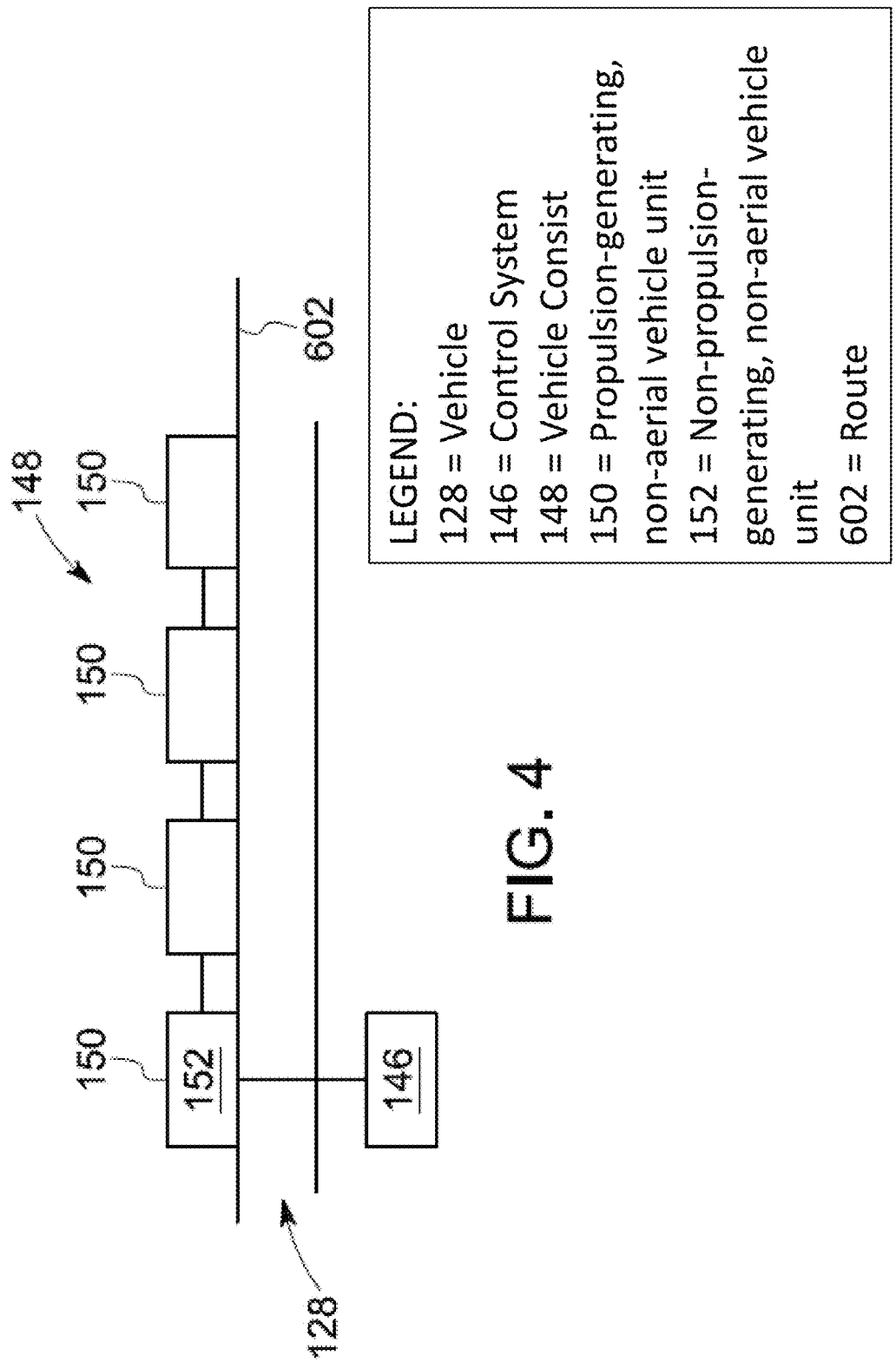
FIG. 4 illustrates one embodiment of a non-aerial vehicle.

FIG. 4 illustrates one embodiment of the non-aerial vehicle. The non-aerial vehicle can include one or more vehicle consists 148 having plural interconnected non-aerial vehicle units 150, with at least one of the plural vehicle units being a propulsion-generating, non-aerial vehicle unit 152. The non-aerial vehicle can represent a rail vehicle system, such as a train, with the vehicle units 150, 152 representing locomotives, rail cars, or other types of rail vehicles. For example, the vehicle unit 150 can represent a propulsion-generating vehicle unit, while the vehicle units 152 represent non-propulsion-generating vehicle units, such as rail cars.

Alternatively, the non-aerial vehicle can represent another type of vehicle, such as an automobile, marine vessel, mining vehicle, other off-highway vehicle (e.g., a vehicle that is not designed for and/or legally permitted to travel on public roadways), or the like. The consist can represent plural vehicle units mechanically connected to travel together along a land or water route 602, such as a track, road, waterway, or the like. Alternatively, the consist and/or vehicle can include plural vehicle units that communicate with each other to travel together along the route 602, but that are not connected with each other. For example, the vehicle unit may send command signals to the vehicle units to instruct the vehicle units how to move along the route 602 to maintain separation distances between the vehicle units.

The control system onboard the vehicle can be configured to prevent movement of the vehicle consist responsive to the first data content of the image data indicating that one or more segments of the route ahead of the vehicle are damaged or otherwise unsafe for continued travel. For example, responsive to the image data indicating that an upcoming segment of the route is being worked on, is occupied by another vehicle, is impassible due to an obstacle on the route (e.g., an automobile stuck on the track at a crossing), is damaged (e.g., has a broken rail), has a broken switch, or the like, the control system may implement one or more remedial actions. These actions can include, but are not limited to, generating a warning (e.g., visual, audible, or a combination thereof) to an operator of the non-aerial vehicle, automatically slowing or stopping movement of the non-aerial vehicle, communicating a request to an off-board location (e.g., dispatch center, maintenance facility, etc.) for repair, maintenance, and/or inspection of the upcoming segment of the route, change a scheduled trip or route of the vehicle to avoid the upcoming segment, or the like.

Figure 5:
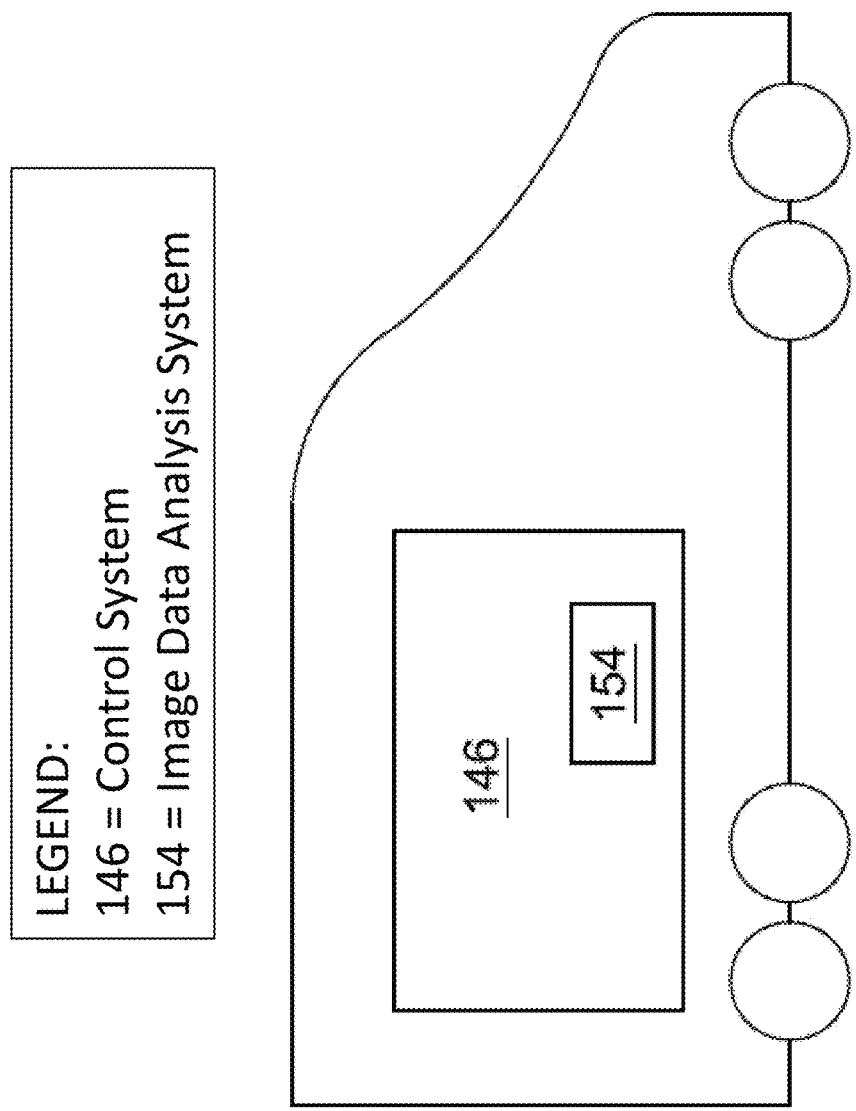
FIG. 5 illustrates a control system according to one embodiment.

FIG. 5 illustrates the control system according to one embodiment. The control system can be disposed onboard the non-aerial vehicle and also can include an image data analysis system 154. The analysis system can automatically process the image data for identifying data content in the image data. The control system can be configured to automatically prevent and allow movement of the vehicle responsive to the first data and the second data, respectively, that is identified by the image data analysis system. The image data analysis system can include one or more image analysis processors that autonomously examine the image data obtained by the camera unit for one or more purposes, as described herein.

Figure 6:
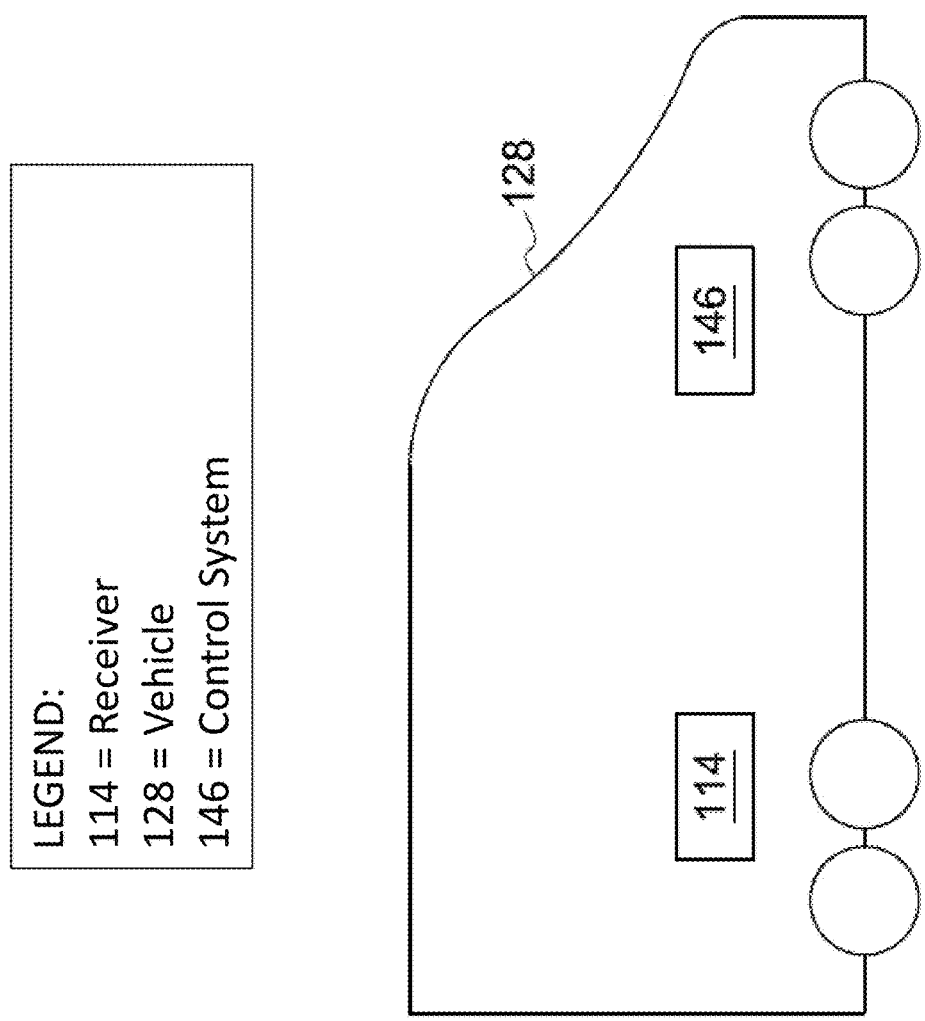
FIG. 6 illustrates a transportation system receiver located onboard the non-aerial vehicle according to one embodiment.

FIG. 6 illustrates the transportation system receiver located onboard the non-aerial vehicle according to one embodiment. The transportation system receiver can be configured to wirelessly communicate network data onboard and/or off-board the non-aerial vehicle, and/or to automatically switch to a mode for receiving the image data from the portable camera unit responsive to the portable camera unit being active to communicate the image data. For example, responsive to the portable camera unit being active to transmit the image data, the transportation system receiver may be configured to automatically switch from a network wireless client mode of operation (transmitting data originating from a device onboard the vehicle, such as the control unit) to the mode for receiving the image data from the portable camera unit. The mode for receiving the image data from the portable camera unit may comprise a wireless access point mode of operation (receiving data from the portable camera unit).

In another embodiment, the camera system further comprises the transportation system receiver located onboard the non-aerial vehicle. The transportation system receiver can be configured to wirelessly communicate network data onboard and/or off-board the vehicle, and/or to automatically switch from a network wireless client mode of operation to a wireless access point mode of operation, for receiving the image data from the portable camera unit. This network data can include data other than image data. For example, the network data can include information about an upcoming trip of the vehicle (e.g., a schedule, grades of a route, curvature of a route, speed limits, areas under maintenance or repair, etc.), cargo being carried by the vehicle, or other information. Alternatively, the network data can include the image data.

In another embodiment of one or more of the camera systems described herein, the system is configured for the image data to be stored and/or used locally (e.g., in the vehicle), or to be transmitted to a remote location (e.g., off-vehicle location) based on where the vehicle is located. For example, if the vehicle is in a yard (e.g., a switching yard, maintenance facility, or the like), the image data may be transmitted to a location in the yard. But, prior to the vehicle entering the yard or a designated location in the yard, the image data may be stored onboard the vehicle and not communicated to any location off of the vehicle.

Thus, in an embodiment, the system further comprises a control unit 800 that, responsive to at least one of a location of the portable camera unit or a control input, controls at least one of the portable camera unit or the transportation system receiver to a first mode of operation for at least one of storing or displaying the video data on board the rail vehicle and to a second mode of operation for communicating the video data off board the rail vehicle for at least one of storage or display of the video data off board the rail vehicle. For example, the control unit ran be configured to automatically control at least one of the portable camera unit or the transportation system receiver from the first mode of operation to the second mode of operation responsive to the location of the portable camera unit being indicative of the rail vehicle being in a yard.

During operation of the vehicle and/or camera unit outside of a designated area (e.g., a geofence extending around a vehicle yard or other location), the image data generated by the camera may be locally stored in the data storage device of the camera unit, shown on a display of the vehicle, or the like. Responsive to the vehicle and/or camera unit entering into the designated area, the camera unit can switch modes to begin wirelessly communicating the image data to the receiver, which may be located in the designated area. Changing where the image data is communicated based on the location of the vehicle and/or camera unit can allow for the image data to be accessible to those operators viewing the image data for safety, analysis, or the like. For example, during movement of the vehicle outside of the vehicle yard, the image data can be presented to an onboard operator, and/or the image data may be analyzed by an onboard analysis system of the vehicle to ensure safe operation of the vehicle. Responsive to the vehicle and/or camera unit entering into the vehicle yard, the image data can be communicated to a central office or management facility for remote monitoring of the vehicle and/or operations being performed near the vehicle.

As one example, event data transmission (e.g., the transmitting, broadcasting, or other communication of image data) may be configured to occur based on various vehicle conditions, geographic locations, and/or situations. The image data may be either pulled (e.g., requested) or pushed (e.g., transmitted and/or broadcast) from the vehicle. For example, image data can be sent from a vehicle to an off-board location based on selected operating conditions (e.g., emergency brake application), a geographic location (e.g., in the vicinity of a crossing between two or more routes), selected and/or derived operating areas of concern (e.g., high wheel slip or vehicle speed exceeding area limits), and/or time driven messages (e.g., sent once a day). The off-board location may also request and retrieve the image data from specific vehicles on demand.

Figure 7:
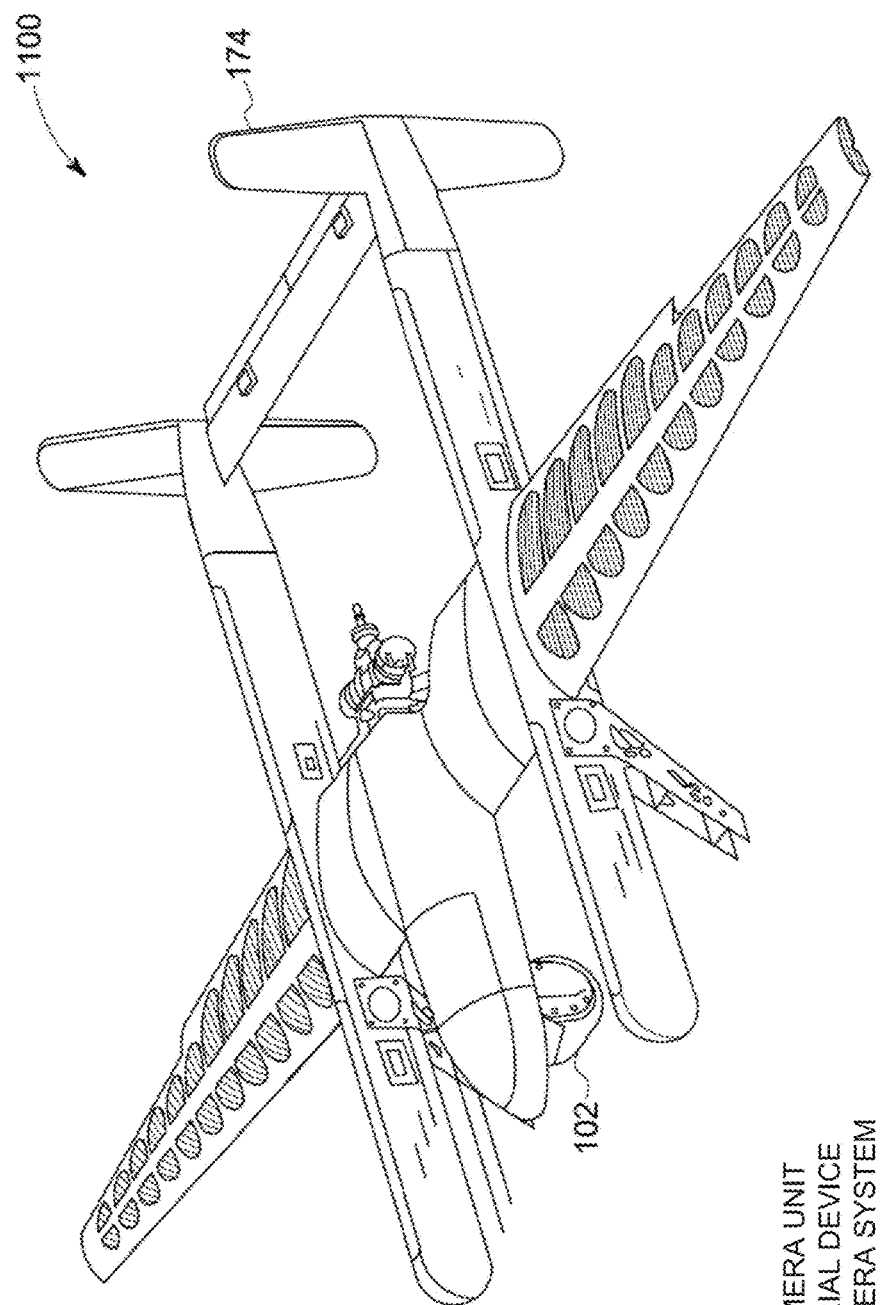
FIG. 7 illustrates a perspective view of a camera system.
Figure 8:
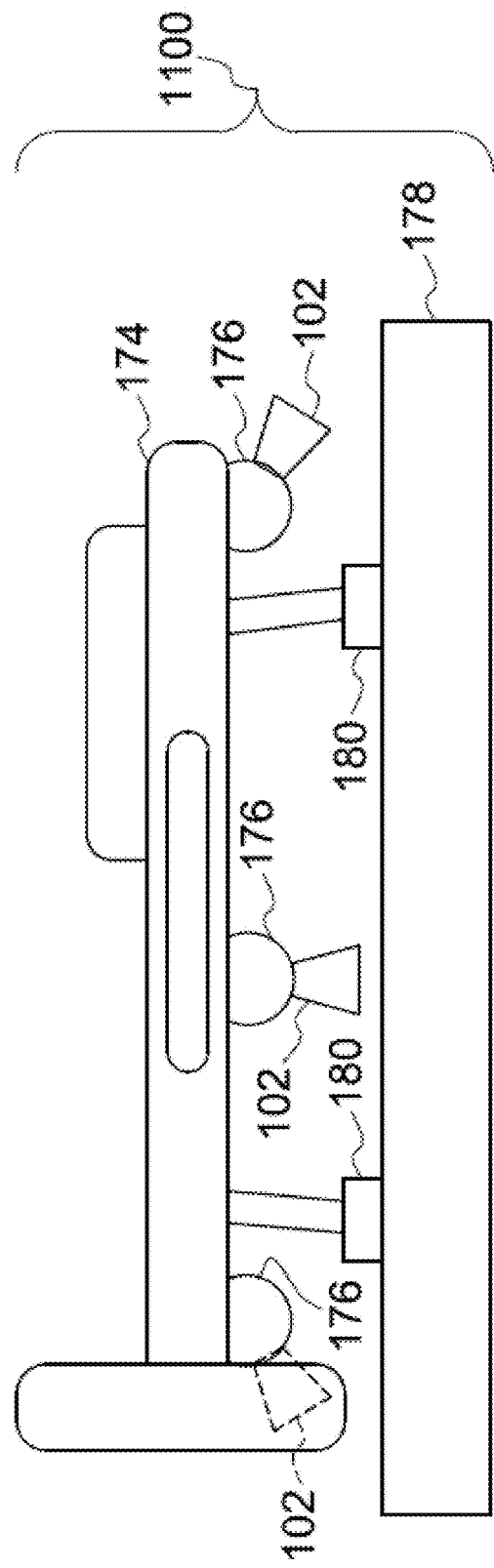
FIG. 8 illustrates a side view of the camera system shown in FIG. 7.
Figure 9:
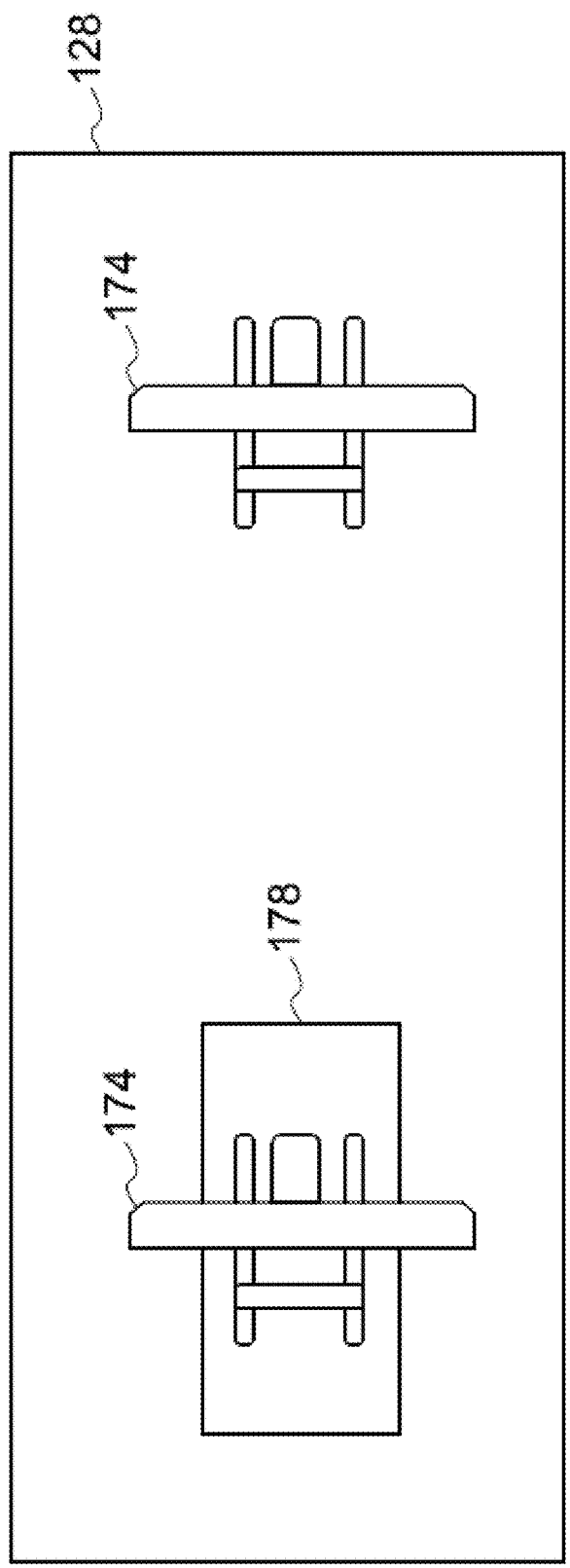
FIG. 9 illustrates a top view of the camera system shown in FIG. 7.

FIGS. 7, 8, and 9 illustrate another embodiment of a camera system 1100. FIG. 7 illustrates a perspective view of the camera system, FIG. 8 illustrates a side view of the camera system, and FIG. 9 illustrates a top view of the camera system 1100. The system includes an aerial device 174 configured for at least one of remote control or autonomous flying over a ground route of the non-aerial vehicle. The aerial device may have one or more camera docks 176 for receiving one or more portable camera units, and may have also a vehicle dock for coupling the aerial device to the non-aerial vehicle. In the illustrated example, the aerial device includes three cameras, with one camera unit facing along a forward direction of travel of the aerial device, another camera unit facing along a downward direction toward the ground or route over which the aerial device flies, and another camera unit facing along a rearward direction of the aerial device. Alternatively, a different number of camera units may be used and/or the camera units may be oriented in other directions.

When the aerial device is in the air, the portable camera units can be positioned for the cameras to view the route, the vehicle, or other areas near the vehicle. The aerial device may be, for example, a scale dirigible, a scale helicopter, or the like (e.g., the aerial device may be smaller than needed for transporting humans, such as 1/10 scale or smaller). A suitable scale helicopter can include quadcopters and the like.

The system also can include an aerial device vehicle dock 178 to attach the aerial device to the vehicle. The aerial device vehicle dock can receive the aerial device for at least one of detachable coupling of the aerial device to the vehicle, charging of a battery of the aerial device from a power source of the non-aerial vehicle, or the like. For example, the dock can include one or more connectors 180 that mechanically or magnetically coupled with the aerial device to prevent the aerial device from moving relative to the dock, that conductively couple an onboard power source (e.g., battery) of the aerial device with a power source of the vehicle (e.g., generator, alternator, battery, pantograph, or the like) so that the power source of the aerial device can be charged by the power source of the non-aerial vehicle during movement of the vehicle.

The aerial device can fly off of the vehicle to obtain image data that is communicated from one or more of the cameras onboard the aerial device to one or more receivers 114 onboard the vehicle. The aerial device can fly relative to the vehicle while the vehicle is stationary and/or while the vehicle is moving along a route. The image data may be displayed to an operator on a display device onboard the vehicle and/or may be autonomously examined as described herein. The image data can be examined by the operator and/or an image analysis system of the vehicle, such as to examine the vehicle, to examine other vehicles traveling relative to the vehicle (e.g., to avoid collisions between the vehicles), to examine the route being traveled upon (e.g., to perform route inspection), to warn of upcoming obstructions or other problems along the route ahead of the vehicle, and the like. When the aerial device is coupled into the vehicle dock, one or more cameras can be positioned to view the route during movement of the vehicle. The vehicle dock may include a wireless beacon configured to generate a beacon signal that identifies a location of the vehicle dock. The aerial device can detect the beacon signal to automatically control the flight of the aerial vehicle back to the vehicle dock, even when the vehicle system or vehicle is moving.

In one aspect, the image data obtained by the aerial device can be automatically examined by the image analysis system onboard the non-aerial vehicle to detect hazards such as an impending collision with obstacles onboard the route ahead of the non-aerial vehicle, potential derailment due to breaks or other types of damage to the rail, or the like.

In one mode of operation, the system includes three or more aerial devices, such two or more of the aerial devices docked onboard the non-aerial vehicle. A control unit onboard the non-aerial vehicle (e.g., the control unit 146 or a control unit that is separate from the control unit 146) can remotely control flight of at least one of the aerial devices.

Figure 10:
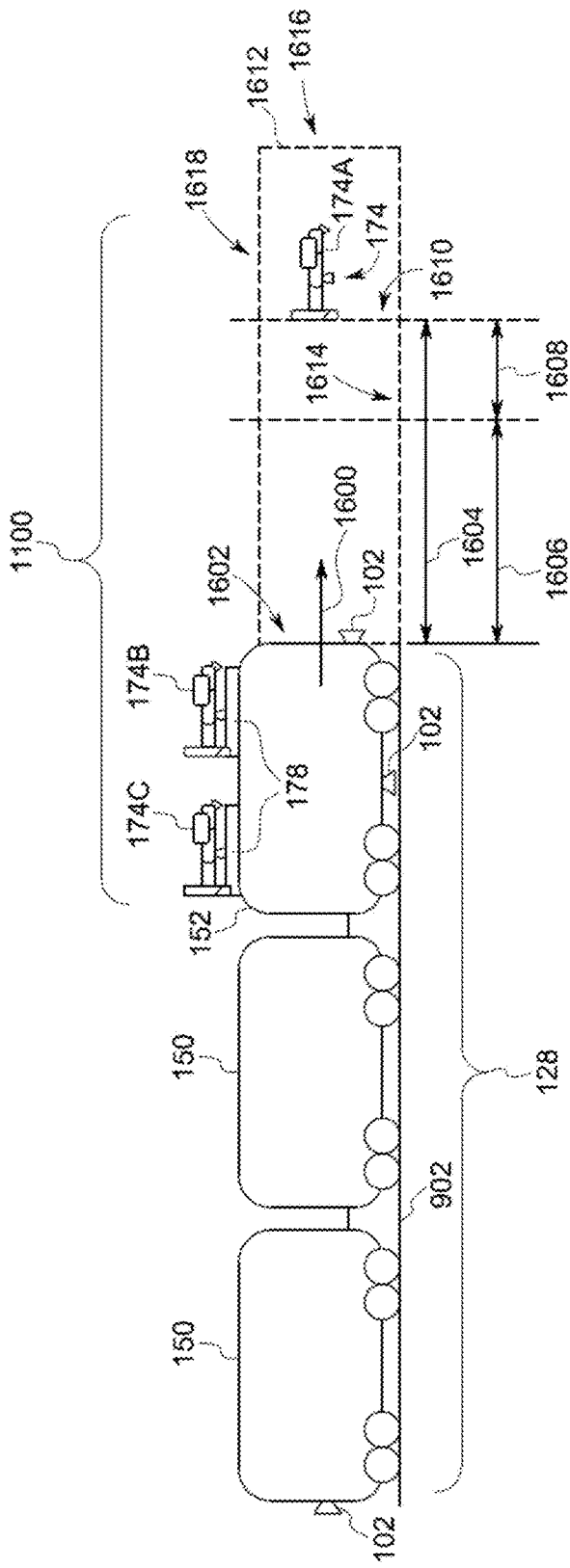
FIG. 10 illustrates operation of the camera system shown in FIGS. 7, 8, and 9 according to one embodiment.

FIG. 10 illustrates operation of the camera system 1100 shown in FIGS. 7, 8, and 9 according to one embodiment. The camera system can include several aerial devices 174, such as three aerial devices 174 (e.g., aerial devices 174A-C) or another number of aerial devices. In one aspect, a first aerial device 174A can fly off of the vehicle 128 (such as ahead of the vehicle 128), and second and/or third aerial devices 174B, 174C can be on one or more docks 178 of the vehicle (such that the second and third aerial devices 174B, 174C are moving with, but not relative to, the vehicle). Optionally, the aerial devices may land and remain on the vehicle without use of the docks 178. While the aerial devices and docks are shown on the same vehicle unit 150 of the vehicle, optionally, one or more of the aerial devices and/or docks may be disposed on another vehicle unit 150 and/or 152 of the vehicle. Additionally, while the aerial devices and docks are shown onboard the leading vehicle unit of the vehicle (along a direction of travel 1600 of the vehicle), one or more (or all) of the aerial devices that are onboard the vehicle 128 may be disposed onboard one or more other vehicle units. In one embodiment, the camera system can be coupled or include one or more additional sensors, such as a distance sensor that can measure distances or altitudes to determine a gradient profile of a stationary surface below the camera system. This gradient profile can include measurements or identifications of the grades in a route, potholes in a road, etc.

The aerial devices can switch off duties or operations between the aerial devices to ensure that at least one aerial device is generating image data 112, another aerial device 174 is being charged with current from the vehicle, and/or another aerial device can be stationary on the vehicle and ready to begin flying relative to the vehicle. For example, in order to ensure continual generation of the image data 112 representative of areas ahead of the vehicle by at least one aerial device 174A, the first aerial device 174A may fly ahead of the vehicle to obtain image data of the route for sending back to the vehicle for examination. Prior to the first aerial device returning to a dock of the vehicle (e.g., to recharge batteries of the first aerial device), the second aerial device 174B can fly off the vehicle to a location at or near the first aerial device and begin generating the image data 112. The first aerial device can return to a dock of the vehicle to charge batteries of the first aerial device. In one aspect, the first aerial device may return to the vehicle only after the second aerial device is flying ahead of the vehicle in a location that allows the second aerial device to obtain image data of areas ahead of the first aerial device. At a later time, the third aerial device 174C can fly to the location of the second aerial device and begin generating the image data so that the second aerial device can return to a dock to charge batteries of the second aerial device. At a later time, the first aerial device can fly ahead of the vehicle to replace operation of the third aerial device. In doing so, the aerial devices can ensure that at least one aerial device is obtaining image data, another aerial device is charged with energy and ready to fly off the vehicle, and another aerial device is charging at all times.

In FIG. 10, the vehicle is shown as a rail vehicle, but alternatively may be another type of vehicle. The vehicle moves along the route in the direction of travel 1600. The vehicle can include one or more onboard camera units 102 to generate image data of portions of the route 902 located beneath the vehicle, portions of the route ahead and/or behind the vehicle, or other areas around the vehicle. This image data can be displayed onboard the vehicle to an operator and/or examined by an image analysis system to identify damaged sections of the route.

At least one of the aerial devices can fly ahead of the vehicle along the direction of travel to generate image data representative of areas ahead of the vehicle along the direction of travel. This image data can represent portions of the route ahead of the aerial device, portions of the route beneath the aerial device, and/or portions of the route behind the aerial device (e.g., between the aerial device and the vehicle). Alternatively, the image data can represent other areas. The image data obtained by the camera unit(s) onboard the vehicle and by the camera unit(s) onboard the aerial device can be examined to detect obstacles on the route, problems with the route, or other hazards, as described herein. In one embodiment, the aerial device can communicate the image data to an image analysis system onboard the vehicle, which also examines the image data for obstacles, problems, or hazards.

In one aspect, the locations where the aerial device is permitted to fly relative to the vehicle may be limited. For example, the aerial device may not fly closer to a leading end 1602 of the vehicle (e.g., along the direction of travel) than a designated leading distance 1604 along the route. The leading distance may be measured along the path of the route and, in situations where the route is not linear, the leading distance may be measured along the non-linear path of the route. Alternatively, the leading distance may be a linear distance that does is not measured along the path of the non-linear route.

The leading distance can change based on changing operations of the vehicle. For example, the leading distance can be a combination (e.g., sum) of a safe braking distance 1606 and a response time distance 1608. The safe braking distance represents the distance along the path of the route that the vehicle would move before stopping in response to engagement of one or more brakes of the vehicle. For example, if the vehicle were to engage air brakes of the vehicle, the safe braking distance represents how far the vehicle would continue to move subsequent to engaging the brakes before stopping all movement. The response time distance represents the distance along the path of the route that the vehicle would travel before an operator onboard the vehicle could engage the brakes of the vehicle in response to identifying an event. For example, the response time distance represents how far the vehicle would move during a time period that begins with the operator seeing or being warned of an obstacle in the route or damage in the route ahead of the vehicle, the operator seeing the obstacle and/or damage, the operator receiving a warning of the obstacle and/or damage to the route, or the like. This time period ends when the operator actuates the brakes of the vehicle.

The control system disposed onboard the vehicle can calculate and/or change the leading distance, the safe braking distance, and/or the response time distance based on the operations of the vehicle and/or characteristics of the route. For example, the safe braking distance and/or the response time distance can change based on how fast the vehicle is moving, based on the path of the route, based on the grade of the route, based on adhesion between wheels of the vehicle and the route, based on an available braking effort, or the like. For example, the safe braking distance and/or the response time distance can be longer for faster speeds of the vehicle and shorter for slower speeds of the vehicle.

The safe braking distance and/or the response time distance can be longer for segments of the route having larger radii of curvature or straight segments of the route, and shorter for segments of the route having smaller radii of curvature. Route segments having smaller radii of curvature may resist movement of the vehicle more than route segments having larger radii of curvature and, as a result, the distance needed to stop the vehicle may be shorter on the segments having smaller radii of curvature.

The safe braking distance and/or the response time distance can be longer for segments of the route having flat and/or downhill grades and shorter for segments of the route having uphill grades. The additional acceleration of the vehicle caused by gravity on downhill grades can lengthen the distance needed to stop the vehicle. The deceleration of the vehicle caused by gravity on downhill grades and/or the absence of acceleration caused by gravity on flat grades can shorten the distance needed to stop movement of the vehicle.

The safe braking distance and/or the response time distance can be longer for smaller coefficients of friction between wheels of the vehicle and the route and shorter for segments of the route having larger coefficients of friction between wheels of the vehicle and the route. The distance needed to stop movement of the vehicle can increase when more wheel slip between the wheels and the route occurs, which can be a result of decreased coefficients of friction between the wheels and the route.

The safe braking distance and/or the response time distance can be longer for smaller available braking efforts of the vehicle (e.g., smaller air pressures in air brakes of the vehicle) and shorter for larger available braking efforts of the vehicle (e.g., larger air pressures in air brakes of the vehicle). For example, if the vehicle has reduced available braking efforts, such as during time periods when the air reservoirs or other components of an air brake system are recharging, the distance needed to stop the vehicle may increase relative to the vehicle having increased available braking effort.

The control system can calculate and update the leading distance, the safe braking distance, and/or the response time distance as the vehicle moves along the route and changes operations. For example, as the vehicle speeds up, travels along downhill grades, has increased wheel slip, or the like, the control system can increase the length of the leading distance, the safe braking distance, and/or the response time distance. The control system similarly can shorten the length of the leading distance, the safe braking distance, and/or the response time distance as the vehicle slows down, travels along uphill grades, has decreased wheel slip, or the like.

The updated leading distance, safe braking distance, and/or response time distance may be communicated to the aerial device, which can autonomously limit how far the aerial device flies ahead of the vehicle. Optionally, if the aerial device is being remotely controlled by an operator onboard the vehicle, the operator may limit how far the aerial device flies ahead of the vehicle based on the leading distance, safe braking distance, and/or response time distance. For example, the leading distance may be communicated to the operator and/or the control system may generate an audible and/or visual warning for the operator responsive to the aerial device approaching a far or distal end 1610 of the leading distance (e.g., coming within ten meters, fifty meters, 100 meters, or another threshold distance of the far end of the leading distance that opposes the leading end 1602 of the vehicle). The aerial device may approach the distal end of the leading distance when the aerial device slows relative to movement of the vehicle.

A movement envelope 1612 can be defined by sides or boundaries that limit where the aerial device may fly. One side or boundary of this movement envelope can be the leading edge of the vehicle. An opposite side or boundary of the movement envelope can be an outer leading edge or boundary 1616 represented by a vertically oriented plane that is parallel to the leading edge of the vehicle and separated from the leading edge of the vehicle by at least the leading distance. The leading edge or boundary can be farther from the leading end of the vehicle in order to provide room for the aerial device to move, as shown in FIG. 10. Alternatively, the leading edge or boundary may be separated from the leading end of the vehicle by the leading distance.

A bottom edge or boundary 1614 of the movement envelope can be the ground or water on which the vehicle is traveling. Alternatively, the bottom side or boundary can be elevated above and spaced apart from the ground or water, such as one or more meters above the route. An opposite upper side or boundary 1618 of the movement envelope can be separated from an upper surface of the route by a designated distance. The upper side or boundary can be defined to prevent the aerial device from flying too high above the route. For example, the vehicle may travel through tunnels, beneath other routes, beneath trees, beneath wires, or the like. The upper side or boundary may be defined to be no higher than the limits of the tunnels, other routes, trees, wires, or other obstacles such that, as long as the aerial device flies no higher than the upper side or boundary, the aerial device avoids contact with the obstacles.

Figure 11:
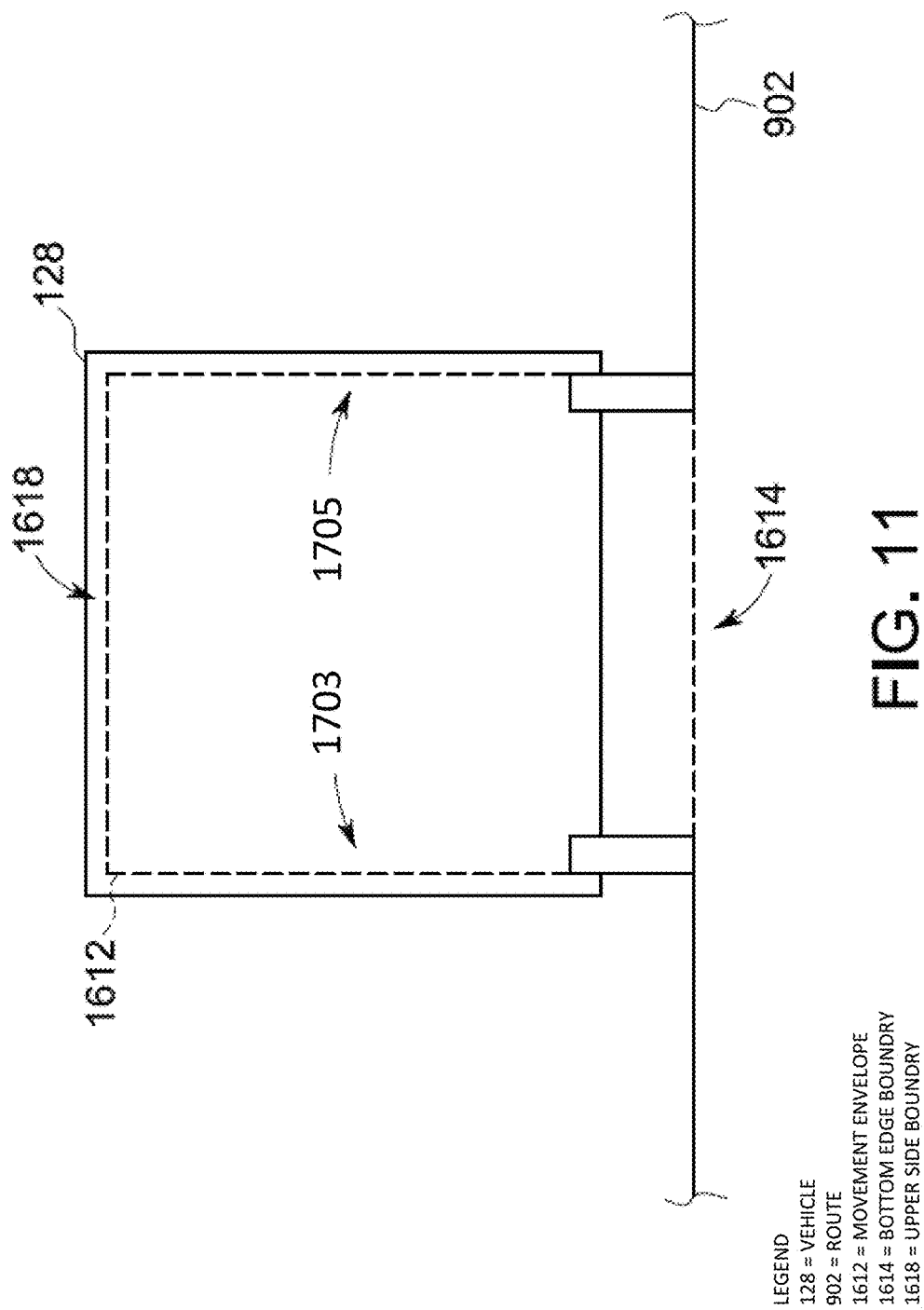
FIG. 11 illustrates a schematic diagram of a front view of a non-aerial vehicle and a movement envelope of an aerial device according to one embodiment.

FIG. 11 illustrates a schematic diagram of a front view of the vehicle 128 and the movement envelope 1612 of the aerial device 174 (shown in FIG. 7) according to one embodiment. As described above, the movement envelope may be defined by boundaries, such as upper and lower boundaries shown in FIG. 11. The movement envelope optionally may be defined by opposite lateral edges or boundaries 1703, 1705, as shown in FIG. 11. These, lateral edges or boundaries may represent parallel, vertically oriented planes that are perpendicular to the leading edge or boundary of the movement envelope. Similar to the upper edge or boundary of the movement envelope, the lateral edges or boundaries may be defined based on upcoming obstacles above the route. For example, the lateral edges or boundaries may be closer together than opposite vertical sides of an upcoming tunnel, than the distance between tree, buildings, or other objects on opposite sides of the route, etc.

The aerial device may be prevented from flying outside of the movement envelope. For example, if autonomously controlled, the control unit of the vehicle and/or onboard the aerial device can prevent the aerial device from flying outside of the movement envelope. If manually controlled, the control unit can disregard or otherwise ignore commands entered by an operator that attempt to move the aerial device outside of the movement envelope.

Figure 12:
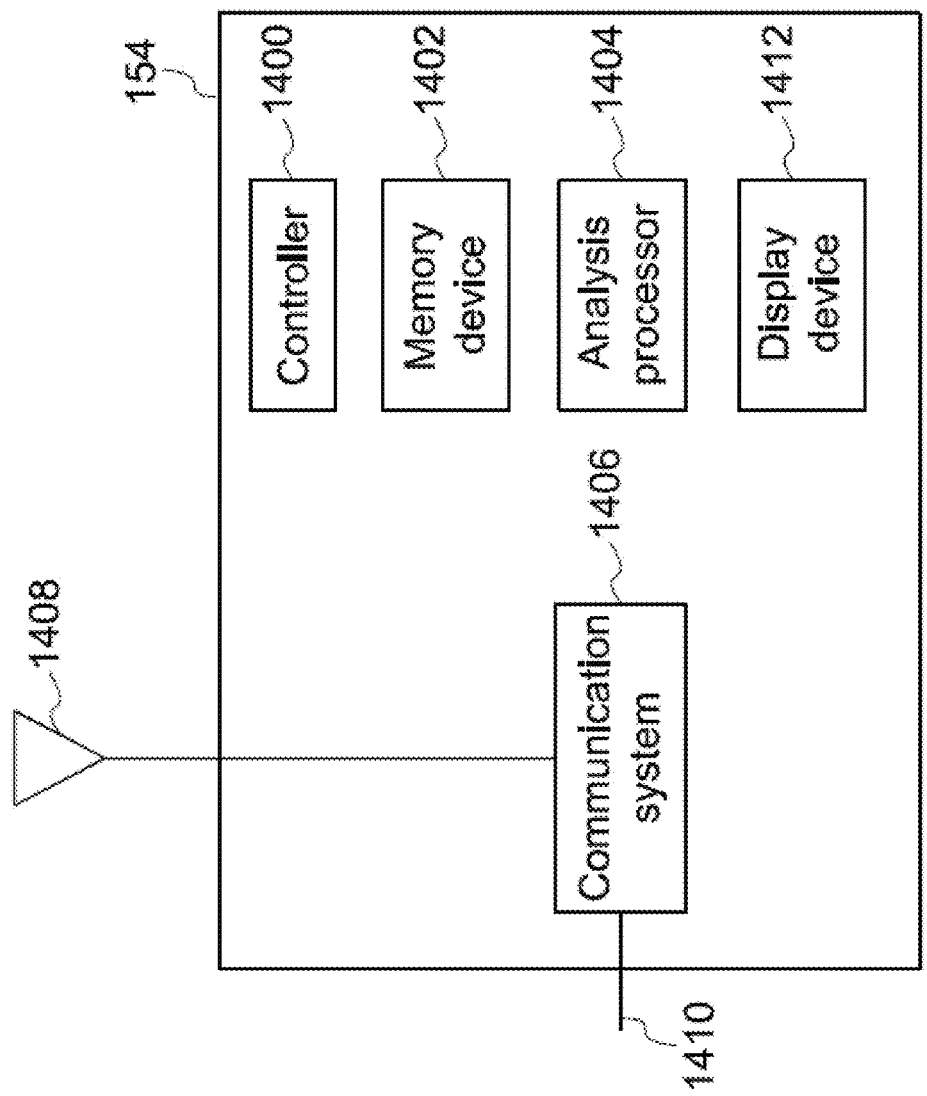
FIG. 12 is a schematic illustration of an image analysis system according to one embodiment.

FIG. 12 is a schematic illustration of the image analysis system 154 according to one embodiment. As described herein, the image analysis system can be used to examine the data content of the image data to automatically identify objects in the image data, damage in the route, or the like. A controller 1400 of the system includes or represents hardware circuits or circuitry that includes and/or is connected with one or more computer processors, such as one or more computer microprocessors. The controller can save image data obtained by the camera unit to one or more memory devices 1402 of the imaging system, generate alarm signals responsive to identifying one or more problems with the route and/or the wayside devices based on the image data that is obtained, or the like. The memory device 1402 includes one or more computer readable media used to at least temporarily store the image data. A suitable memory device can include a computer hard drive, flash or solid state drive, optical disk, or the like.

During travel of the vehicle along a route, the camera unit(s) onboard the vehicle and/or the aerial devices can generate image data representative of images and/or video of the field of view of the camera unit(s). For example, the image data may be used to inspect the health of the route, status of wayside devices along the route being traveled on by the vehicle, or the like. The field of view of the camera unit can encompass at least some of the route and/or wayside devices disposed ahead of the vehicle along a direction of travel of the vehicle. During movement of the vehicle along the route, the camera unit(s) can obtain image data representative of the route and/or the wayside devices for examination to determine if the route and/or wayside devices are functioning properly, or have been damaged, need repair, and/or need further examination.

The image data created by the camera unit can be referred to as machine vision, as the image data represents what is seen by the system in the field of view of the camera unit. One or more analysis processors 1404 of the system may examine the image data to identify conditions of the vehicle, the route, and/or wayside devices. Optionally, the analysis processor can examine the terrain at, near, or surrounding the route and/or wayside devices to determine if the terrain has changed such that maintenance of the route, wayside devices, and/or terrain is needed. For example, the analysis processor can examine the image data to determine if vegetation (e.g., trees, vines, bushes, and the like) is growing over the route or a wayside device (such as a signal) such that travel over the route may be impeded and/or view of the wayside device may be obscured from an operator of the vehicle. The analysis processor can represent hardware circuits and/or circuitry that include and/or are connected with one or more processors, such as one or more computer microprocessors, controllers, or the like.

As another example, the analysis processor can examine the image data to determine if the terrain has eroded away from, onto, or toward the route and/or wayside device such that the eroded terrain is interfering with travel over the route, is interfering with operations of the wayside device, or poses a risk of interfering with operation of the route and/or wayside device. Thus, the terrain "near" the route and/or wayside device may include the terrain that is within the field of view of the camera unit when the route and/or wayside device is within the field of view of the camera unit, the terrain that encroaches onto or is disposed beneath the route and/or wayside device, and/or the terrain that is within a designated distance from the route and/or wayside device (e.g., two meters, five meters, ten meters, or another distance).

Acquisition of image data from the camera unit can allow for the analysis processor 1404 to have access to sufficient information to examine individual video frames, individual still images, several video frames, or the like, and determine the condition of the route, the wayside devices, and/or terrain at or near the wayside device. The image data optionally can allow for the analysis processor to have access to sufficient information to examine individual video frames, individual still images, several video frames, or the like, and determine the condition of the route. The condition of the route can represent the health of the route, such as a state of damage to one or more rails of a track, the presence of foreign objects on the route, overgrowth of vegetation onto the route, and the like. As used herein, the term "damage" can include physical damage to the route (e.g., a break in the route, pitting of the route, or the like), movement of the route from a prior or designated location, growth of vegetation toward and/or onto the route, deterioration in the supporting material (e.g., ballast material) beneath the route, or the like. For example, the analysis processor may examine the image data to determine if one or more rails are bent, twisted, broken, or otherwise damaged. Optionally, the analysis processor can measure distances between the rails to determine if the spacing between the rails differs from a designated distance (e.g., a gauge or other measurement of the route). The analysis of the image data by the analysis processor can be performed using one or more image and/or video processing algorithms, such as edge detection, pixel metrics, comparisons to benchmark images, object detection, gradient determination, or the like.

A communication system 1406 of the system represents hardware circuits or circuitry that include and/or are connected with one or more processors (e.g., microprocessors, controllers, or the like) and communication devices (e.g., wireless antenna 1408 and/or wired connections 1410) that operate as transmitters and/or transceivers for communicating signals with one or more locations. For example the communication system may wirelessly communicate signals via the antenna and/or communicate the signals over the wired connection (e.g., a cable, bus, or wire such as a multiple unit cable, train line, or the like) to a facility and/or another vehicle system, or the like.

The image analysis system optionally may examine the image data obtained by the camera unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different camera units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

In one aspect, the analysis processor of the image analysis system can examine and compare image data acquired by camera units of the aerial device and the vehicle to detect hazards ahead of the vehicle, such as obstacles in front of the vehicle along the route, detect damaged segments of the route, or the like. For example, the aerial device can include a forward-facing camera unit that generates image data representative of a field of view ahead of the aerial device along the direction of travel 1600 (shown in FIG. 10), a downward-facing camera unit that generates image data representative of a field of view beneath the aerial device, and a rearward-facing camera that generates image data representative of a field of view behind the aerial device (e.g., opposite to the direction of travel of the vehicle and/or between the aerial device and the vehicle). The vehicle optionally may include one or more camera units, such as forward-facing, downward-facing, and/or rearward-facing camera units that generate image data.

Figure 13:
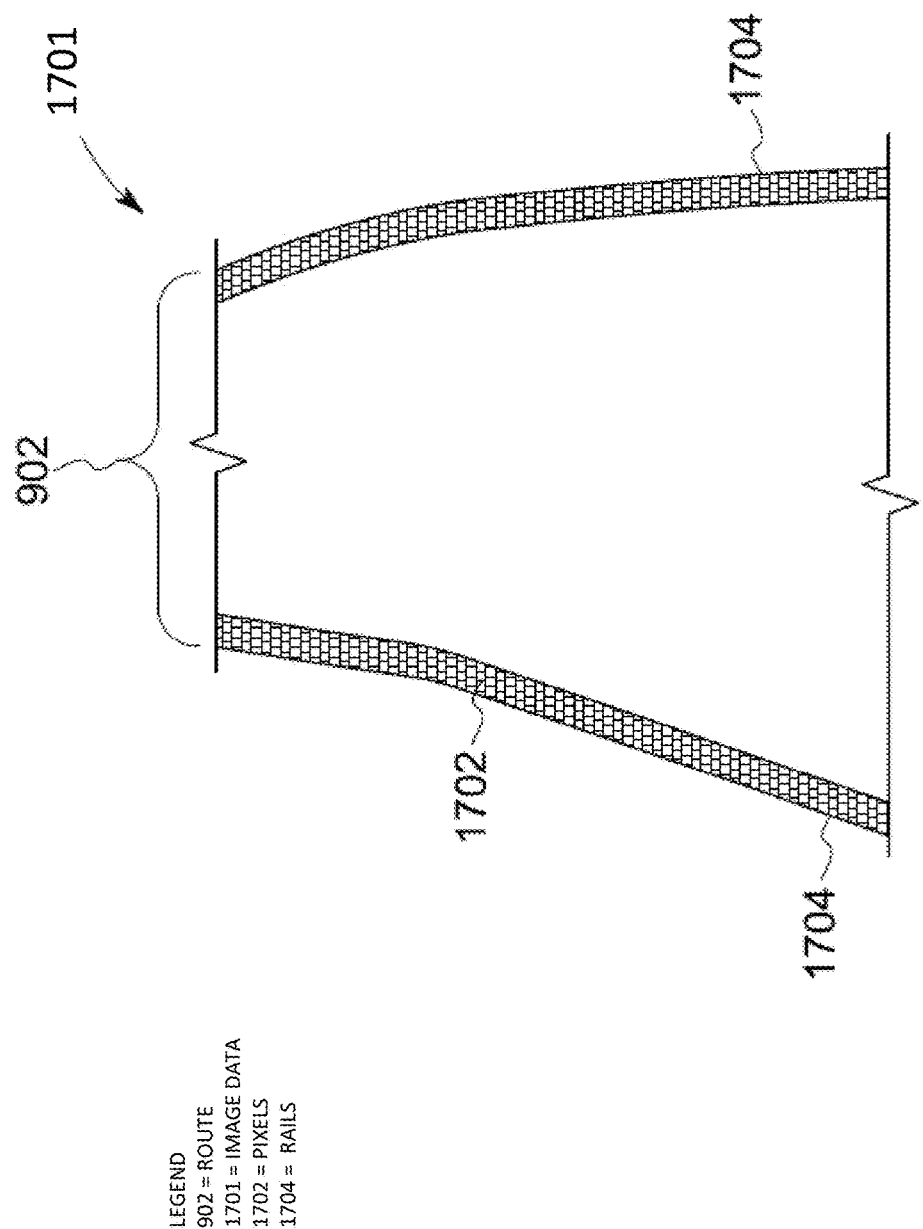
FIG. 13 illustrates one example of image data of a segment of a route.
Figure 14:
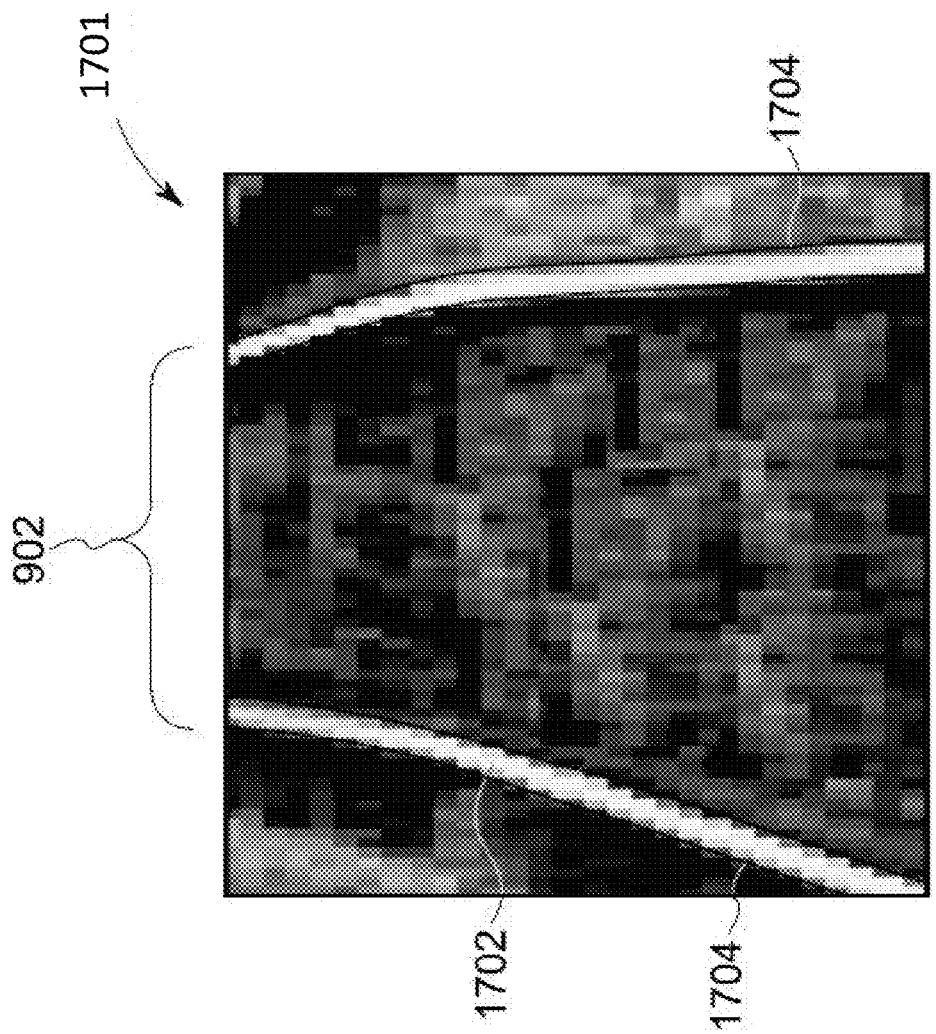
FIG. 14 illustrates another example of the image data shown in FIG. 13.

In one embodiment, the image data from the various camera units can be compared to benchmark visual profiles of the route by the image analysis processor to detect obstacles on the route, damage to the route (e.g., breaks and/or bending in rails of the route), or other hazards, FIGS. 13 and 14 illustrate one example of image data 1701 of a segment of the route 902. As shown in FIGS. 13 and 14, the image data may be a digital image formed from several pixels 1702 of varying color and/or intensity. Pixels with greater intensities may be lighter in color (e.g., more white) while pixels with lesser intensities may be darker in color. In one aspect, the image analysis processor examines the intensities of the pixels to determine which portions of the image data represent the route (e.g., rails 1704 of a track, edges of a road, or the like). For example, the processor may select those pixels having intensities that are greater than a designated threshold, the pixels having intensities that are greater than an average or median of several or all pixels in the image data, or other pixels as representing locations of the route. Alternatively, the processor may use another technique to identify the route in the image data 1701.

The image analysis processor can select one or more benchmark visual profiles from among several such profiles stored in a computer readable memory, such as the memory device 1402. The memory device 1402 can include or represent one or more memory devices, such as a computer hard drive, a CD-ROM, DVD ROM, a removable flash memory card, a magnetic tape, or the like. The memory device can store the image data obtained by the camera units and the benchmark visual profiles associated with a trip of the vehicle.

The benchmark visual profiles represent designated layouts of the route that the route is to have at different locations. For example, the benchmark visual profiles can represent the positions, arrangements, relative locations, of rails or opposite edges of the route when the rails or route were installed, repaired, last passed an inspection, or otherwise.

In one aspect, a benchmark visual profile is a designated gauge (e.g., distance between rails of a track, width of a road, or the like) of the route. Alternatively, a benchmark visual profile can be a previous image of the route at a selected location. In another example, a benchmark visual profile can be a definition of where the route is expected to be located in an image of the route. For example, different benchmark visual profiles can represent different shapes of the rails or edges of a road at different locations along a trip of the vehicle from one location to another.

The processor can determine which benchmark visual profile to select in the memory device based on a location of the vehicle when the image data is obtained by camera units disposed onboard the vehicle and/or a location of the aerial device when the image data is obtained by camera units disposed onboard the aerial device. The processor can select the benchmark visual profile from the memory device that is associated with and represents a designated layout or arrangement of the route at the location of the vehicle and/or aerial device when the image data is obtained. This designated layout or arrangement can represent the shape, spacing, arrangement, or the like, that the route is to have for safe travel of the vehicle. For example, the benchmark visual profile can represent the gauge and alignment of the rails of the track when the track was installed or last inspected.

Figure 15:
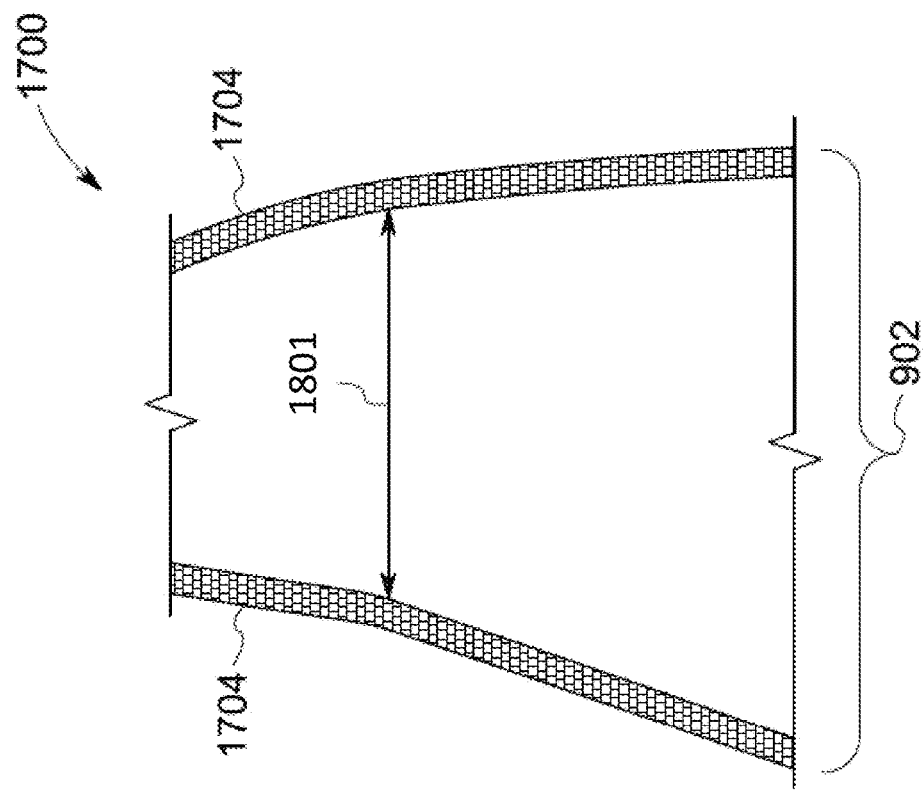
FIG. 15 illustrates another example of the image data of the route.
Figure 16:
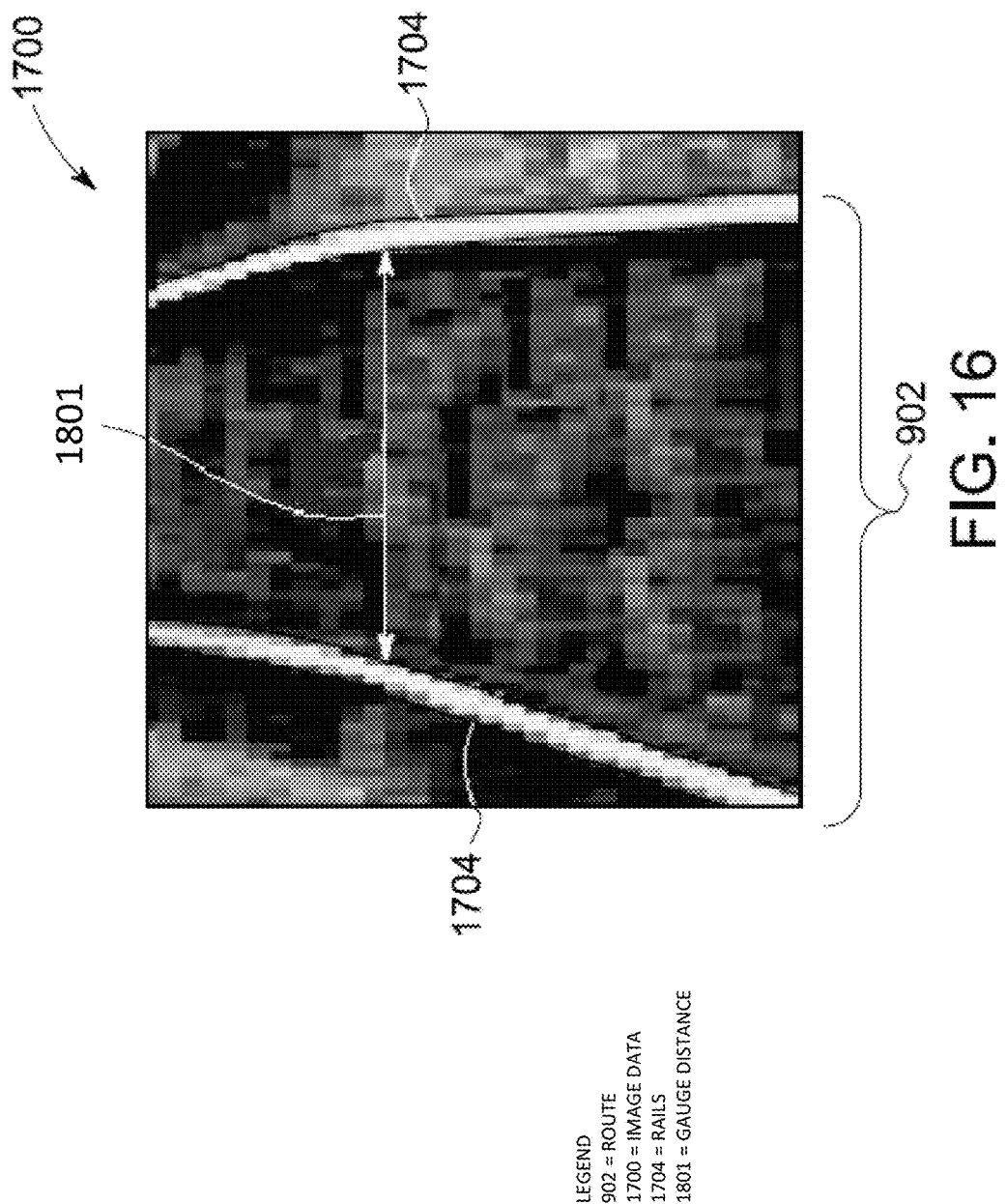
FIG. 16 illustrates another example of the image data of the route.

In one aspect, the image analysis processor can measure a gauge of the segment of the route shown in the image data to determine if the route is misaligned. FIGS. 15 and 16 illustrate another example of the image data of the route. The image analysis processor can examine the image data to measure a gauge distance 1801 between the rails of the route, between opposite sides or edges of the route, or the like. Optionally, the gauge distance can represent a geometric dimension of the route, such as a width of the route, a height of the route, a profile of the route, a radius of curvature of the route, or the like.

The image analysis processor can measure a straight line or linear distance between one or more pixels in the image data that are identified as representing one rail, side, edge, or other component of the route to one or more other pixels identified as representing another rail, side, edge, or other component of the route, as shown in FIGS. 15 and 16. This distance can represent a gauge distance of the route. Alternatively, the distance between other pixels may be measured. The image analysis processor can determine the gauge distance by multiplying the number of pixels between the rails, edges, sides, or other components of the route by a known distance that the width of each pixel represents in the image data, by converting the number of pixels in the gauge distance to length (e.g., in centimeters, meters, or the like) using a known conversion factor, by modifying a scale of the gauge distance shown in the image data by a scaling factor, or otherwise. In one aspect, the image analysis processor can convert the image data to or generate the image data as wireframe model data, as described in the '294 Application. The gauge distances may be measured between the portions of the wireframe model data that represent the rails.

The measured gauge distance can be compared to a designated gauge distance stored in the memory device onboard the vehicle (or elsewhere) for the imaged section of the route. The designated gauge distance can be a benchmark visual profile of the route, as this distance represents a designated arrangement or spacing of the rails, sides, edges, or the like, of the route. If the measured gauge distance differs from the designated gauge distance by more than a designated threshold or tolerance, then the image analysis processor can determine that the segment of the route that is shown in the image data is misaligned. For example, the designated gauge distance can represent the distance or gauge of the route when the rails of a track were installed or last passed an inspection. If the measured gauge distance deviates too much from this designated gauge distance, then this deviation can represent a changing or modified gauge distance of the route.

Optionally, the image analysis processor may determine the gauge distance several times as the vehicle and/or aerial device(s) travel over the route, and monitor the measured gauge distances for changes. If the gauge distances change by more than a designated amount, then the image analysis processor can identify the upcoming segment of the route as being potentially misaligned. As described below, however, the change in the measured gauge distance alternatively may represent a switch in the route that the vehicle is traveling toward.

Measuring the gauge distances of the route can allow the image analysis processor to determine when one or more of the rails in the route are misaligned, even when the segment of the route includes a curve. Because the gauge distance should be constant or substantially constant (e.g., within manufacturing tolerances, such as where the gauge distances do not vary by more than 1%, 3%, 5%, or another value), the gauge distance should not significantly change in curved or straight sections of the route, unless the route is misaligned.

In one embodiment, the image analysis processor can track the gauge distances to determine if the gauge distances exhibit designated trends within a designated distance and/or amount of time. For example, if the gauge distances increase over at least a first designated time period or distance and then decrease over at least a second designated time period, or decrease over at least the first designated time period or distance and then increase over a least the second designated time period, then the image analysis processor may determine that the rails are misaligned, as described in the '847 Application. Optionally, the image analysis processor may determine that the rails are misaligned responsive to the gauge distances increasing then decreasing, or decreasing then increasing, as described above, within a designated detection time or distance limit, as described in '847 Application.

Figure 17:
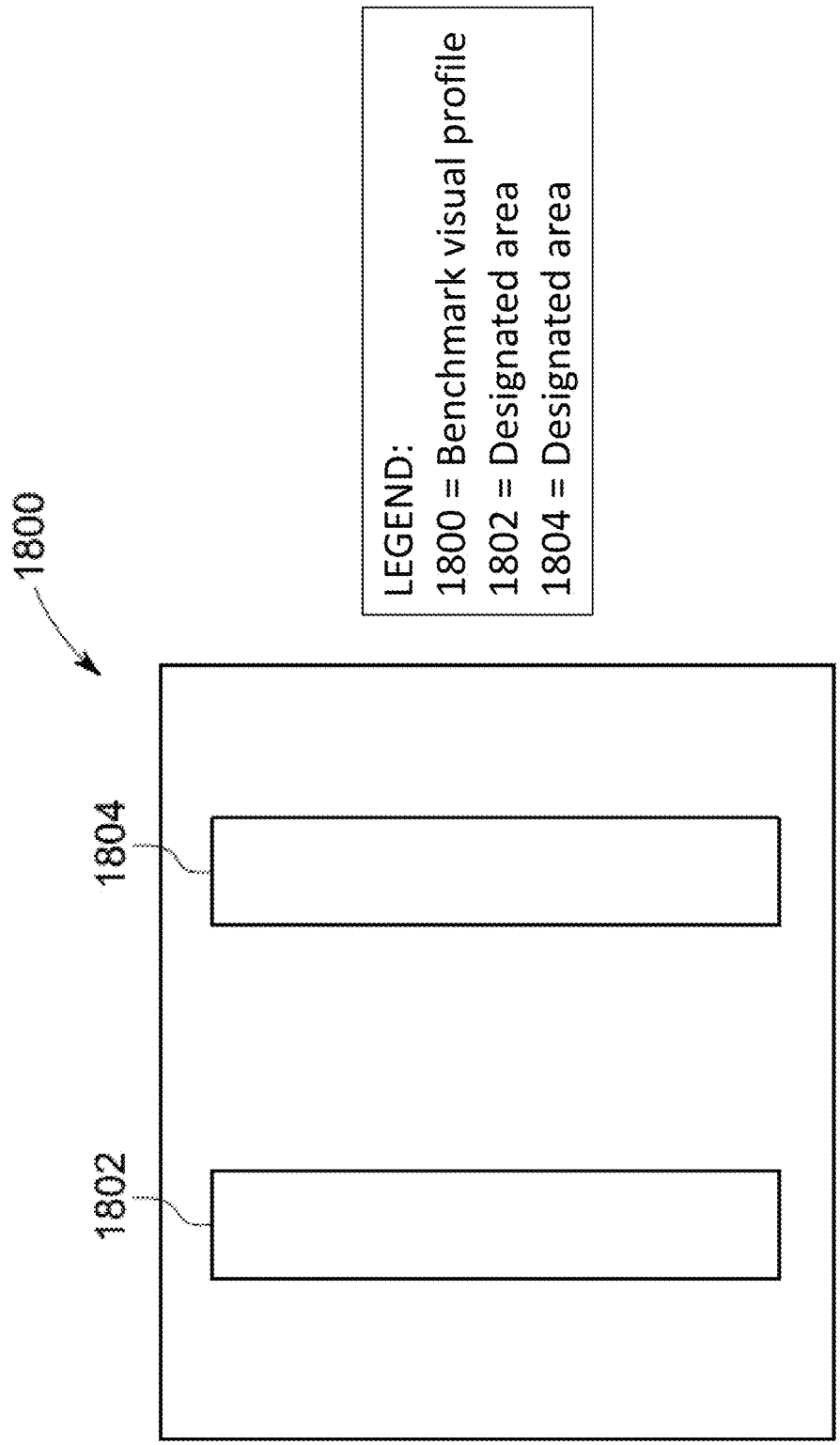
FIG. 17 illustrates an example of a benchmark visual profile.

FIG. 17 illustrates an example of a benchmark visual profile 1800. The benchmark visual profile represents a designated layout of the route 902, such as where the route is expected to be in the image data obtained by one or more of the camera units disposed onboard the aerial device and/or vehicle. In the illustrated example, the benchmark visual profile includes two designated areas 1802, 1804 that represent designated positions of rails of a track, edges or sides of a route, or other components of the route. The designated areas can represent where the pixels of the image data that represent the rails, edges, sides, or the like, of the route should be located if the rails, edges, sides, or the like, are aligned properly. For example, the designated areas can represent expected locations of the rails, edges, sides, or the like, of the route prior to obtaining the image data. With respect to rails of a track, the rails may be properly aligned when the rails are in the same locations as when the rails were installed or last passed an inspection of the locations of the rails, or at least within a designated tolerance. This designated tolerance can represent a range of locations that the rails, edges, sides, or the like, may appear in the image data due to rocking or other movements of the vehicle.

Optionally, the benchmark visual profile may represent a former image of the route obtained by a camera unit on the same or a different vehicle. For example, the benchmark visual profile may be an image or image data obtained from a camera unit onboard an aerial device flying ahead of the vehicle and the image data acquired by a camera unit disposed onboard the vehicle can be compared to the benchmark visual profile. The designated areas can represent the locations of the pixels in the former image that have been identified as representing components of the route (e.g., rails, edges, sides, or the like, of the route).

In one aspect, the image analysis processor can map the pixels representative of components of the route to the benchmark visual profile or can map the designated areas of the benchmark visual profile to the pixels representative of the route. This mapping may include determining if the locations of the pixels representative of the components of the route in the image are in the same locations as the designated areas of the benchmark visual profile.

Figure 18:
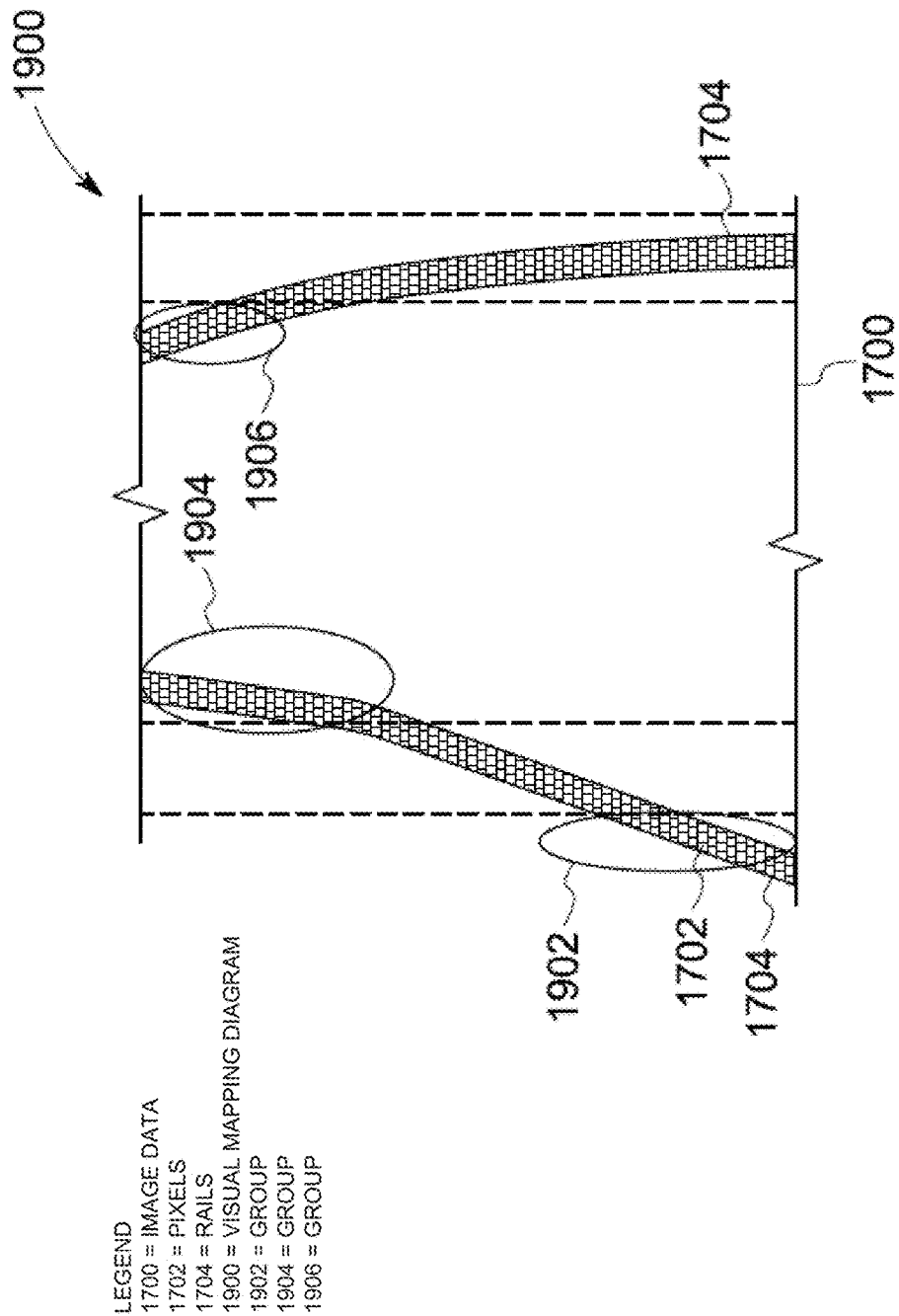
FIG. 18 illustrates a visual mapping diagram of image data and a benchmark visual profile according to one example.
Figure 19:
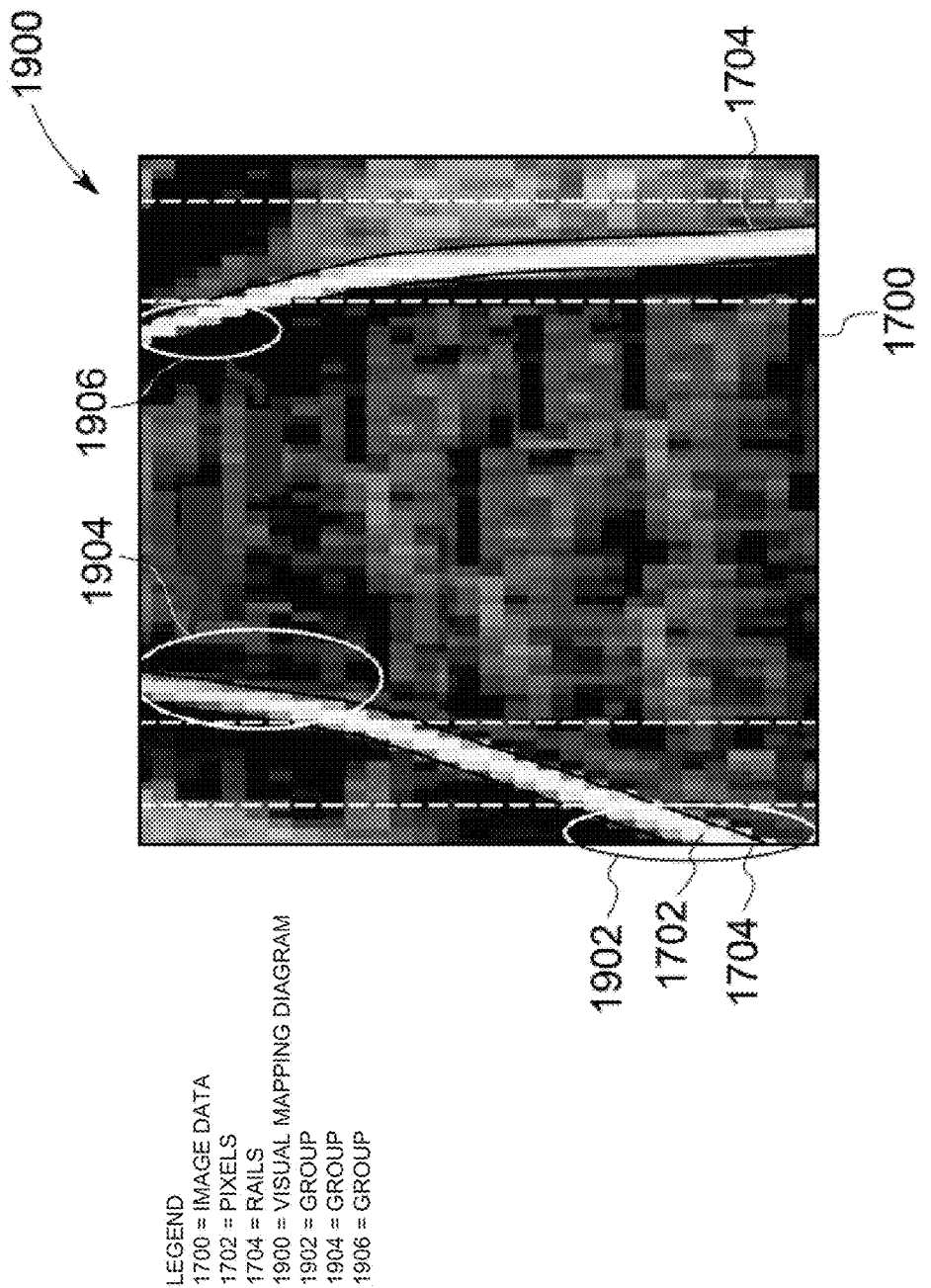
FIG. 19 illustrates another view of the visual mapping diagram shown in FIG. 18.

FIGS. 18 and 19 illustrate different views of a visual mapping diagram 1900 of the image data and the benchmark visual profile 1800 according to one example of the inventive subject matter described herein. The mapping diagram represents one example of a comparison of the image with the benchmark visual profile that is performed by the image analysis processor disposed onboard the vehicle, onboard the aerial device, and/or off-board the vehicle. As shown in the mapping diagram, the designated areas of the benchmark visual profile can be overlaid onto the image data. The image analysis processor can then identify differences between the image data and the benchmark visual profile. For example, the image analysis processor can determine whether the pixels representing the components of the route are disposed outside of the designated areas in the benchmark visual profile. Optionally, the image analysis processor can determine if locations of the pixels representing the components of the route in the image data (e.g., coordinates of these pixels) are not located within the designated areas (e.g., are not coordinates located within outer boundaries of the designated areas in the benchmark visual profile).

If the image analysis processor determines that at least a designated amount of the pixels representing one or more components of the route are outside of the designated areas in the benchmark visual profile, then the image analysis processor can identify the segment of the route that is shown in the image data as being misaligned. For example, the image analysis processor can identify groups 1902, 1904, 1906 of the pixels 1702 that represent one or more components of route as being outside of the designated areas. If the number, fraction, percentage, or other measurement of the pixels that are representative of the components of the route and that are outside the designated areas exceeds a designated threshold (e.g., 10%, 20%, 30%, or another amount), then the segment of the route shown in the image data is identified as representing a hazard (e.g., the route is misaligned, bent, or otherwise damaged). On the other hand, if the number, fraction, percentage, or other measurement of the pixels that are representative of components the route and that are outside the designated areas does not exceed the threshold, then the segment of the route shown in the image data is not identified as representing a hazard.

Figure 20:
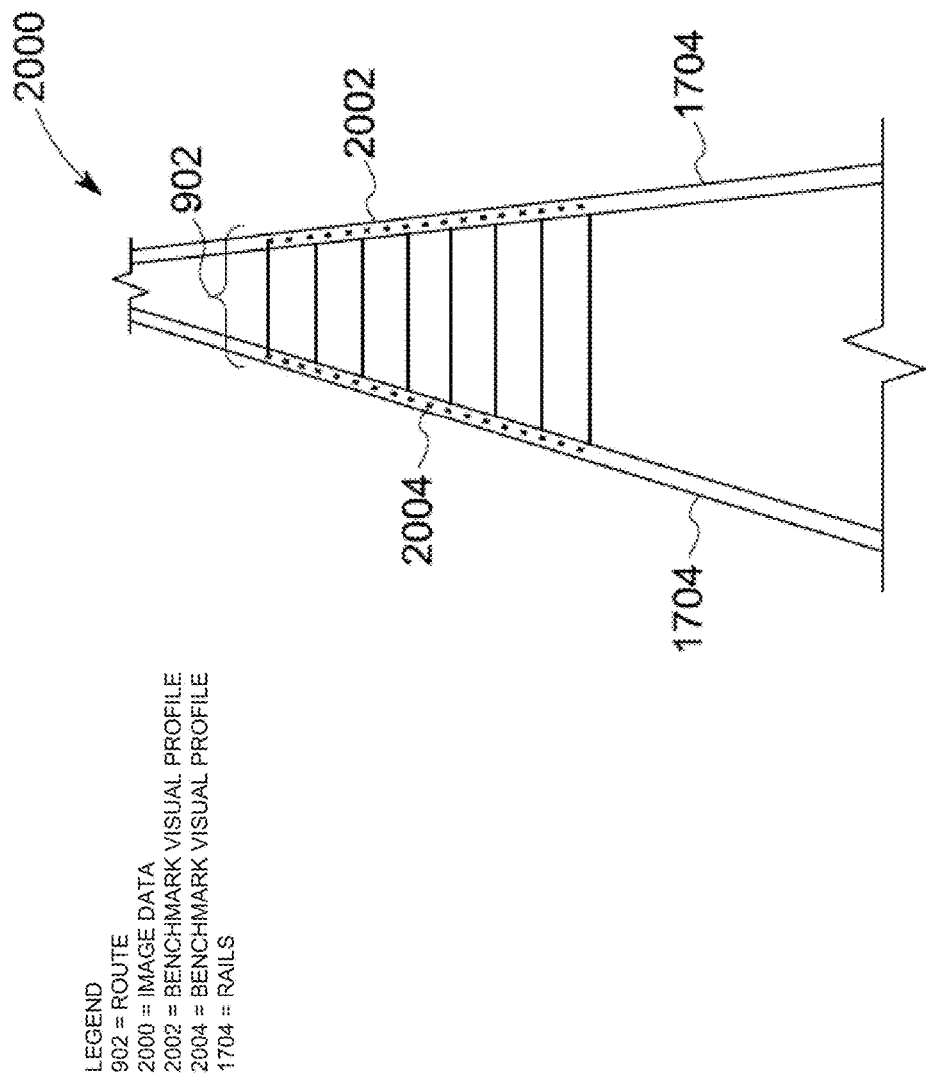
FIG. 20 illustrates image data generated by one or more camera units disposed onboard the vehicle and/or aerial devices and benchmark visual profiles of the route according to another embodiment.

FIG. 20 illustrates image data 2000 generated by one or more camera units disposed onboard the vehicle and/or aerial devices and benchmark visual profiles 2002, 2004 of the route according to another embodiment. The benchmark visual profiles 2002, 2004 can be created by the image analysis processor from the image data. For example, the image analysis processor can examine intensities of the pixels in the image data to determine the location of the route, as described above. Within the location of the route in the image data, the image analysis processor can find two or more pixels having the same or similar (e.g., within a designated range of each other) intensities. Optionally, the image analysis processor may identify many more pixels with the same or similar intensities. The benchmark visual profiles therefore may be determined without having the profiles previously created and/or stored in a memory.

The image analysis processor then determines a relationship between these pixels. For example, the image analysis processor may identify a line between the pixels in the image for each rail, side, edge, or other component or the route. These lines can represent the benchmark visual profiles shown in FIG. 20. The image analysis processor can then determine if other pixels representative of the components of the route are on or within the benchmark visual profiles (e.g., within a designated distance of the benchmark visual profiles), or if these pixels are outside of the benchmark visual profiles. In the illustrated example, most or all of the pixels representative of the rails of the route are on or within the benchmark visual profiles.

Figure 21:
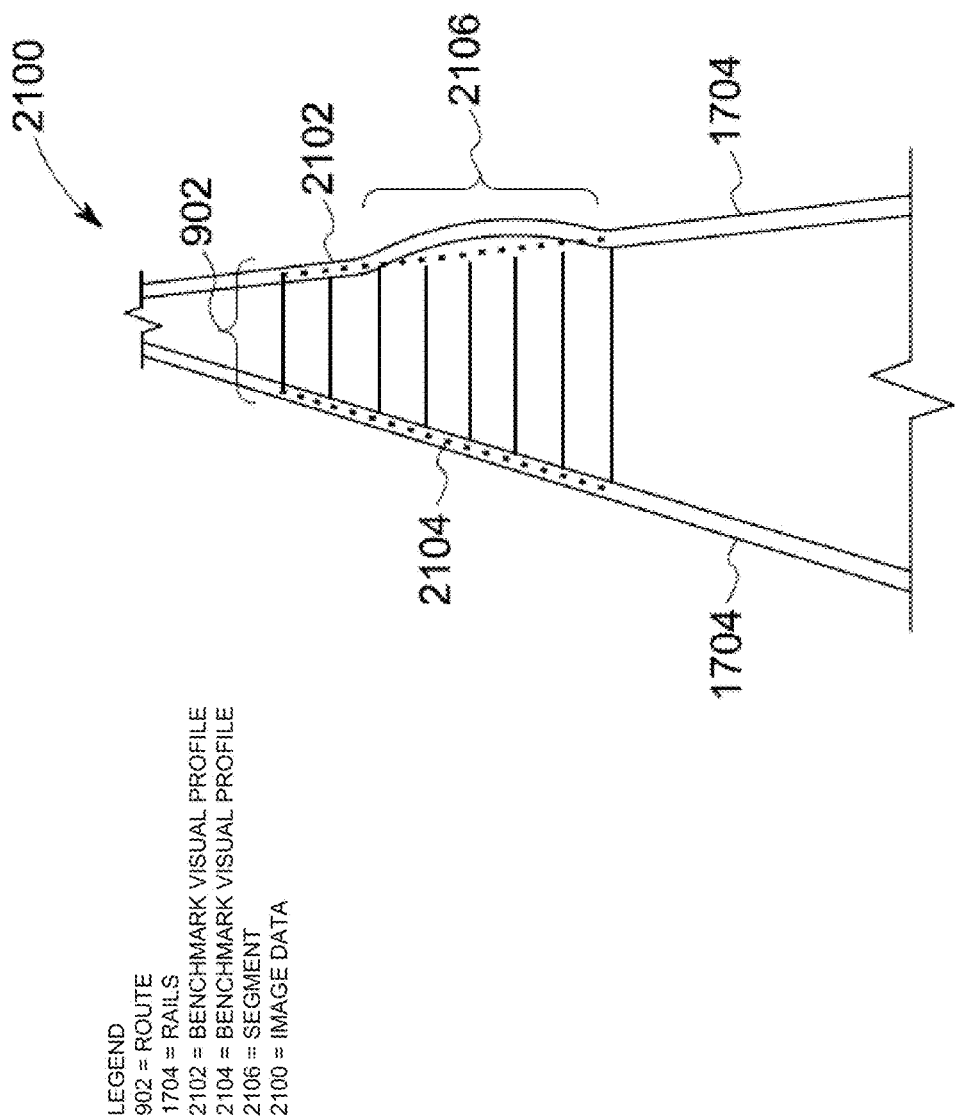
FIG. 21 illustrates other image data with benchmark visual profiles of the route according to another embodiment.

FIG. 21 illustrates other image data with benchmark visual profiles 2104 of the route 902 according to another embodiment. The benchmark visual profiles 2104 may be created using the image data obtained by one or more camera units disposed onboard the aerial device(s) and/or the vehicle, as described above in connection with FIG. 20. In contrast to the image data shown in FIG. 20, however, the image data 2100 shown in FIG. 21 shows a segment 2106 of the route that does, not fall on or within the benchmark visual profile 2102. This segment 2106 curves outward and away from the benchmark visual profile 2102. The image analysis processor can identify this segment 2106 because the pixels having intensities that represent the components of the route are no longer on or in the benchmark visual profile 2102. Therefore, the image analysis processor can identify the segment 2106 as a hazard (e.g., a misaligned segment of the route) that the vehicle is traveling toward.

In one aspect, the image analysis processor can use a combination of techniques described herein for examining the route. For example, if both rails of the route are bent or misaligned from previous positions, but are still parallel or substantially parallel to each other, then the gauge distance between the rails may remain the same or substantially the same, and/or may not substantially differ from the designated gauge distance of the route. As a result, only looking at the gauge distance in the image data may result in the image analysis processor failing to identify damage (e.g., bending) to the rails. In order to avoid this situation, the image analysis processor additionally or alternatively can generate the benchmark visual profiles using the image data and compare these profiles to the image data of the rails, as described above. Bending or other misalignment of the rails may then be identified when the bending in the rails deviates from the benchmark visual profile created from the image data.

In one embodiment, responsive to the image analysis processor determining that the image data represents an upcoming hazard on the route, the image analysis processor may direct generate a warning signal to notify the operator of the vehicle of the upcoming hazard. For example, the image analysis processor can direct the control unit of the vehicle to display a warning message and/or display the image data (e.g., obtained from one or more camera units onboard the aerial device flying ahead of the vehicle and/or one or more camera units onboard the vehicle). The operator of the vehicle then may have until the vehicle moves through the safe braking distance described above to make a decision as to whether to ignore the warning or to stop movement of the vehicle. If the hazard is detected within the safe braking distance based on the image data obtained from one or more camera units of the aerial device and/or a camera unit disposed onboard the vehicle, then the operator of the vehicle may be notified by the image analysis processor of the hazard in the event that the operator has not yet spotted the hazard or is otherwise distracted, thereby allowing the operator to react to try and mitigate the hazard, such as by stopping or slowing movement of the vehicle.

As one example, the image analysis system can examine the image data using one or more techniques described in the '294 Application. For example, the image analysis system can perform operations similar to the examination system described in the '294 Application. The image analysis system can receive image data from one or more camera units disposed onboard one or more aerial devices and/or vehicles, convert the image data into wireframe model data, and examine changes in the wireframe model data over time and/or compare wireframe model data from image data obtained by different camera units (e.g., a camera unit onboard the aerial device and another camera unit disposed onboard the vehicle) to identify hazards in the route, predict when the route will need maintenance and/or repair, etc. The image data can be converted into the wireframe model data by identifying pixels or other locations in the image data that are representative of the same or common edges, surfaces, or the like, of objects in the image data. The pixels or other locations in the image data that represent the same objects, surfaces, edges, or the like, may be identified by the image analysis system by determining which pixels or other locations in the image data have similar image characteristics and associating those pixels or other locations having the same or similar image characteristics with each other.

The image characteristics can include the colors, intensities, luminance, locations, or other information of the pixels or locations in the image data. Those pixels or locations in the image data having colors (e.g., wavelengths), intensities, and/or luminance that are within a designated range of each other and/or that are within a designated distance from each other in the image data may be associated with each other by the image analysis system. The image analysis system can group these pixels or locations with each other because the pixels or locations in the image data likely represent the same object (e.g., a rail of a track being traveled by a rail vehicle, sides of a road, or the like).

The pixels or other locations that are associated with each other can be used to create a wireframe model of the image data, such as an image that represents the associated pixels or locations with lines of the same or similar colors, and other pixels or location with a different color. The image analysis system can generate different wireframe models of the same segment of a route from different sets of image data acquired by different camera units and/or at different times. The image analysis system can compare these different wireframe models and, depending on the differences between the wireframe models that are identified, identify and/or predict hazards such as damage to the route, and/or when maintenance and/or repair is needed for the route.

In one aspect, the image analysis system may have different predicted amounts of damage to the route associated with different changes in the wireframe data. For example, detection of a bend or other misalignment in the route based on changes in the wireframe model data may be associated with more damage to the route than other types of changes in the wireframe model data. As another example, the changing of a solid line in earlier wireframe model data to a segmented line in later wireframe model data can be associated with different degrees of damage to the route based on the number of segments in the segmented line, the size of the segments and/or gaps between the segments in the segmented line, the frequency of the segments and/or gaps, or the like. Based on the degree of damage identified from changes in the wireframe model data, the image analysis system may automatically order maintenance and/or repair of the route.

Figure 22:
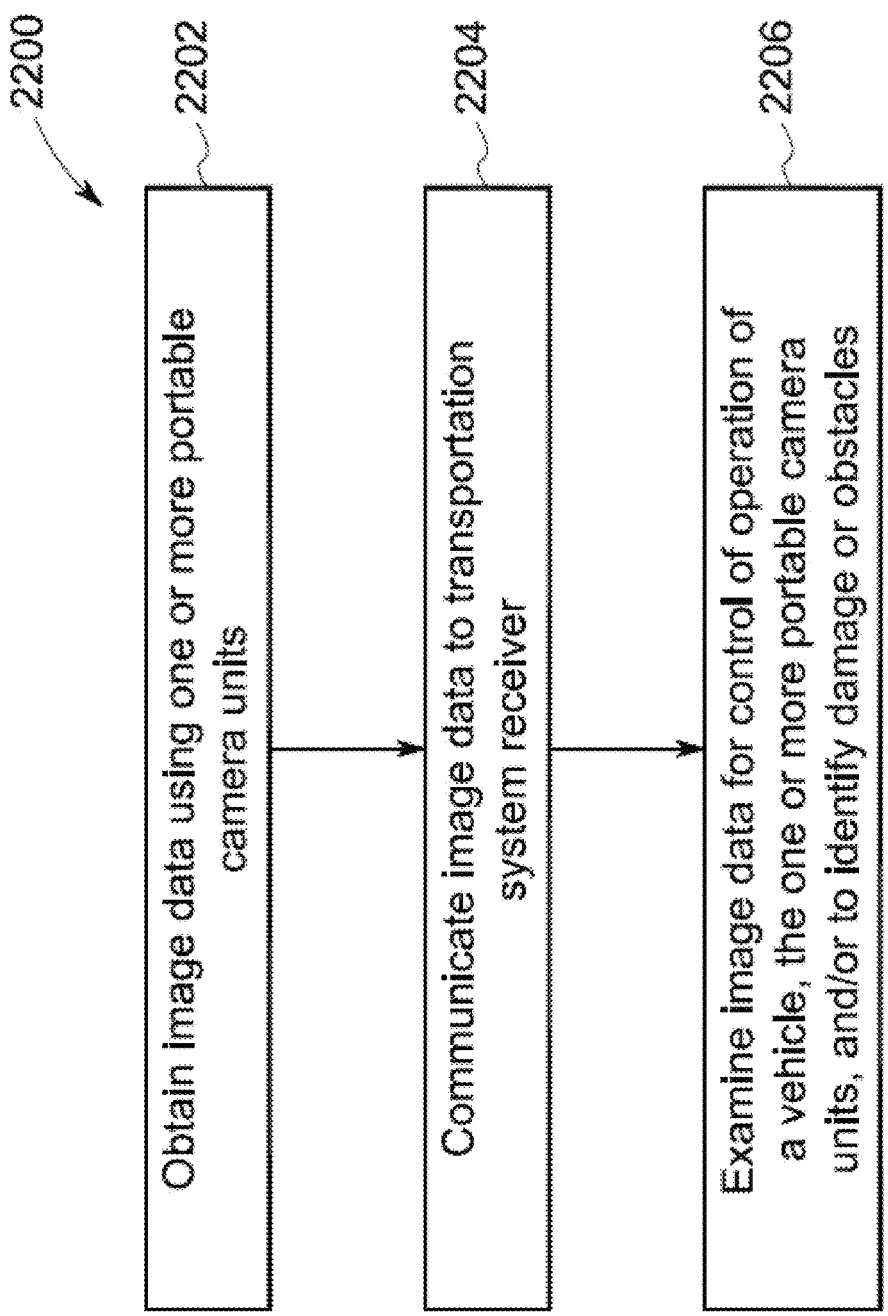
FIG. 22 illustrates a flowchart of one embodiment of a method for identifying route-related hazards.
Figure 23B:
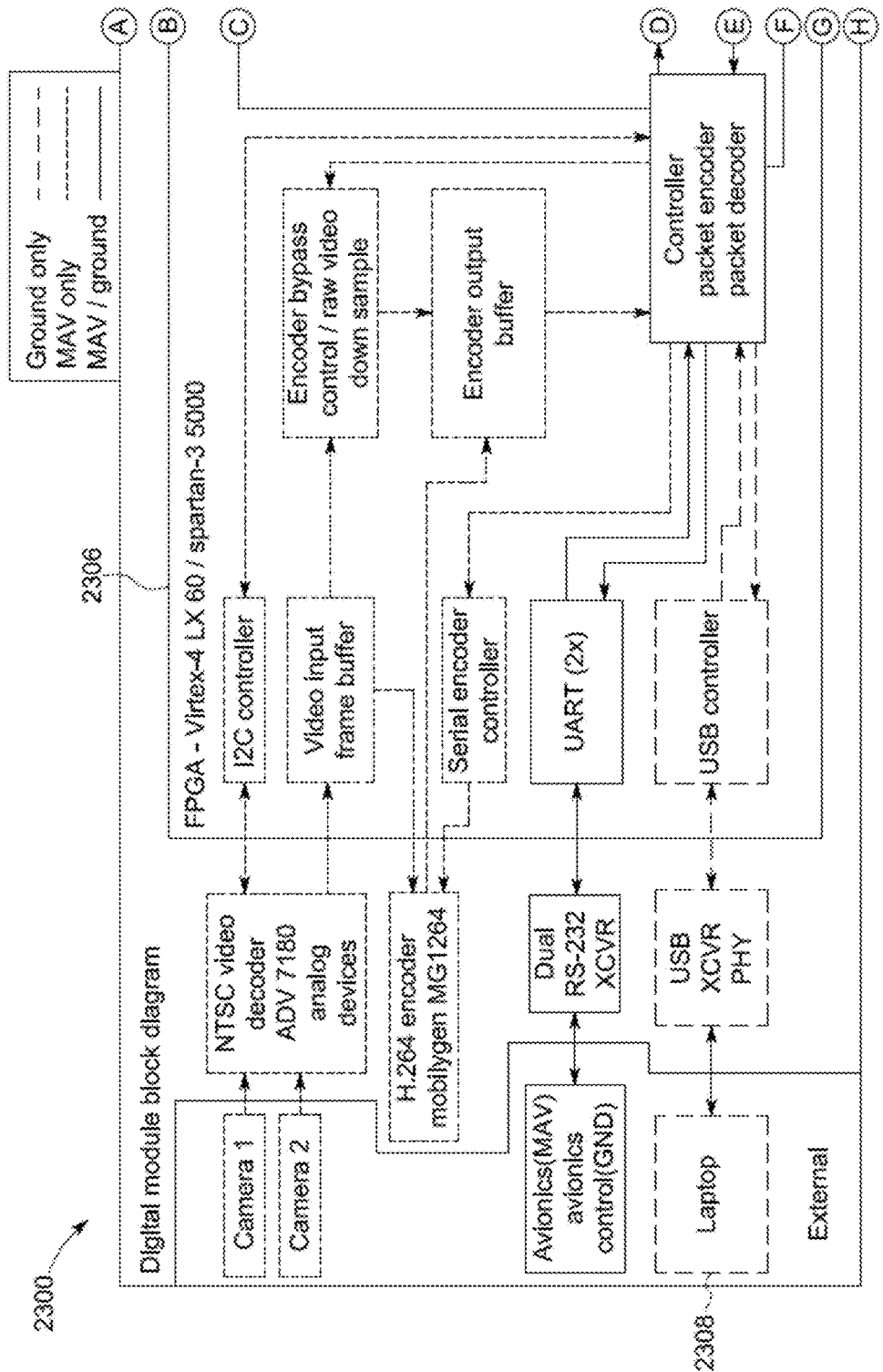
FIG. 23 (including sub-figures FIG. 23A, FIG. 23B, FIG. 23C, FIG. 23D, and FIG. 23E) illustrates a block diagram of one embodiment of the communication device shown in FIG. 1.
Figure 23C:
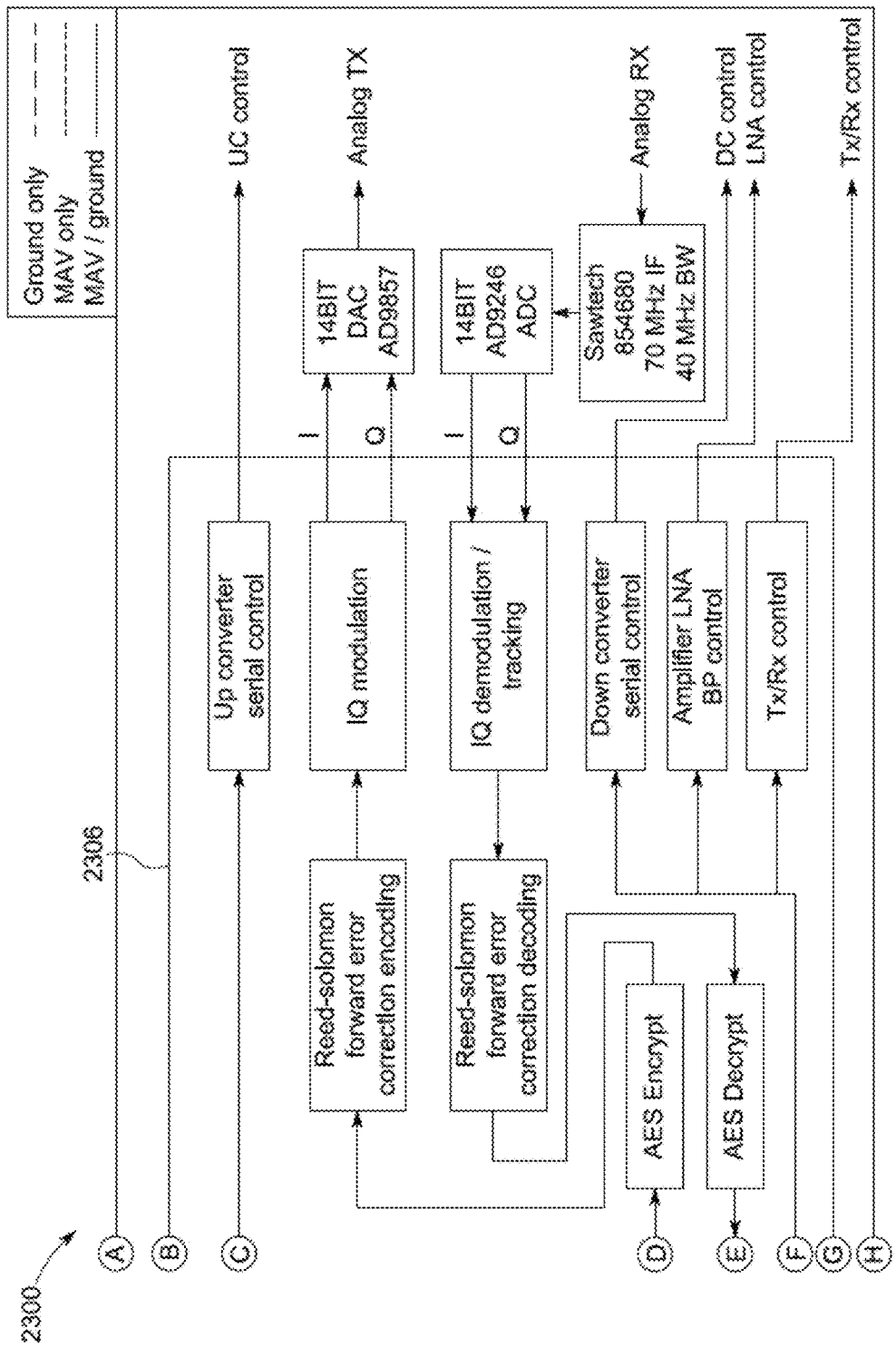
Figure 23D:
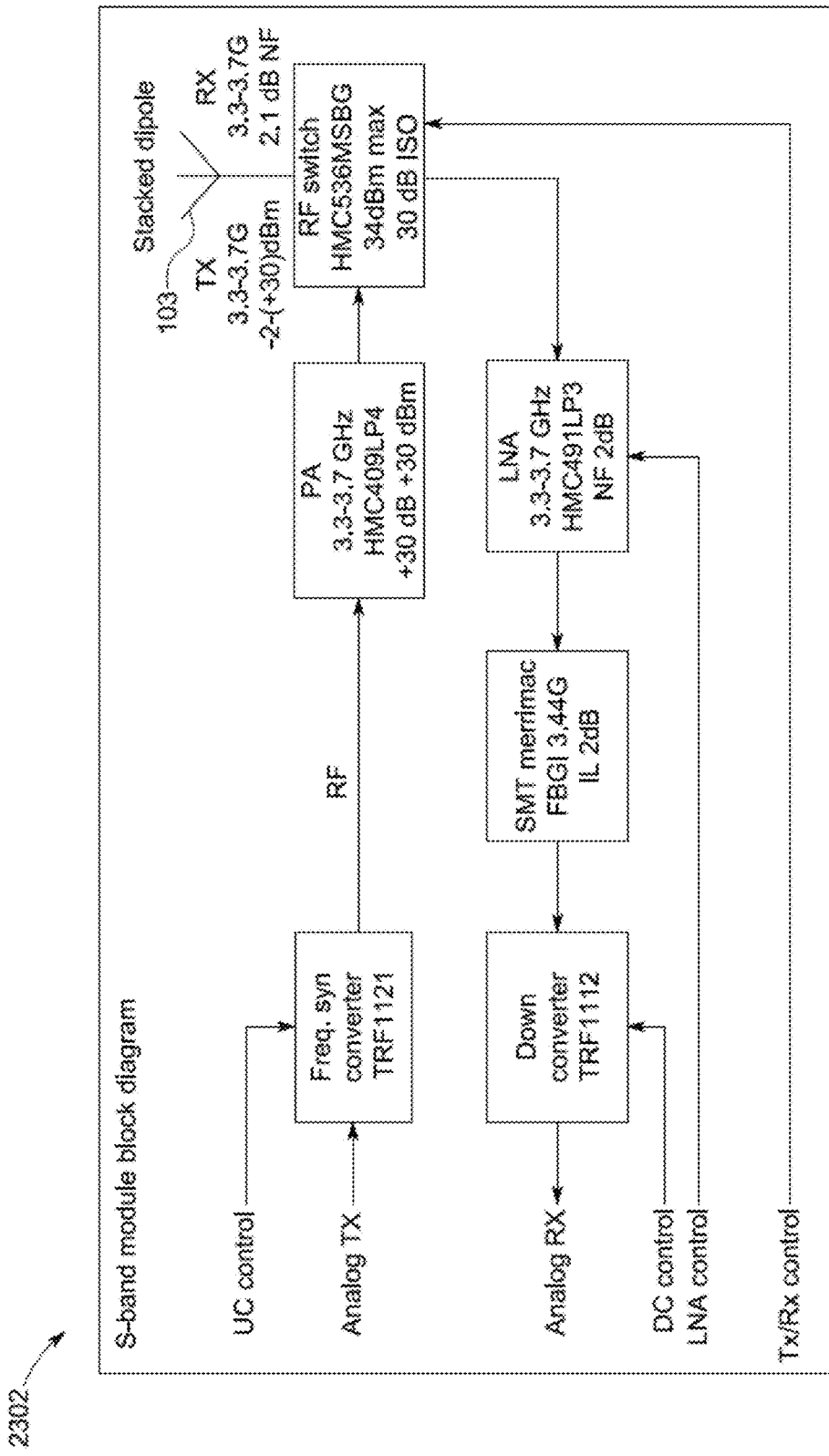
Figure 23E:
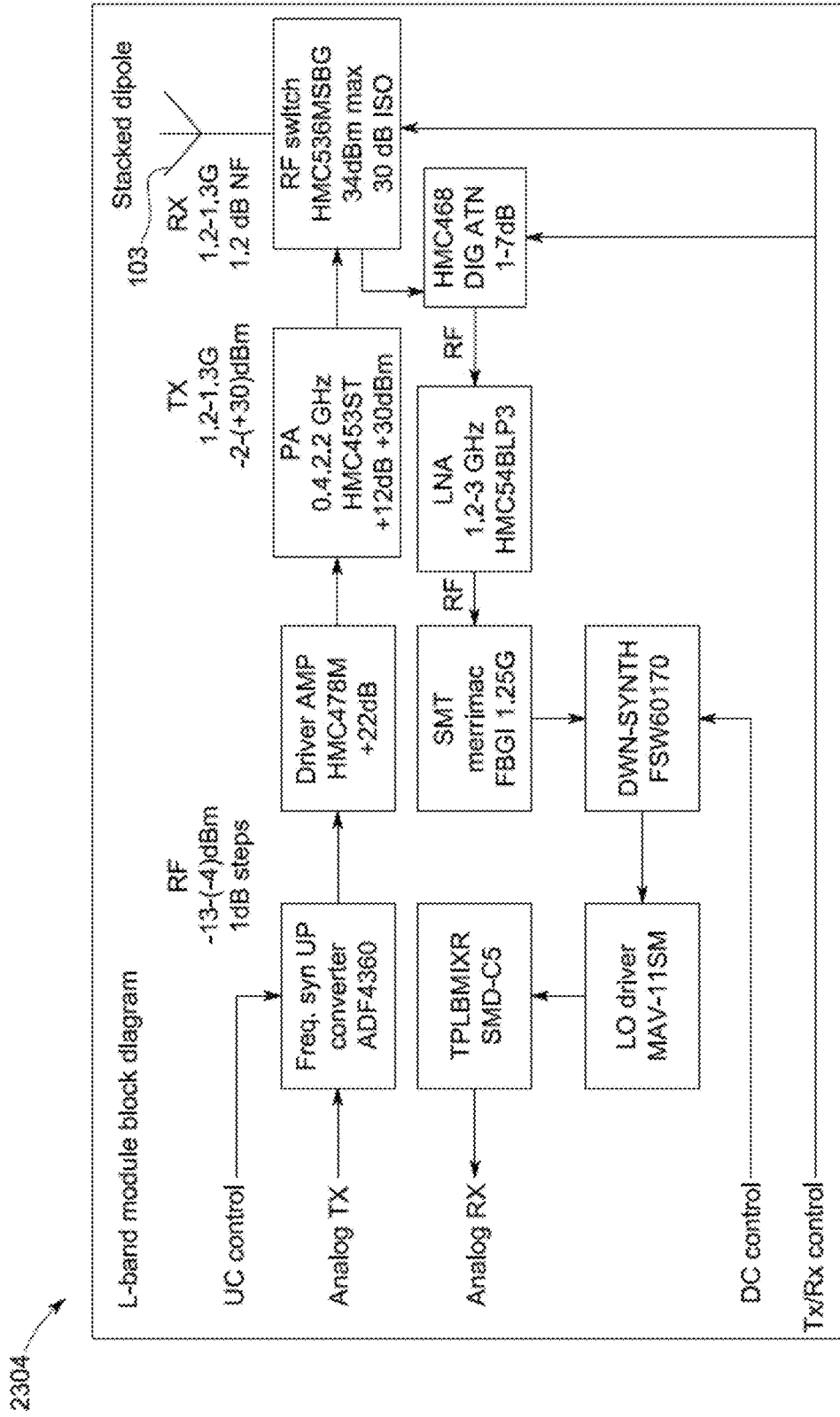

FIG. 22 illustrates a flowchart of one embodiment of a method 2200 for identifying route-related hazards. The method may be practiced by one or more embodiments of the systems described herein. At 2202, image data is obtained using one or more camera units. As described above, the portable camera units may be coupled to or otherwise disposed onboard one or more aerial devices flying outside of a vehicle. For example, the aerial device may fly ahead of the vehicle along a direction of travel to capture images and/or video of portions of the route being traveled by the vehicle ahead of the vehicle.

At 2204, the image data is communicated to the transportation system receiver. For example, the image data can be wirelessly communicated from the aerial device to the transportation system receiver disposed onboard the vehicle. The image data can be communicated as the image data is obtained, or may be communicated responsive to the vehicle and/or the aerial device entering into or leaving a designated area, such as a geo-fence.

At 2206, the image data is examined for one or more purposes, such as to control or limit control of the vehicle, to control operation of the camera unit, to identify damage to the vehicle, the route ahead of the vehicle, or the like, and/or to identify obstacles in the way of the vehicle. For example, if the camera unit is disposed onboard an aerial device flying ahead of the vehicle, then the image data can be analyzed to determine whether a hazard exists between ahead of the vehicle An image analysis system can examine the image data and, if it is determined that one or more hazards are disposed ahead of the vehicle, then the image analysis system can generate a warning signal that is communicated to the control unit of the vehicle. This warning signal can be received by the control unit and, responsive to receipt of this control signal, the control unit can prevent movement of the vehicle. For example, the control unit may disregard movement of controls by an onboard operator to move the vehicle, the control unit may engage brakes and/or disengage a propulsion system of the vehicle (e.g., turn off or otherwise deactivate an engine, motor, or other propulsion-generating component of the vehicle). In one aspect, the image analysis system can examine the image data to determine if the route is damaged (e.g., the rails on which a vehicle is traveling are broken, bent, or otherwise damaged), if obstacles are on the route ahead of the vehicle (e.g., another vehicle or object on the route), or the like.

In one embodiment, a system (e.g., an aerial camera system) includes a first aerial device, a first camera unit, and one or more image analysis processors. The first aerial device is configured to be disposed onboard a non-aerial vehicle as the non-aerial vehicle moves along a route. The first aerial device also can be configured to fly above the route during movement of the vehicle along the route. The first camera unit is configured to be disposed onboard the first aerial device and to generate first image data during flight of the first aerial device. The one or more image analysis processors are configured to examine the first image data and to identify a hazard disposed ahead of the non-aerial vehicle along a direction of travel of the non-aerial vehicle based on the first image data.

In one aspect, the first camera unit can be configured to generate the first image data representative of a segment of the route disposed ahead of the non-aerial vehicle and the one or more image analysis processors are configured to examine the segment of the route based on the first image data.

In one aspect, the one or more image analysis processors are configured to be disposed onboard the non-aerial vehicle and the first aerial device is configured to wirelessly communicate the first image data to the one or more image analysis processors during flight of the first aerial device off of the non-aerial vehicle.

In one aspect, the first camera unit is configured to be a forward-facing camera unit of the first aerial device that generates the first image data representative of an area ahead of the first aerial device along a direction of travel of the first aerial device. The system also can include one or more of a downward-facing camera unit configured to be disposed onboard the first aerial device and oriented in a downward direction to generate second image data representative of a portion of the route that is beneath the first aerial device or a rearward-facing camera unit configured to be disposed onboard the first aerial device and oriented in a rearward direction to generate third image data representative of a portion of the route that is between the first aerial device and the non-aerial vehicle.

In one aspect, the first aerial device is configured to communicate one or more of the second image data or the third image data to the one or more image analysis processors during flight of the first aerial device. The one or more image analysis processors can be configured to examine the one or more of the second image data or the third image data to identify the hazard.

In one aspect, the one or more image analysis processors are configured to receive the first image data generated by the first camera unit during flight of the first aerial device and to identify at least one of a broken component of the route or an obstacle on the route based on the first image data.

In one aspect, the system also includes a control unit configured to control the flight of the first aerial device. The control unit can be configured to autonomously prevent the first aerial device from flying outside of a three dimensional movement envelope disposed ahead of the non-aerial vehicle during the movement of the non-aerial vehicle.

In one aspect, the system also includes a second aerial device and a third aerial device, where each of the first aerial device, the second aerial device, and the third aerial device is configured to dock on the non-aerial vehicle to be charged by and travel with the non-aerial vehicle during movement of the non-aerial vehicle. During a time period that the first aerial device is flying off of the non-aerial vehicle, the second aerial device can be charged and landed on the non-aerial device and the third aerial device can be landed on and be in the process of being charged by the non-aerial device.

In one aspect, the non-aerial vehicle is a rail vehicle, and the route is a track on which the rail vehicle is configured to travel. The one or more image analysis processors can be configured to be disposed onboard the rail vehicle and the first aerial device configured to wirelessly communicate the first image data to the one or more image analysis processors during flight of the first aerial device off of the rail vehicle. The one or more image analysis processors also can be configured to receive the first image data generated by the first camera unit during flight of the first aerial device and to identify at least one of a broken component of the track or an obstacle on the track based on comparing the first image data to a benchmark visual profile of the track.

In one aspect, the one or more image analysis processors are configured to be disposed off-board the first aerial device, and the system also includes a communication device configured to be disposed onboard the first aerial device to wirelessly communicate the first image data to the one or more image analysis processors. The communication device can include one or more communication processors configured to communicate the first image data using one or more of L-band communication or S-band communication.

In another embodiment, a method (e.g., a method for identifying route-related hazards) includes generating first image data from a first camera unit disposed onboard a first aerial device that is configured to land on a non-aerial vehicle during movement of the non-aerial vehicle along a route. The first image data can be generated during flight of the first aerial device above the route being traveled by the non-aerial vehicle. The method also can include examining (using one or more image analysis processors) the first image data to identify a hazard disposed ahead of the non-aerial vehicle along a direction of travel of the non-aerial vehicle based on the first image data.

In one aspect, the first image data represents a segment of the route disposed ahead of the non-aerial vehicle and the hazard is identified by the one or more image analysis processors by examining the segment of the route based on the first image data.

In one aspect, the method also can include wirelessly communicating the first image data from the first aerial device to the one or more image analysis processors during flight of the first aerial device off of the non-aerial vehicle.

In one aspect, the first image data represents of an area ahead of the first aerial device along a direction of travel of the first aerial device, and the method also can include one or more of generating second image data from a downward-facing camera unit disposed onboard the first aerial device and representative of a portion of the route that is beneath the first aerial device and/or generating third image data from a rearward-facing camera unit disposed onboard the first aerial device and representative of a portion of the route that is between the first aerial device and the non-aerial vehicle.

In one aspect, the method also can include communicating one or more of the second image data or the third image data to the one or more image analysis processors during flight of the first aerial device, and examining (using the one or more image analysis processors) the one or more of the second image data or the third image data to identify the hazard.

In one aspect, the hazard is identified by the one or more image analysis processors as at least one of a broken component of the route or an obstacle on the route based on the first image data.

In one aspect, the method also can include controlling the flight of the first aerial device by autonomously preventing the first aerial device from flying outside of a three dimensional movement envelope disposed ahead of the non-aerial vehicle during the movement of the non-aerial vehicle.

In one aspect, the non-aerial vehicle is a rail vehicle, the route is a track on which the rail vehicle is configured to travel, and the one or more image analysis processors are disposed onboard the rail vehicle. The method also can include wirelessly communicating the first image data to the one or more image analysis processors during flight of the first aerial device off of the rail vehicle, receiving the first image data generated by the first camera unit during flight of the first aerial device, and identifying at least one of a broken component of the track or an obstacle on the track based on comparing the first image data to a benchmark visual profile of the track.

In another embodiment, another system (e.g., another camera system) includes a first aerial device configured to land and dock to a non-aerial vehicle as the non-aerial vehicle moves along a route. The first aerial device also can be configured to fly off of the non-aerial vehicle and fly ahead of the non-aerial vehicle along a direction of travel of the non-aerial vehicle along the route. The system also can include a first camera unit configured to be disposed onboard the first aerial device and to generate first image data representative of a portion of the route ahead of the non-aerial vehicle during movement of the non-aerial vehicle along the route. The system also can include a second aerial device configured to land and dock to the non-aerial vehicle as the non-aerial vehicle moves along a route. The second aerial device also can be configured to fly off of the non-aerial vehicle and fly ahead of the non-aerial vehicle along the direction of travel of the non-aerial vehicle along the route. A second camera unit configured to be disposed onboard the second aerial device and to generate second image data representative of the portion of the route ahead of the non-aerial vehicle during movement of the non-aerial vehicle along the route also can be included in the system. The system can include one or more image analysis processors configured to be disposed onboard the non-aerial vehicle and to receive the first image data and the second image data. The one or more image analysis processors can be configured to identify a hazard along the route ahead of the non-aerial vehicle.

In one aspect, the one or more image analysis processors are configured to one or more of: generate a warning signal to notify an operator of the non-aerial vehicle of the hazard and/or automatically control movement of the non-aerial vehicle responsive to the hazard being identified.

In one aspect, only one of the first aerial device or the second aerial device flies off of the non-aerial vehicle at a time.

In one aspect, the system also can include a control unit configured to control flight of the first aerial device and the second aerial device. The control unit also can be configured to prevent the first aerial device and the second aerial device from flying outside of a three dimensional movement envelope defined ahead of the non-aerial vehicle.

In one aspect, the control unit is configured to change a size of the movement envelope based on one or more of a speed of the non-aerial vehicle, a coefficient of friction between the route and the non-aerial vehicle, a grade of the route, and/or a radius of curvature of the route.

In one aspect, the non-aerial vehicle is a rail vehicle, and the route is a track on which the rail vehicle is configured to travel. The one or more image analysis processors can be configured to be disposed onboard the rail vehicle and one or more of the first aerial device or the second aerial device is configured to wirelessly communicate one or more of the first image data or the second image data to the one or more image analysis processors during flight of the one or more of the first aerial device or the second aerial device off of the rail vehicle. The one or more image analysis processors also can be configured to receive the one or more of the first image data or the second image data generated by one or more of the first camera unit or the second camera unit during flight of the one or more of the first aerial device or the second aerial device and to identify at least one of a broken component of the track or an obstacle on the track based on comparing the one or more of the first image data or the second image data to a benchmark visual profile of the track.

Figure 24:
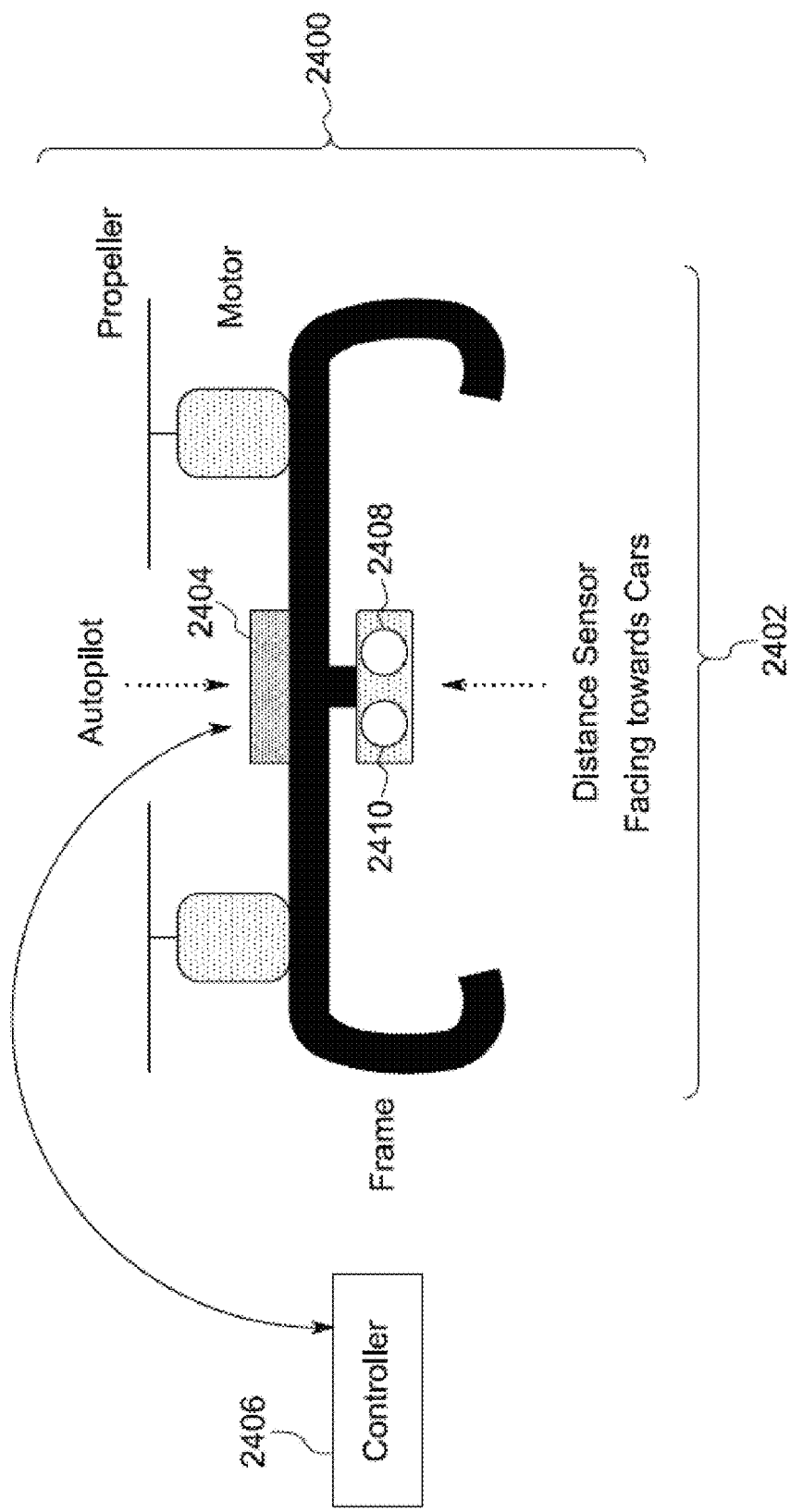
FIG. 24 illustrates one embodiment of an aerial system.

FIG. 24 illustrates one embodiment of an aerial system 2400. The aerial system 2400 can be used to determine a size parameter (e.g., length) of a vehicle system (e.g., a train) and/or a number of vehicles (e.g., cars) in the vehicle system using an airborne or aerial vehicle 2402. The aerial vehicle 2402 can represent one or more of the aerial devices described herein. In one aspect, the aerial vehicle 2402 is a miniature unmanned aerial vehicle (MAVs). A MAV can include a hand-held, human portable flying machines that are either remotely controlled by a human being (e.g., via a remote control) or by an onboard autopilot system (e.g., an onboard controller 2404). MAVs can have different configurations like fixed-wing or multi-rotor, and also may be referred to as drones.

The size parameter can include a length of the vehicle system (e.g., the distance from a front end of the train to an opposite, rear end of the train along a linear and/or undulating path of the train), a number of vehicles in the vehicle system, a weight of the vehicle system (e.g., a designated, calculated, estimated, or measured weight of the vehicles times the number of vehicles in the vehicle system), or another measurement representative of the size of the vehicle system. These size parameters can be important information for control systems of the vehicle systems, and having accurate measurements of the size parameters can improve the functionality of these control systems.

For example, the size parameters can improve another technology or technical field by improving the functionality of control systems 2406 of vehicle systems. These control systems 2406 optionally can be referred to as vehicle controllers, and can automatically or direct manual control or limit operations of the vehicle systems to ensure safe operation of the vehicle systems. Examples of such control systems include Automatic Train Protection (ATP), Automatic Train Control (ATC), Automatic Train Operation (ATO), Trip Optimizer, etc. These types of systems can prevent vehicle systems from traveling too fast in designated locations, from entering into certain areas, etc. Optionally, these systems can determine braking profiles that designate how quickly the vehicle systems can stop or slow down if needed. Optionally, these systems can designate operational settings (e.g., speeds, throttle settings, brake settings, etc.) of the vehicle systems as a function of time and/or distance along a route. Knowing the size parameters can allow these systems to more accurately determine how quickly the vehicle systems can slow or stop, how quickly the vehicle systems can accelerate or decelerate without damaging the vehicle systems, how fast the vehicle systems can travel (e.g., around curves) without risking derailment, etc.

In one aspect, an operator of the vehicle system can manually enter the size parameters (e.g., vehicle system length and count of vehicles in the vehicle system) into a control system of the vehicle system before movement or during a self-test of the vehicle system. These parameters may be initially determined by manual inspection of the vehicle system. If the manually determined and entered size parameters are inaccurate, then the control systems of the vehicle systems may not accurately control or limit control of the vehicle systems.

The system 2400 may determine the length of the vehicle system and/or number of vehicles in the vehicle system autonomously using the airborne vehicle 2402 equipped with one or more sensors 2408, 2410. The sensors 2408, 2410 can include a variety of different sensors, or a single type of sensor, as described herein. In one aspect, the sensor 2408 represents a distance sensor while the sensor 2410 represents another sensor. Alternatively, the sensors 2408, 2410 may both be distance sensors or other types of sensors. The vehicle 2402 may have autonomous maneuver capabilities made possible by an autopilot system of the aerial controller 2404 (which can represent hardware circuitry that includes and/or is connected with one or more processors such as field programmable gate arrays, integrated circuits, microprocessors, etc., inertial measurement units, and/or global positioning system receivers). The inertial measurement units (IMUs) can give several degrees of freedom possible by accelerometers, gyroscopes, magnetometers, and barometers available on-board the vehicle 2402. The location and speed of the vehicle 2402 can be determined using a global positioning system (GPS) receiver or the combination of the sensors 2408, 2410 onboard (the sensors 2408, 2410 optionally may represent a global positioning system receiver). Other examples of the sensors 2408, 2410 can include distance sensors (described herein), cameras, and other application-specific sensors.

The vehicle 2402 may fly autonomously given a flight plan (typically a series of GPS waypoints) configurable by a ground station (typically a laptop or handheld device). The vehicle 2402 can use GPS, altitude, or distance sensors to determine altitude and can fly at a stable height too. The vehicle 2402 may have different configurations, such as fixed-wing with one rotor in front or multirotor with different frames. The vehicle 2402 shown in FIG. 24 represents a quad-copter vehicle having one or more motors and propellers that operate to lift and move the vehicle 2402.

One or more of the sensors 2408, 2410 can include a distance sensor that can determine a spatial distance between an object in proximity of the sensor and the sensor. Such as distance sensor can include an ultrasonic transducer, an infrared light detector, a radar detector, a laser detector, a laser or other light sensor, a LIDAR sensor, etc. Optionally, the sensors 2408, 2410 can include a camera, electromagnetic sensor (e.g., radio frequency identification, or RFID, interrogator), GPS receiver, or the like, as described herein.

Figure 25:
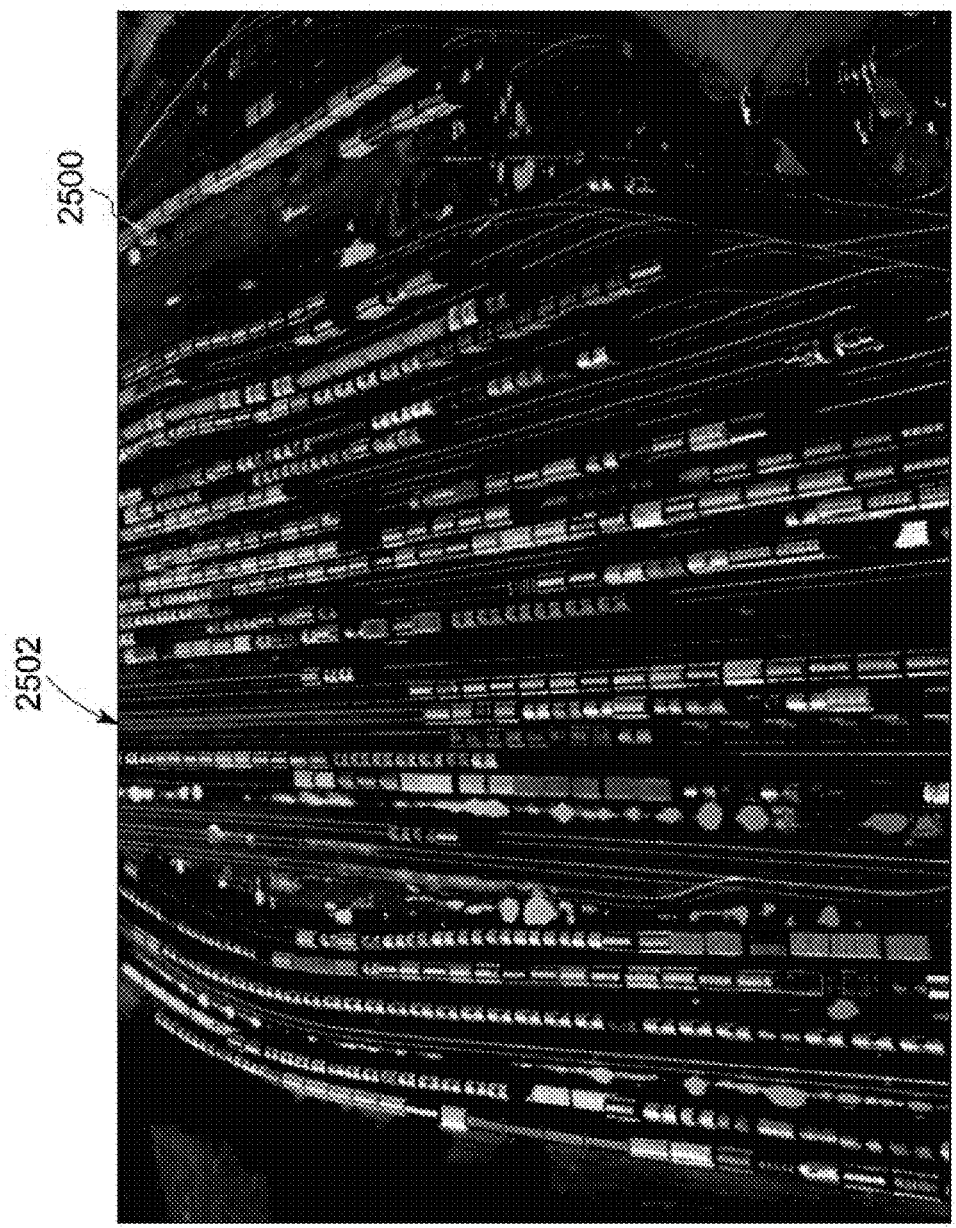
FIG. 25 illustrates several vehicle systems disposed on several routes.

FIG. 25 illustrates several vehicle systems 2500 disposed on several routes 2502. The vehicle systems 2500 can represent vehicles and/or vehicle consists described above. The routes 2502 shown in FIG. 25 can represent rail tracks in a rail yard, but optionally can represent main line tracks, siding tracks, paved roads, unpaved roads, waterways, or the like.

Some vehicle control systems 2406 can require the operator to initiate a self-test before each vehicle system 2500 departs the yard. The self-test is also known as a departure test. The one or more size parameters (e.g., length of the vehicle system 2500 and number of vehicles in the vehicle system) may be input into the control systems 2406 before initiating or during the departure test. The aerial vehicle 2402 can determine and provide one or more of the size parameters and communicate the size parameter(s) as a size signal 2412 that is wirelessly communicated to the vehicle controller 2406 and/or is downloaded from the aerial vehicle 2402 (e.g., via a memory or cable that is input into the controller 2404).

Figure 26:
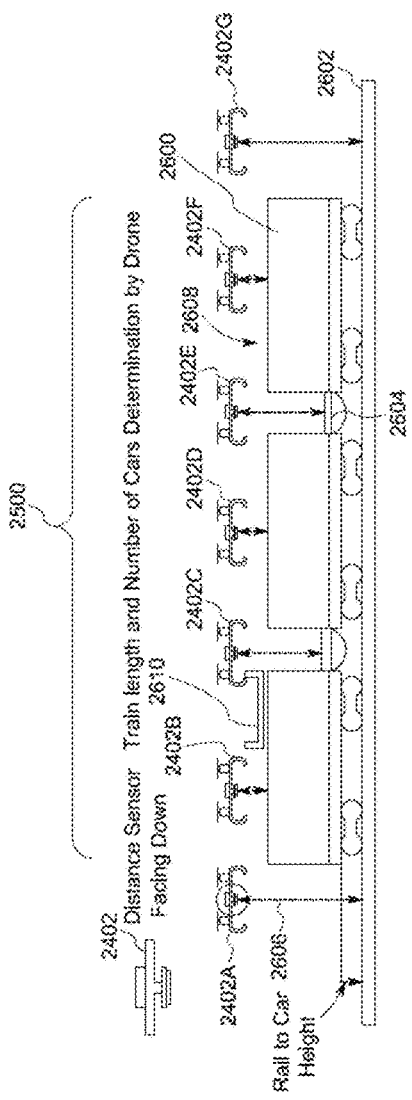
FIG. 26 illustrates one embodiment of operation of the aerial system shown in FIG. 24.

FIG. 26 illustrates one embodiment of operation of the aerial system 2400 shown in FIG. 24. The aerial vehicle 2402 can fly at a constant altitude and speed (or at an altitude and/or speed that varies) above the vehicle system 2500 as shown in FIG. 26. Optionally, the aerial system 2400 may be stationary while the vehicle system 2500 moves relative to the aerial system 2400. For example, the aerial vehicle 2402 may hover in one location above the vehicle system 2500 while the vehicle system 2500 moves beneath the aerial vehicle 2402. Alternatively, the system 2400 may not include the aerial vehicle 2402 and the distance sensor 2408, 2410 may be mounted or fixed to a surface above the vehicle system 2500 as the vehicle system 2500 moves relative to the sensor 2408, 2410.

The vehicle system 2500 includes several vehicles 2600 that travel together along a route 2602, such as a track, road, etc. The vehicles 2600 can represent one or more propulsion-generating vehicles and/or non-propulsion-generating vehicles described above. The vehicles 2600 can be mechanically connected with each other by couplers 2604. Optionally, the vehicles 2600 may not be mechanically connected with each other, but can travel along the route 2602 by communicating with each other such that the vehicles 2600 travel together as the vehicle system 2500.

The distance sensor 2408 can measure spatial distances 2606 between the distance sensor 2408 and the object or surfaces beneath the distance sensor 2408. Several different locations of the aerial vehicle 2402 are shown in FIG. 26 as 2402A-G, which can represent the flight path of the aerial vehicle 2402 and the locations of the aerial vehicle 2402 at different times. As shown in FIG. 26, the spatial distances 2606 measured by the distance sensor 2408 change at different times and/or locations of the aerial vehicle 2402. For example, in the location of the aerial vehicle 2402A, 2402G, the spatial distance 2606 is longer because the distance 2606 is measured from the distance sensor 2408 to the route 2602 or another surface that is lower than the vehicle system 2500. In the locations of the aerial vehicles 2402C, 2402E, the distance 2606 is shorter because the distance 2606 is measured from the distance sensor 2408 to platforms of the vehicles 2600 or the couplers 2604. In the locations of the aerial vehicles 2402B, 2402D, 2402F, the distance 2606 is even shorter because the distance 2606 is measured from the distance sensor 2408 to top or upper sides 2608 of the vehicles 2600.

In one embodiment, the relative speed difference between the aerial vehicle 2402 and the vehicle system 2500 may remain constant or substantially constant (e.g., the differences in speed between the aerial vehicle 2402 and the vehicle system 2500 may not change with respect to time or may change within designated limits, such as 1%, 3%, 5%, or 10%). The distance sensor 2408 may periodically or continually measure the spatial distances 2606, or may measure the spatial distances 2606 in a non-periodic manner. In one aspect, the distance sensor 2408 can determine the locations of the distance sensor 2408 at the times that the spatial distances 2606 are measured.

Figure 27:
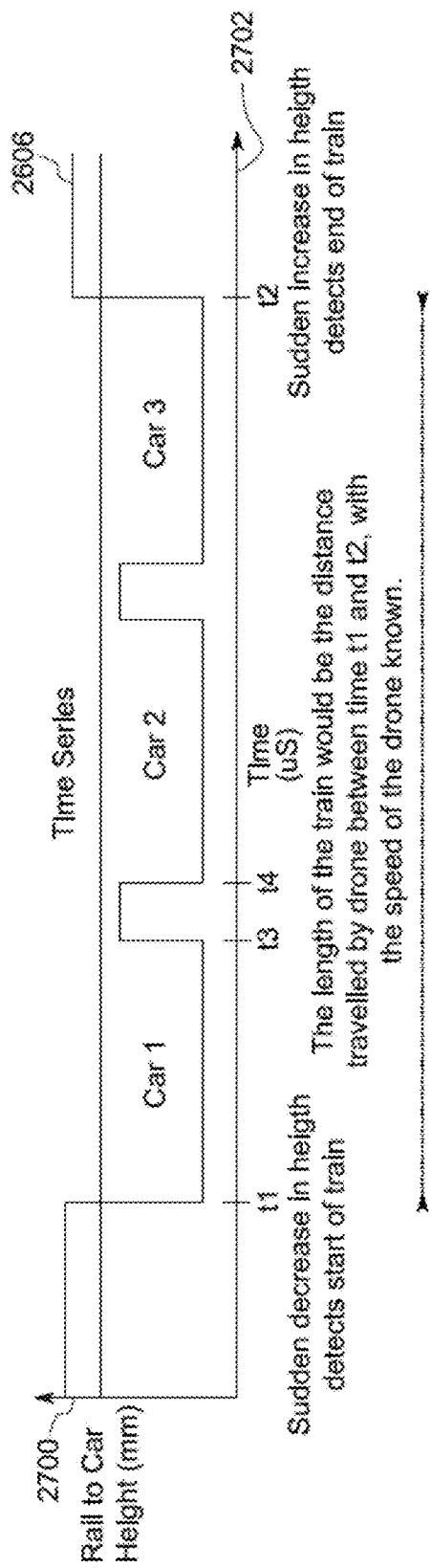
FIG. 27 illustrates spatial distances measured by distance sensor as shown in FIG. 26 according to one example.

FIG. 27 illustrates the spatial distances 2606 measured by the distance sensor 2408 as shown in FIG. 26 according to one example. The spatial distances 2606 are shown alongside a vertical axis 2700 representative of the separation distances 2606 and a horizontal axis 2702 representative of time or distance along the length of the vehicle system 2500.

As shown in FIG. 27, the spatial distances 2606 are largest when the distance sensor 2408 is measuring distances to the ground or route 2602, smallest when the distance sensor 2408 is measuring distances to the top sides 2608 of the vehicles 2600, and at intermediate distances when the distance sensor 2408 is measuring distances to the couplers 2604 or platforms of the vehicles 2600. For example, when there is no car beneath the distance sensor 2408, the distance sensor 2408 will determine its height relative to the route 2602. The controller 2404 or the controller 2406 can identify the location of the distance sensor 2408 when the spatial distance 2606 first decreases (e.g., at time or location t1 in FIG. 27) as one end of the vehicle system 2500 and can identify the location of the distance sensor 2408 when the spatial distance 2606 last increases from a lower distance to the distance prior to t1 (e.g., at time or location t2 in FIG. 27) as the opposite end of the vehicle system 2500. Based on the relative speed of the aerial vehicle 2402 to the vehicle system 2500 and the difference between times t1 and t2, the length of the vehicle system 2500 can be calculated by the controller 2404 or the controller 2406 as a size parameter. Alternatively, the length may be determined by the difference between the locations of the aerial vehicle 2400 at t1 and t2 and the flight path of the aerial vehicle 2400 between those locations.

When there is vehicle 2600 below the distance sensor 2408, the spatial distance 2606 decreases. When there is gap between two adjacent vehicles 2600, the spatial distance 2606 is more than when the vehicle 2600 is beneath the distance sensor 2408 but less than when the vehicle system 2500 is not beneath the distance sensor 2408. This can be used to count the number of vehicles 2600 in the vehicle system 2500 and/or the length of each vehicle 2600 as size parameters. For example, based on the relative speed of the aerial vehicle 2402 to the vehicle system 2500 and the difference between times at which the spatial distance 2606 increases after t1, the length of the first vehicle 2600 can be determined. Based on the relative speed of the aerial vehicle 2402 to the vehicle system 2500 and the difference between t1 and the time at which the spatial distance 2606 increases after t1 (e.g., time t3 in FIG. 27), the length of the first vehicle 2600 can be determined. Based on the relative speed of the aerial vehicle 2402 to the vehicle system 2500 and the difference between t3 and the time at which the spatial distance 2606 decreases after t3 (e.g., time t4 in FIG. 27), the length of a gap between the first and second vehicle 2600 can be determined. Additional determinations of the lengths of other vehicles 2600 and/or gaps between the vehicles 2600 in the vehicle system 2500 can be determined in a similar manner. Alternatively, the lengths of the vehicles 2600 and/or the gaps may be determined by the difference between the locations of the aerial vehicle 2400 at the corresponding times of increases or decreases in the spatial distances 2606 and the flight path of the aerial vehicle 2400 between those locations.

The controller 2404 and/or controller 2406 may identify the changes in the spatial distances 2606 as being representative of a gap between vehicles 2600 responsive to the spatial distance 2606 increasing (e.g., during the time t3 to t4) to an increased distance for at least a designated, non-zero period of time. This designated time can be based on the relative speeds of the aerial vehicle 2402 and the vehicle system 2500 to prevent the controller 2404, 2406 from identifying higher frequency changes in the spatial distances 2606 from erroneously being identified as gaps between the vehicles 2600.

Figure 28:
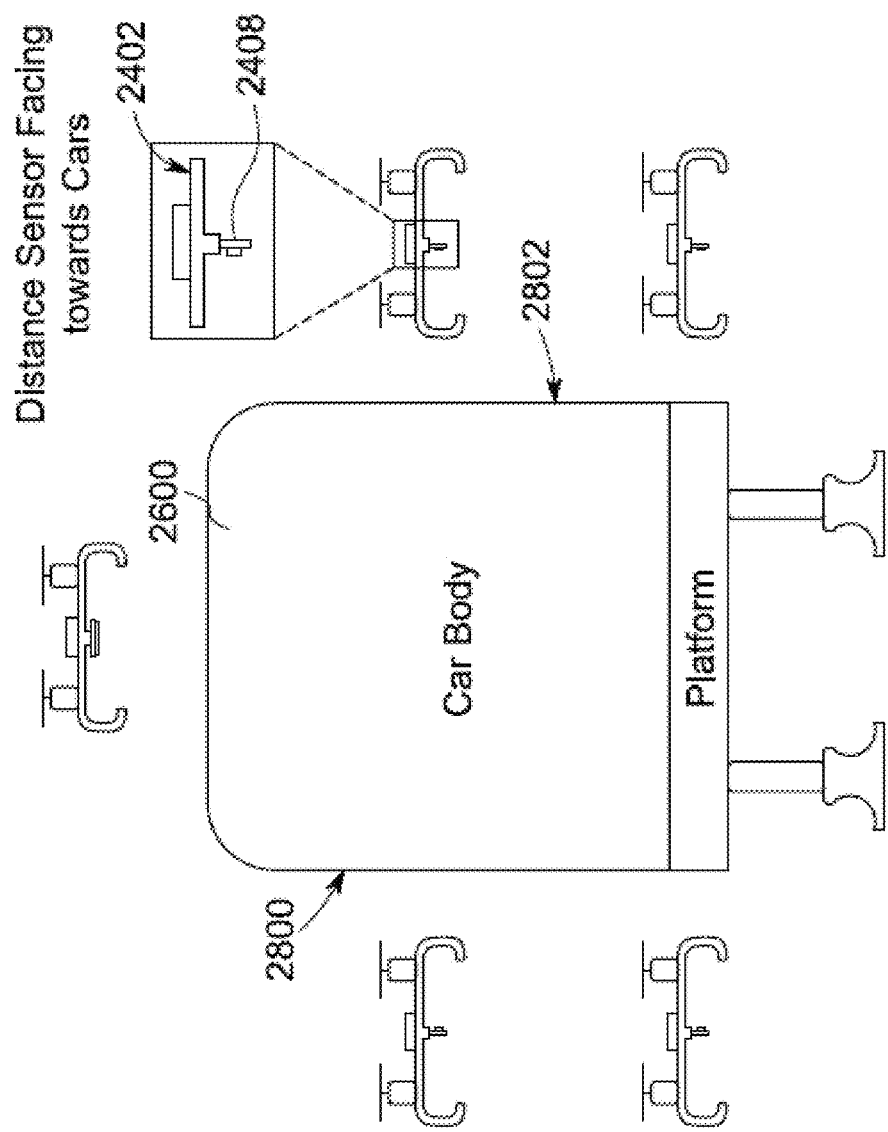
FIG. 28 illustrates operation of the aerial system according to another embodiment.

FIG. 28 illustrates operation of the aerial system 2400 according to another embodiment. A similar process for determining the size parameters of the vehicle system 2500 and/or vehicles 2600 may be used with the aerial vehicle 2402 flying along one or more lateral sides 2800, 2802 of the vehicle system 2500. The distance sensor 2408 may be oriented to point at the lateral sides 2800, 2802 of the vehicles 2600 or platforms of the vehicles 2600 so that the distance sensor 2408 measures the spatial distances 2606 to the side 2800 or 2802. The spatial distances 2606 may change in a manner similar to the aerial vehicle 2402 flying above the vehicle system 2500 and be examined to determine the size parameters of the vehicle system 2500 and/or vehicles 2600.

The controller 2404 and/or 2406 can determine a length between opposite ends of the vehicle system 2500, a number of the vehicles 2600 in the vehicle system 2500, a length of one or more vehicles 2600, a weight of the vehicle system 2500, and/or a weight of one or more of the vehicles 2600 as the size parameter of the vehicle system 2500 based on the spatial distances 2606 that are measured. The weight of the vehicle system 2500 may be determined by multiplying the number of vehicles 2600 by a designated weight representative of a single vehicle 2600. In one embodiment, the controller 2404, 2406 may associate different vehicle lengths with different vehicle weights (e.g., in a memory) and, based on the determined vehicle length, determine the associated vehicle weight. The memories described herein may be located onboard the aerial vehicles or ground-based vehicles 2600, or may be communicatively coupled with controllers 2404, 2406 via one or more network connections (but not be located onboard the aerial or ground-based vehicles).

The controller 2404, 2406 can identify a break in a coupler 2604 between adjacent vehicles 2600 based on the spatial distances 2606 that are measured. For example, prior to the break, the length of a gap between the adjacent vehicles 2600 can be determined one or more times based on the spatial distances 2606, as described above. If the length of the gap exceeds a designated threshold, then the controller 2404, 2406 can determine that a break in the coupler 2604 is likely to happen or will happen. Responsive to identifying this likely or upcoming break, the controller 2404, 2406 can communicate an alert signal to an output device (e.g., a monitor, speaker, touchscreen, or the like). The alert signal can notify an operator of the vehicle system 2500 of the break or impending break, and/or can automatically slow or stop movement of the vehicle system 2500 (e.g., by automatically engaging one or more brakes of the vehicle system 2500 and/or decreasing a throttle position of the vehicle system 2500).

In one aspect, the controller 2404, 2406 can account for changes in the size parameter and/or length of the gap between the adjacent vehicles 2600 based on a direction of flight of the aerial vehicle 2402. The controller 2404 can monitor the direction of flight and/or speed of the aerial vehicle 2402 and communicate the direction of flight and/or speed to the controller 2406. The controller 2406 can examine the spatial distances 2606, the time periods between changes in the spatial distances 2606, the direction of flight, and the speed of the aerial vehicle 2402 to determine the size parameters. For example, the controller 2406 can subtract a vector representing the direction of travel and speed of the vehicle system 2500 from the vector representing the direction of travel and speed of the aerial vehicle 2402 to define a net vector. This net vector may be used to determine how far (along the length of the vehicle system 2500) that the changes in the separation distance 2606 are from each other.

The controller 2404, 2406 can identify a change in the length of couplers 2604 between adjacent vehicles 2600 based on the spatial distances 2606 that are measured. For example, the lengths of gaps between the adjacent vehicles 2600 can be determined one or more times based on the spatial distances 2606, as described above. Based on changes in these gaps, the controller 2404, 2406 can determine or identify segments of the vehicle system 2500 having couplers 2604 in tension, in compression, or in neither tension nor compression. The controller 2406 can then determine the slack state of the different segments of the vehicle system 2500 and control (e.g., automatically or notify an operator) the vehicle system 2500 based on the slack state (e.g., refrain from accelerating one portion of a train that is separated from another portion of the train with the couplers in between being in tension).

The type of vehicle can be determined based on the size parameters. For example, different types of vehicles may have different heights at different locations on the vehicles. The controller 2404 and/or 2406 can determine different spatial distances above a vehicle at different locations, compare these spatial distances to one or more designated profiles of spatial distances, and determine if the spatial distances match or otherwise correspond with the designated profiles. The profiles may be associated with different types of vehicles such that the controller 2404, 2406 can use machine learning algorithms to autonomously identify the type of vehicle based on the spatial distances.

In one embodiment, the aerial controller 2404 can include a memory that stores a route database having locations of curves in the route 2602 and/or grades of the route 2602 at various locations. The controller 2404 can autonomously control the altitude and/or direction of flight of the aerial vehicle 2402 based on this information and the current location of the aerial vehicle 2402. For example, the controller 2404 can control the altitude and/or direction of flight to ensure that the aerial vehicle 2402 maintains a designated separation distance 2606 between the aerial vehicle 2402 and the top side 2608 of the vehicles 2600 in the vehicle system 2500 based on where the one or more curves and/or grades are located. The controller 2404 may control the aerial vehicle 2402 to keep the aerial vehicle 2402 a designated distance from the largest height of all of the vehicles 2600 in the vehicle system 2500 to ensure that the aerial vehicle 2402 is at a sufficient altitude to avoid collision with the vehicles 2600, may control the aerial vehicle 2402 to keep the aerial vehicle 2402 a designated distance from an average of the heights of the vehicles 2600 in the vehicle system 2500, or a designated distance from another height.

In addition to or as an alternate from flying the aerial vehicle 2402 according to the curves and/or grades of the route 2602, one or more of the controllers 2404, 2406 can modify the measured spatial distances 2606 based on the curves and/or grades to account for the changing curves and/or grades. For example, the controller 2404, 2406 may increase the measured spatial distances 2606 during a time period that the vehicle system 2500 is traveling up an inclined grade to account for the top sides of the vehicles 2600 moving closer to the aerial vehicle 2402 due to the grade and/or may decrease the measured spatial distances 2606 during a time period that the vehicle system 2500 is traveling down a declined grade to account for the top sides of the vehicles 2600 moving farther to the aerial vehicle 2402. With respect to curves in the route 2602, the controller 2404, 2406 may modify measured lengths of the vehicle system 2500, the vehicles 2600, and/or the gaps between the vehicles 2600 to account for changes caused by the curves in the route 2602.

As described above, different controllers 2406 of the vehicle system 2500 may obtain or determine the size parameters and use the size parameters for control of the vehicle system 2500. The controller 2406 can determine trip plans for the vehicle system 2500 that designate operational settings (e.g., speeds, throttle settings, or brake settings) of the vehicle system 2500 as a function of time and/or distance along the route 2602 in order to reduce fuel consumed and/or emissions generated by the vehicle system 2500 relative to the vehicle system 2500 traveling according to other settings. The operational settings can be based on the size parameters and the controller 2406 can automatically control movement of the vehicle system 2500 or can direct an operator how to control the vehicle system 2500 according to the trip plan. As another example, the controller 2406 can determine a braking profile for the vehicle system 2500. The braking profile can designate the brake settings of the vehicle system 2500 that are to be used to cause the vehicle system 2500 to stop within a designated distance (e.g., of a designated location). Because the stopping distance for the vehicle system 2500 can be based on the length and/or weight of the vehicle system 2500, the controller 2406 can use the size parameters determined from the distance sensor 2408 to determine the braking profile.

As described above in connection with FIG. 24, the sensor 2410 shown in FIG. 24 may represent a sensor other than a distance sensor. For example, the sensor 2410 may represent an altitude sensor that measures an altitude of the aerial vehicle 2402. The controller 2404 and/or 2406 may use the measured altitude in order to correct or modify the spatial distances 2606 measured by the distance sensor 2408. For example, if wind or other factors cause the altitude of the aerial vehicle 2402 to change over time during measurements of the spatial distances 2606, then the controller 2404, 2406 can modify the measured spatial distances 2606 to remove the contribution of the changing altitude.

In another example, the sensor 2410 can represent a vehicle identification sensor that examines the vehicles 2600 to identify the vehicles 2600. Different vehicles 2600 may be associated with different designated vehicle lengths (e.g., in a memory accessible to the controller 2404 and/or 2406, and responsive to identifying a vehicle 2600 using the sensor 2410, the controller 2404 and/or 2406 can determine the vehicle length. The sensor 2410 can be a camera that obtains images and/or videos of the vehicles 2600 and, by comparing the images and/or videos to templates or other shapes representative of different vehicles 2600 and/or vehicle lengths, the controller 2404 and/or 2406 can identify the vehicles 2600 and/or determine the vehicle lengths. Optionally, the sensor 2410 can include an RFID interrogation device, such as an RFID reader, configured to interrogate one or more RFID tags coupled with the vehicles 2600. The RFID interrogation device can emit electromagnetic waves toward the tags to obtain vehicle identification information stored in the tags. The controller 2404 and/or 2406 can then examine the vehicle identification information to identify the vehicles 2600.

The controller 2404, 2406 can obtain additional sensor data from one or more sensors other than the distance sensor 2408 in order to one or more of validate the size parameter determined by the controller 2404, 2406 or combine with the spatial distances 2606 to determine the size parameter determined by the controller 2404, 2406. Such an additional sensor can include GPS receivers disposed onboard the vehicle system 2500 and that generate the additional sensor data as representative of locations of one or more of the vehicles 2600 in the vehicle system 2500. Based on the speed at which the vehicle system 2500 moves and how long it takes for two different GPS receivers (in known locations along the length of the vehicle system 2500), the length of the vehicles 2600 and/or vehicle system 2500 can be determined and/or compared with the size parameter determined from the spatial distances 2606. For example, GPS receivers can be placed on opposite ends of the vehicles 2600 and/or vehicle system 2500 and, for faster moving vehicle systems 2500, the different receivers will be at the same location within shorter time periods when compared to slower moving vehicle systems 2500. The time differences between when two GPS receivers are at the same location can multiplied by the speed of the vehicle system 2500 to determine the distance, or length, between the GPS receivers as a size parameter. The controller 2404, 2406 can compare this size parameter with a size parameter determined from the spatial distances 2606 to validate or refute one or more of the size parameters.

In another embodiment, one or more inertial sensors can be coupled with the vehicle system 2500 to generate additional sensor data representative of movement of one or more vehicles 2600 of the vehicle system 2500. This data can be used to determine if the vehicle system 2500 is traveling up or down a slope so that the spatial distances 2606 can be corrected, as described herein.

In another embodiment, a speed sensor (e.g., a tachometer) can generate additional sensor data representative of a moving speed of one or more vehicles 2600 of the vehicle system 2500. This additional data can be used to determine the size parameter as described herein.

In one aspect, another distance sensor may be coupled with the vehicles 2600 to generate sensor data representative of the length of the spatial gap between adjacent vehicles 2600 in the vehicle system 2500. This additional data can be used to confirm or refute the lengths of gaps between the vehicles 2600 as determined from the spatial distances 2606.

The controller 2406 can use the spatial distances 2606 to determine lengths of one or more vehicles 2600, and then compare these determined lengths to designated lengths associated with different vehicles 2600 in order to identify the vehicles 2600 in the vehicle system 2500 and/or the location of different vehicles 2600 in the vehicle system 2500. Based on the identities of one or more vehicles 2600 that are determined, the controller 2406 can compare the determined identities with a manifest of the vehicle system 2500. The manifest can be stored in a memory internal and/or otherwise accessible to the controller 2406, and can include identities and locations of various vehicles in the vehicle system 2500. The controller 2406 can examine the manifest to determine if the vehicle identities and vehicle locations determined from the spatial distances 2606 corresponds with the manifest. If there is a discrepancy between the manifest and the vehicle identities or locations determined from the spatial distances 2606, then the controller 2406 can implement one or more remedial actions. For example, the controller 2406 can notify an operator of the vehicle system, can communicate an off-board signal to an off-board location (e.g., a dispatch or scheduling facility) in order to notify the off-board location of the discrepancy, modify a trip plan of the vehicle system 2500 in order to account for the vehicles been in different locations than the locations of the trip plans generated for, etc.

The controller 2406 can examine the spatial distances 2606 to determine whether one or more vehicles 2600 are carrying cargo and/or an amount of the cargo being carried by the one or more vehicles 2600. For example, some vehicles 2600 may include boxcars having open tops through which cargo is loaded and unloaded. The spatial distances 2606 that are measured from above the vehicles 2600 will be smaller as the amount of cargo carried by these vehicles increases relative to less or no cargo being carried by the vehicles 2600. Based on the spatial distances 2606 and/or changes in the spatial distances 2606, the controller 2406 can determine whether a vehicle 2600 is carrying cargo and/or how much cargo was being carried by the vehicle

2600. In one aspect, the controller 2406 can compare the presence and/or absence of cargo carried by a vehicle 2600 to the manifest of the vehicle system 2500 to identify the vehicle 2600, verify or refute that the vehicle 2600 is carrying the cargo as identified in the manifest, etc.

In one embodiment, the controller 2404, 2406 can determine a weather condition around the vehicle system 2500. The weather condition can include a direction of wind, a wind speed, presence of precipitation, a type of precipitation, an amount of precipitation, humidity, a measurement of visibility, or the like. The controller 2404, 2406 can determine the weather condition based on input provided by an operator of the vehicle system 2500 or the aerial vehicle 2402, from one or more sensors 2410 on board the aerial vehicle 2402, or from another source. Based on the weather condition that is determined, the controller 2404, 2406 may modify the spatial distances 2606 measured by the distance sensor 2408 to account for the weather condition. For example, the wind, precipitation, and/or visibility may refract or diffract light and change the measured spatial distances 2606 from actual spatial distances 2606. The controller 2404, 2406 can modify the measured spatial distances 2606 based on the detected weather condition.

As described above, in addition to or as an alternate to the distance sensor 2408, the system 2400 may include an optical sensor for determining size parameters and/or other information about a vehicle system 2500 and/or individual vehicles 2600 in the vehicle system. In one embodiment, the optical sensor may be a camera that generates optic data representative of the vehicle system and/or individual vehicles. This optic data can be one or more images and/or one or more videos of the vehicle system and/or individual vehicles. The controller 2404 and/or the controller 2406 can examine the optic data in order to identify one or more opposing ends of the vehicles in the vehicle system, couplers disposed between adjacent vehicles of the vehicles in the vehicle system reflectors disposed on the vehicle system, or other features in the images and/or videos in order to determine the size parameters. For example, similar to facial recognition software or techniques, the controller 2404, 2406 can apply recognition software or techniques to identify ends of vehicles and 4/or the vehicle system, couplers within the vehicle system, or other features of interest. Based on how far apart these ends, couplers, or other features of interest are located in the video and/or images, the controller 2404, 2406 can determine the size parameters of the vehicle system.

In one aspect, the controller 2404 of the aerial vehicle 2402 may include wireless transmission capability and circuitry. For example, the controller 2404 can include one or more antennas and/or transceiving circuitry for communicating the optic data to one or more locations that are off-board the aerial vehicle 2402 and/or the vehicle system 2500. The optic data may be wirelessly transmitted and/or broadcast to a display screen of a remote control for the aerial vehicle 2402, to a scheduling facility, to a rail yard tower, to another vehicle and/or vehicle system (other than the vehicle and/or vehicle system that is shown in the images and/or video), or other location. In one embodiment, the optic data may be communicated from the aerial vehicle 2402 to these off-board locations while the optic data is being obtained and generated by the aerial vehicle 2402. For example, the optic data may be streamed to another location during the time period that is concurrent with the time period during which the images and/or videos are obtained.

The controller 2404 can communicate the optic data to plural different recipients. The controller 2404 can broadcast the optic data to all vehicles within communication range of the controller 2404, all vehicles within the same vehicle system 2500, or another group of vehicles. The object data may be encrypted and/or addressed to particular vehicles to avoid the optic data being intercepted by one or more unintended recipients. In one aspect, the controller 2404 can communicate different sets of the optic data to different recipients. For example, the controller can communicate optic data representative of individual vehicles in a vehicle system to one or more recipients on board that vehicle system. But, for optic data representative of the entire vehicle system, the controller 2404 may communicate the optic data to that vehicle system and/or one or more other vehicle systems (for example, to warn or notify vehicle systems of their respective locations).

With respect to mining vehicles, a vehicle system may be formed of plural line vehicles that are not mechanically connected with each other, but that travel together as a group. For example, the mining vehicles may travel in a line through the relatively tight confines of an underground mine. The aerial vehicle 2402 can fly above and/or to the side of the mining vehicles in the vehicle system in order to notify the mining vehicles of where the mining vehicles are in the vehicle system, where other mining vehicles are in the vehicle system, and/or other information that may not be visible or readily apparent to the individual mining vehicles.

With respect to rail vehicles, a rail yard may include many rail vehicle systems and rail vehicles being assembled and disassembled. The aerial vehicle 2402 can fly above and/or to the sides of the vehicle systems in a rail yard to obtain size parameters, identify vehicles, identify vehicle systems, or otherwise determine where vehicles and for social or vehicle systems are located in the rail yard. This information can be communicated to an operator or master of the rail yard, or to a computer system, that manages operations in the rail yard in order to assist that person and/or computer system with managing the assembling, disassembling, departure, or the like, of the vehicles and vehicle systems in the rail yard.

The aerial controller 2406 can autonomously fly the aerial vehicle 2402 based on a field of view of the optic data. The field of view defines outer boundaries of the optic data that is generated by the optical sensor. For example, objects that are outside of the field-of-view will not appear within the optic data whereas objects that are inside the field-of-view will appear with the optic data. In one embodiment, the aerial controller 2406 can autonomously control flight of the aerial vehicle 2402 such that the field-of-view of the optical sensor encompasses all of the vehicle system 2500, all of a particular vehicle 2600, and/or a group of vehicles 2600. For example, the aerial controller 2406 can cause the aerial vehicle 2402 to increasingly gain altitude until the entire vehicle system 2500 is within the field-of-view of the optical sensor so that the size parameters of the vehicle system can be determined from the optic data. The aerial controller 2406 can prohibit or prevent or otherwise delay examination of the optical data unless and until the entire object of interest (the entire vehicle system 2500, the entire individual vehicle 2600 been examined, and/or the entirety of the group of vehicles 2600 been examined) is within the field-of-view of the optical data.

The vehicle system 2500 can travel in different types of routes. For example, with respect to rail vehicle systems, the vehicle systems may travel on mainline tracks, citing tracks, tracks within a rail yard, or the like. With respect to automobiles, the vehicles can travel on paved roads, unpaved roads, or the like. The aerial vehicle 2402 can obtain optical data of the route being traveled by a vehicle system in order to determine the type of route being traveled upon. For example, the controller 2404 and/or the controller 2406 can examine optic data that includes at least part of a route with the field-of-view of the optic data to determine what type of route is being traveled upon. The route can be identified by comparing the optic data to one or more baseline features or baseline images representative of different types of routes. Depending on how closely the optic data matches or corresponds to the baseline image or shape of the routes, the type of route being traveled upon may be identified.

In one embodiment, the aerial vehicle 2402 can obtain optic data of areas on or around the vehicle system 2500 in order to identify the presence of human beings on and/or around the vehicle system. The optic data obtained by the optical sensor 2408 can include areas off board but near the vehicle system. The controller 2404 and/or the controller 2406 can examine the optic data for shapes that do not correspond to the vehicle system, but may correspond to human beings on or near the vehicle system. Responsive to identifying the presence of one or more human beings, the controller 2404 and/or the controller 2406 can communicate the signal to an output device. This alert signal can cause the output device to present an audible alarm and/or a visible alarm to warn an operator of the vehicle system and/or the one or more human beings of the proximity of the human beings to the vehicle system 2500. This alert signal can warn the operator and/or others of potential safety issues with the human beings being too close to a potentially moving vehicle system.

As another safety feature, the aerial vehicle 2402 can obtain optic data of areas on around the vehicle system 2500 in order to identify smoke emanating from the vehicle system. The object data obtained by the optical sensor 2408 can include smoke or shapes that appear like smoke, and it may not correspond to shapes of the vehicle system. The control 2404, 2406 can examine the optic data to determine if smoke is potentially located in the optic data and/or where on the vehicle system the smoke appears to be emanating from. Responsive to identifying the smoke, the controller 2404 and/or 2406 can communicate an alert signal. This alert signal can cause an output device to present an audible alarm and/or a visible alarm to warn operator of the vehicle system of the potential smoke, to warn a fire department and automatically request assistance with extinguishing a fire onboard the vehicle system, or the like.

The aerial vehicle 2402 can fly above and/or ahead of the vehicle system in order to obtain information regarding traffic congestion in the transportation network formed by interconnected routes. The aerial vehicle 2402 can obtain optic data above routes in locations other than where a vehicle system is currently located. The controller 2404 and/or 2406 can determine the density and/or number of other vehicles and/or vehicle systems on other routes in the transportation network. The controller 2404 and/or the controller 2406 can analyze this data to determine the severity of traffic in the transportation network. This information may then be communicated to an operator of the vehicle system, to a scheduling facility, or the like, so that the operator and/or scheduling facility can modify control of the vehicle systems to avoid or lessen the traffic congestion and transportation network.

In one embodiment, one or more of the sensors 2408, 2410 of the aerial vehicle 2402 may include an electromagnetic sensor. Electromagnetic sensor may interrogate one or more electromagnetic tags coupled with the vehicle system 2500. For example, the electromagnetic sensor may include an RFID antenna that generates electric magnetic signals or waves. These signals are waves can activate or otherwise cause RFID tags coupled to the vehicle system 2500 to communicate data back to the RFID antenna. The tags may be positioned on or near ends of the vehicles and/or vehicle system so that the controller 2404, 2406 can determine how far apart the ends of the vehicles and/or vehicle system are located from each other. As described above, this information can be used to determine size parameters of the vehicle system. Such an electromagnetic sensor may be included on the aerial vehicle in addition to or in place of the distance sensor, the camera, or one or more other sensors.

The tags may be coupled with the couplers disposed between the vehicles in the vehicle system. The electric magnetic sensor onboard the aerial vehicle 2402 can determine where these couplers are located based on the locations of the tags, and count the number of vehicles in the vehicle system based on the identification of the tags.

In one embodiment, one or more GPS receivers may be used to determine size parameters of the vehicle system and/or the vehicles. The GPS receivers may be coupled to the vehicle system in different locations. The GPS receivers can determine moving speeds of the vehicle system and locations of the GPS receivers at different times while the vehicle system is moving. These speeds and/or GPS receiver locations can be communicated to the controller 2406 or another controller. Based on a moving speed of the vehicle system and the different locations of the GPS receivers, the controller 2406 can determine size parameters of the vehicle system and/or vehicles in the vehicle system. For example, the controller 2406 can determine how far apart two different GPS receivers are from each other based on the speed of the vehicle system and the time difference between the times at which the different GPS receivers were at the same location.

Figure 29:
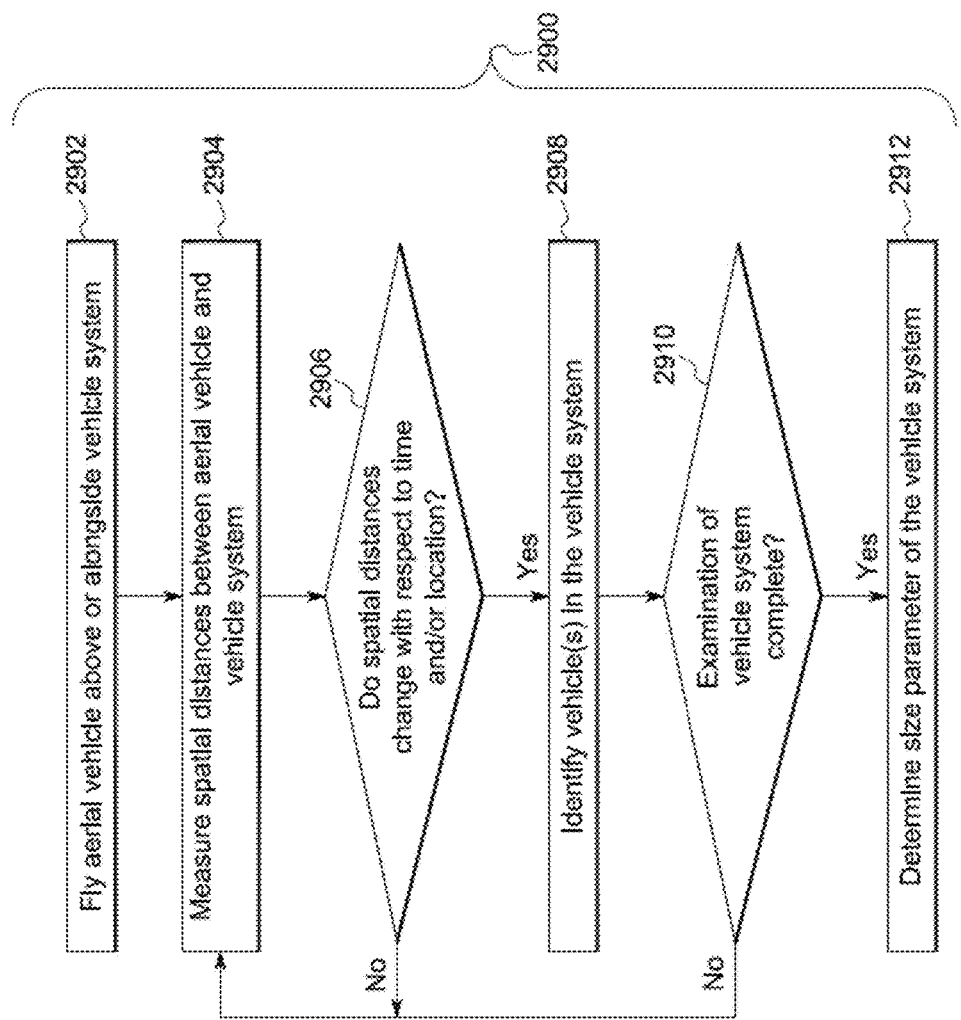
FIG. 29 illustrates a flowchart of one embodiment of a method for determining a size parameter of a vehicle system.

FIG. 29 illustrates a flowchart of one embodiment of a method 2900 for determining a size parameter of a vehicle system. The method 2900 may be performed by one or more embodiments of the systems (e.g., aerial systems) described herein. For example, the method 2900 may represent or be used to create a software application that can operate on or direct the operations of one or more controllers described herein.

At 2902, an aerial vehicle flies above and/or to the side of a vehicle system. The vehicle system may include a single vehicle or multiple vehicles. At 2904, spatial distances between the aerial vehicle and the vehicle system are measured. These distances can be distances between the aerial vehicle (or a distance sensor that measures the distances) and the top sides of the vehicles. Alternatively, these distances can be distances between the aerial vehicle or sensor and the sides of the vehicles. During travel of the aerial vehicle or sensor to the side or above a gap between the vehicles, the distances can be measured from the aerial vehicle or sensor to another surface, such as the ground beneath the vehicles.

At 2906, a determination is made as to whether the spatial distances that are measured change with respect to time and/or distance. For example, the spatial distances are examined to determine if the spatial distances remain constant or if the spatial distances change (e.g., increase or decrease) by at least a threshold amount for at least a threshold time or distance. If the spatial distances change, then the change can indicate a separation or gap between vehicles. As a result, flow of the method 2900 can proceed toward 2908. If the spatial distances do not change (e.g., by at least the threshold amount for at least a threshold time or distance), then the absence of a change can indicate that there is no gap between vehicles. As a result, flow of the method 2900 can return toward 2904 so that additional measurements can be obtained (e.g., in the event that the aerial vehicle has not yet flown over or to the side of a gap between vehicles).

At 2908, one or more vehicles in the vehicle system are identified. The vehicles may be identified based on or responsive to detection of the change in the spatial distances. For example, responsive to determining that the spatial distances change as described above, the controller can determine that the aerial vehicle or distance sensor has traveled over or to the side of a gap between vehicles in the vehicle system. This gap can be used to identify one or more vehicles in the vehicle system.

At 2910, a determination is made as to whether examination of the vehicle system is complete. For example, a determination may be made as to whether the aerial vehicle is to continue flying over or to the side of the vehicle system, or if examination of the vehicle system is complete. The examination may be complete when a designated time limit has been reached, when the aerial vehicle has traveled a designated distance, when a designated number of vehicles have been counted, or the like. Optionally, examination of the vehicle system may be complete responsive to an operator of the aerial vehicle directing the aerial vehicle to complete examination (e.g., by landing or ceasing to measure spatial distances). If examination is complete, then flow of the method 2900 can proceed toward 2912. If examination is still ongoing, flow of the method 2900 can return toward 2904.

At 2912, one or more size parameters of the vehicle system are determined based on the spatial distances and/or changes in the spatial distances. The size parameters can represent a number of vehicles in the vehicle system, weight of the vehicle system, length of the vehicle system, length of one or more vehicles in the vehicle system, or the like, as described herein. The size parameter can be determined by counting the number of vehicles in the vehicle system and/or the distance between ends of the vehicles and/or vehicle system, as described above.

In one embodiment, a system (e.g., an aerial camera system) includes a distance sensor configured to measure spatial distances between the distance sensor and plural vehicles in a vehicle system formed from the vehicles operably coupled with each other during relative movement between the distance sensor and the vehicle system. The system also includes a controller configured to obtain the spatial distances measured by the distance sensor and determine a size parameter of the vehicle system based on the spatial distances that are measured.

In one aspect, the controller is configured to determine one or more of a length between opposite ends of the vehicle system, a type of the vehicle, a number of the vehicles in the vehicle system, a length of one or more of the vehicles in the vehicle system, or a weight of the vehicle system as the size parameter of the vehicle system based on the spatial distances that are measured.

In one aspect, the system also includes an aerial vehicle with the distance sensor operably coupled with the aerial vehicle. The aerial vehicle can be configured to fly one or more of over or along a side of the vehicle system during measurement of the spatial distances by the distance sensor.

In one aspect, the aerial vehicle is configured to fly the one or more of over or along the side of the vehicle system during the measurement of the spatial distances by the distance sensor and during movement of the vehicle system. The controller can be configured to identify a break in a coupler that mechanically couples adjacent vehicles of the vehicles in the vehicle system prior to the break based on the spatial distances that are measured.

In one aspect, the controller is configured to communicate an alert signal to an output device to one or more of notify an operator of the vehicle system of the break or to automatically slow or stop movement of the vehicle system.

In one aspect, the controller is configured to determine a direction of flight of the aerial vehicle relative to the movement of the vehicle system and to identify the break in the coupler based on the spatial distances that are measured and the direction of flight of the aerial vehicle.

In one aspect, the controller is configured to identify a change in a length of a coupler that mechanically couples adjacent vehicles of the vehicles in the vehicle system based on the spatial distances that are measured.

In one aspect, the controller is configured to communicate an alert signal to an output device to one or more of notify an operator of the vehicle system of the change in the length or to a control system of the vehicle system to automatically change movement of the vehicle system based on the change in the length.

In one aspect, the controller is configured to determine a direction of flight of the aerial vehicle relative to the movement of the vehicle system and to identify the change in the length of the coupler based on the spatial distances that are measured and the direction of flight of the aerial vehicle.

In one aspect, the system also includes an aerial controller configured to control movement of the aerial vehicle and a memory configured to store a route database representative of one or more curves or grades in the route being traveled by the vehicle system. The aerial controller can be configured to change one or more of an altitude or a direction of flight of the aerial vehicle based on the one or more curves or grades in the route.

In one aspect, the aerial controller is configured to maintain a separation distance between the aerial vehicle and a top side of the vehicles in the vehicle system based on the one or more curves or grades in the route database.

In one aspect, the top side of the vehicles represents a largest height of the vehicles in the vehicle system.

In one aspect, the top side of the vehicles represents an average of largest heights of the vehicles in the vehicle system.

In one aspect, the aerial vehicle is configured to fly above the vehicle system while the distance sensor measures the spatial distances from above the vehicle system.

In one aspect, the aerial vehicle is configured to fly alongside the vehicle system and not above the vehicle system while the distance sensor measures the spatial distances.

In one aspect, the system also includes a vehicle cradle configured to be operably coupled with the vehicle system. The aerial controller can be configured to automatically control flight of the aerial vehicle back to the vehicle cradle even after movement of the vehicle cradle from an initial geographic location.

In one aspect, the vehicle cradle includes a wireless beacon configured to generate a beacon signal that identifies a location of the vehicle cradle and the aerial controller is configured to detect the beacon signal to automatically control the flight of the aerial vehicle back to the vehicle cradle.

In one aspect, the aerial vehicle is configured to fly over the vehicles in the vehicle system during travel of the vehicles that are not mechanically coupled with each other.

In one aspect, the system also includes a memory configured to store a route database representative of one or more curves or grades in the route being traveled by the vehicle system. The controller can be configured to account for changes in the one or more curves or grades in the route in examining the spatial distances to determine the size parameter of the vehicle system.

In one aspect, the controller is configured to communicate the size parameter of the vehicle system to a vehicle control system that automatically controls movement of the vehicle system based on the size parameter of the vehicle system that is determined.

In one aspect, the controller is configured to communicate the size parameter to the vehicle control system in order for the vehicle control system to determine a braking profile for the vehicle system that ensures that the vehicle system can automatically stop movement of the vehicle system prior to the vehicle system reaching one or more designated locations.

In one aspect, the controller is configured to communicate the size parameter to the vehicle control system in order for the vehicle control system to determine a braking profile for the vehicle system that ensures that the vehicle system can automatically control speed of the vehicle system below a designated speed threshold that is based on the size parameter in order to ensure that the vehicle system can one or more of stop movement prior to the vehicle system reaching one or more designated locations.

In one aspect, the controller is configured to determine the size parameter of the vehicle system based on changes in the spatial distances that are measured over time.

In one aspect, the controller is configured to identify spatial gaps between adjacent vehicles of the vehicles in the vehicle system based on the changes in the spatial distances.

In one aspect, the controller is configured to count a number of the vehicles in the vehicle system based on the number of spatial gaps that are identified.

In one aspect, the controller is configured to identify a first change in the spatial distances as the spatial gap between the adjacent vehicles responsive to the first change in the spatial distances extending over at least a designated, non-zero period of time and to not identify a second change in the spatial distances as the spatial gap responsive to the second change not extending over at least the designated, non-zero period of time.

In one aspect, the distance sensor includes one or more of an electro-magnetic sensor, an ultrasound transducer, a laser sensor, or a lidar sensor.

In one aspect, the system also includes a memory configured to store one or more designated vehicle lengths of the vehicles in the vehicle system and an altitude sensor configured to determine an altitude of the distance sensor above the vehicle system. The controller can be configured to determine the size parameter based on the spatial distances, the one or more designated vehicle lengths, and the altitude of the distance sensor.

In one aspect, the system also includes a vehicle identification sensor configured to examine the vehicles in the vehicle system to identify the vehicles and determine which of the one or more designated vehicle lengths corresponds with the respective vehicles.

In one aspect, the vehicle identification sensor includes a camera and the controller is configured to examine one or more images or videos obtained by the camera to identify the vehicles.

In one aspect, the vehicle identification sensor includes a radio frequency identification (RFID) interrogation device configured to interrogate one or more radio frequency identification (RFID) tags coupled with the vehicles to obtain vehicle identification information and the controller is configured to examine the vehicle identification information to identify the vehicles.

In one aspect, the controller is configured to obtain additional sensor data from one or more second sensors other than the distance sensor in order to one or more of validate the size parameter determined by the controller or combine with the spatial distances to determine the size parameter determined by the controller.

In one aspect, the one or more second sensors include a global positioning system receiver that generates the additional sensor data representative of a location of one or more of the vehicles in the vehicle system.

In one aspect, the one or more second sensors include an inertial sensor that generates the additional sensor data representative of movement of one or more vehicles of the vehicle system.

In one aspect, the one or more second sensors include a speed sensor that generates the additional sensor data representative of a moving speed of one or more vehicles of the vehicle system.

In one aspect, the one or more second sensors generate the additional sensor data representative of a spatial gap between adjacent vehicles of the vehicles in the vehicle system.

In one aspect, the system also includes a memory configured to store a manifest of the vehicle system that is representative of designated identities of one or more of the vehicles in the vehicle system or designated cargo carried by one or more of the vehicles in the vehicle system. The controller can be configured to determine changes in the spatial distances measured by the distance sensor to identify one or more of the vehicles or the cargo and to determine one or more of a discrepancy between the vehicles that are identified and the designated identities in the manifest or a discrepancy between the cargo that is identified and the designated cargo in the manifest.

In one aspect, the controller is configured to determine one or more of whether a first vehicle of the vehicles in the vehicle system is carrying cargo or an amount of the cargo being carried by the first vehicle based on the spatial distances measured by the distance sensor.

In one aspect, the controller is configured to determine a weather condition around the vehicle system and to modify the spatial distances measured by the distance sensor to account for the weather condition.

In one aspect, the controller is configured to modify the spatial distances by increasing or decreasing the spatial distances due to one or more of rain, snow, moisture, or humidity diffracting light detected by the distance sensor to measure the spatial distances.

In one aspect, the controller is configured to modify the spatial distances by increasing or decreasing the spatial distances due to one or more of a wind speed or a direction of wind moving light detected by the distance sensor to measure the spatial distances.

In another embodiment, a system (e.g., a sensor system) includes an optical sensor configured to generate optic data representative of plural vehicles in a vehicle system formed from the vehicles operably coupled with each other and a controller configured to obtain the optic data generated by the optic sensor and determine a size parameter of the vehicle system based on the optic data.

In one aspect, the optic sensor includes one or more of a camera, an electro-magnetic sensor, a laser sensor, a lidar sensor, an infrared sensor, or a night vision sensor.

In one aspect, the optical sensor is a camera and the optic data includes one or more of an image or a video of the vehicle system. The controller can be configured to autonomously identify one or more features of interest in the one or more image or video in order to determine the size parameter.

In one aspect, the controller is configured to examine the one or more image or video of the vehicle system in order to identify one or more opposing ends of the vehicles in the vehicle system, couplers disposed between adjacent vehicles of the vehicles in the vehicle system, or reflectors disposed on the vehicle system as the one or more features of interest.

In one aspect, one or more of the camera or the controller is configured to stream the one or more image or video as the one or more image or video is captured to a location that is off-board the vehicle such that the one or more image or video can be viewed at the location during acquisition of the same or additional image or video by the camera.

In one aspect, the system also includes an aerial vehicle configured to carry the optical sensor above the vehicle system as the optic sensor generates the optic data and an aerial controller of the aerial vehicle configured to control flight of the aerial vehicle above the vehicle system. The optic sensor has a field of view that defines outer boundaries of the optic data that is generated by the optic sensor and the aerial controller is configured to communicate with the optic sensor to determine a time at which the field of view of the optic sensor includes an entirety of the vehicle system and one or more of the optic sensor is configured to delay communication of the optic data until the field of view includes the entirety of the vehicle system or the controller that determines the size parameter of the vehicle system is configured to delay examination of the optic data until the field of view includes the entirety of the vehicle system.

In one aspect, the controller is configured to examine the optic data to identify a type of the route that the vehicle system is disposed upon from among plural different types of routes.

In one aspect, the different types of routes include main line rail tracks, siding tracks, paved roads, non-paved roads, or waterways.

In one aspect, the controller is configured to examine the optic data to identify a presence of one or more human beings located one or more of around or on the vehicle system.

In one aspect, responsive to identifying the presence of the one or more human beings, the controller is configured to communicate an alert signal to an output device to cause the output device to present one or more of an audible alarm or a visible alarm to warn one or more of an operator of the vehicle system or the one or more human beings of a proximity of the one or more human beings to the vehicle system.

In one aspect, the controller is configured to examine the optic data to identify smoke emanating from the vehicle system.

In one aspect, responsive to identifying the smoke, the controller is configured to communicate an alert signal to one or more of cause an output device to present one or more of an audible alarm or a visible alarm to warn an operator of the vehicle system of the smoke or to a fire department location to automatically request assistance with extinguishing a fire onboard the vehicle system.

In one aspect, one or more of the optic sensor or the aerial controller is configured to communicate the optic data to plural different vehicles of one or more of the vehicle system or another vehicle system.

In one aspect, the vehicle system includes the vehicles traveling together and coordinating movements of the vehicles with each other without the vehicles being mechanically coupled with each other during the movements along the route. The aerial vehicle can be configured to fly over the vehicle system and the controller is configured to determine traffic congestion based on the optic data and output a data signal representative of the traffic congestion to one or more of an operator of the vehicle system or a dispatch facility that schedules movement of the vehicle system.

In one embodiment, a system (e.g., a sensor system) includes an electromagnetic sensor configured to interrogate one or more electromagnetic tags coupled with a vehicle system formed from plural vehicles in order to determine a number of the vehicles in the vehicle system and a controller configured to determine a size parameter of the vehicle system based on the number of the vehicles.

In one aspect, the electromagnetic sensor is a radio frequency identification (RFID) sensor and the one or more electromagnetic tags include one or more RFID tags.

In one aspect, the distance sensor is configured to interrogate one or more tags operably coupled with couplers that mechanically couple adjacent vehicles of the vehicles in the vehicle system to identify one or more of gaps between the adjacent vehicles or a number of the vehicles in the vehicle system. The controller can be configured to determine the size parameter of the vehicle system based on the one or more of gaps or the number of the vehicles.

In another embodiment, a system (e.g., a sensor system) includes a global positioning system receiver configured to determine a moving speed of a vehicle system formed from plural vehicles traveling together along a route and plural different locations of the vehicle system at different times and a controller configured to determine a size parameter of the vehicle system based on the moving speed of the vehicle system and the different locations of the vehicle system.

In one aspect, the controller is configured to determine one or more of a length between opposite ends of the vehicle system, a number of the vehicles in the vehicle system, or a weight of the vehicle system as the size parameter of the vehicle system based on the spatial distances that are measured.

In one aspect, the controller is configured to determine the size parameter of the vehicle system also based on a designated size of one or more of the vehicles in the vehicle system.

In one embodiment, a method (e.g., for determining a size parameter of a vehicle system) includes measuring spatial distances between a distance sensor and plural vehicles in a vehicle system formed from the vehicles operably coupled with each other during relative movement between the distance sensor and the vehicle system, the spatial distances measured using the distance sensor, and determining a size parameter of the vehicle system based on the spatial distances that are measured.

In one aspect, determining the size parameter includes determining one or more of a length between opposite ends of the vehicle system, a number of the vehicles in the vehicle system, or a weight of the vehicle system.

In one aspect, the method also includes flying an aerial vehicle with the distance sensor operably coupled with the aerial vehicle one or more of over or along a side of the vehicle system during measurement of the spatial distances by the distance sensor.

In one aspect, flying the aerial vehicle with the distance sensor includes flying the aerial vehicle during measurement of the spatial distances by the distance sensor and during movement of the vehicle system. The method also can include identifying a break in a coupler that mechanically couples adjacent vehicles of the vehicles in the vehicle system prior to the break based on the spatial distances that are measured.

In one aspect, the method also includes communicating an alert signal to an output device to one or more of notify an operator of the vehicle system of the break or to automatically slow or stop movement of the vehicle system.

In one aspect, the method also includes determining a direction of flight of the aerial vehicle relative to the movement of the vehicle system to identify the break in the coupler based on the spatial distances that are measured and the direction of flight of the aerial vehicle.

In one aspect, the method also includes identifying a change in a length of a coupler that mechanically couples adjacent vehicles of the vehicles in the vehicle system based on the spatial distances that are measured.

In one aspect, the method also includes communicating an alert signal to an output device to one or more of notify an operator of the vehicle system of the change in the length or to a control system of the vehicle system to automatically change movement of the vehicle system based on the change in the length.

In one aspect, the method also includes determining a direction of flight of the aerial vehicle relative to the movement of the vehicle system and identifying the change in the length of the coupler based on the spatial distances that are measured and the direction of flight of the aerial vehicle.

In one aspect, the method also includes accessing a route database representative of one or more curves or grades in the route being traveled by the vehicle system and changing one or more of an altitude or a direction of flight of the aerial vehicle based on the one or more curves or grades in the route.

In one aspect, the method also includes maintaining a separation distance between the aerial vehicle and a top side of the vehicles in the vehicle system based on the one or more curves or grades in the route database.

In one aspect, the method also includes flying the aerial vehicle above the vehicle system while the distance sensor measures the spatial distances from above the vehicle system.

In one aspect, the method also includes flying the aerial vehicle alongside the vehicle system and not above the vehicle system while the distance sensor measures the spatial distances.

In one aspect, the method also includes automatically controlling flight of the aerial vehicle back to a vehicle cradle disposed onboard the vehicle system even after movement of the vehicle cradle from an initial geographic location.

In one aspect, the method also includes detecting a beacon signal emanating from the vehicle cradle and automatically controlling the flight of the aerial vehicle back to the vehicle cradle.

In one aspect, the method also includes flying the aerial vehicle over the vehicles in the vehicle system during travel of the vehicles that are not mechanically coupled with each other.

In one aspect, the method also includes accounting for changes in one or more curves or grades in the route in examining the spatial distances to determine the size parameter of the vehicle system.

In one aspect, the method also includes communicating the size parameter of the vehicle system to a vehicle control system that automatically controls movement of the vehicle system based on the size parameter of the vehicle system that is determined.

In one aspect, the method also includes communicating the size parameter to the vehicle control system in order for the vehicle control system to determine a braking profile for the vehicle system that ensures that the vehicle system can automatically stop movement of the vehicle system prior to the vehicle system reaching one or more designated locations.

In one aspect, the method also includes communicating the size parameter to the vehicle control system in order for the vehicle control system to determine a braking profile for the vehicle system that ensures that the vehicle system can automatically control speed of the vehicle system below a designated speed threshold that is based on the size parameter in order to ensure that the vehicle system can one or more of stop movement prior to the vehicle system reaching one or more designated locations.

In one aspect, the size parameter of the vehicle system is determined based on changes in the spatial distances that are measured over time.

In one aspect, further comprising identifying spatial gaps between adjacent vehicles of the vehicles in the vehicle system based on the changes in the spatial distances.

In an aspect, a system includes a distance sensor and a controller. The distance sensor is configured to measure spatial distances between the distance sensor and plural vehicles in a vehicle system when (i) the distance sensor is moving (at a first non-zero velocity) relative to the ground surface (i.e., relative to the earth), (ii) the vehicle system is moving (at a second non-zero velocity) relative to the ground surface, and (iii) the distance sensor and the vehicle system are moving relative to one another (i.e., the first and second velocities are different). The controller is configured to obtain the spatial distances measured by the distance sensor and determine a size parameter of the vehicle system based on the spatial distances that are measured. In this manner, the controller is configured to determine the size parameter even though neither of the distance sensor nor the vehicle system are stopped and/or are positioned at a fixed/non-moving location.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other.

In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a distance sensor configured to be onboard an aerial vehicle flying along one or more lateral sides and flying above a vehicle system formed from two or more vehicles that are one or more of mechanically coupled with each other or communicatively coupled with each other, the distance sensor configured to measure spatial distances between the aerial vehicle and the vehicles in the vehicle system while the aerial vehicle flies along the one or more lateral sides and flies above the vehicle system; and
   a controller configured to obtain the spatial distances measured by the distance sensor and determine a separation distance between at least two of the vehicles in the vehicle system based on the spatial distances that are measured from onboard the aerial vehicle.

2. The system of claim 1, wherein the controller also is configured to determine one or more of a length of the vehicle system, a number of the vehicles in the vehicle system, a length of one or more of the vehicles in the vehicle system, or a weight of the vehicle system based on the spatial distances that are measured.

3. The system of claim 1, wherein the controller is configured to one or more of automatically change or direct manual change of movement of the vehicle system based on the spatial distances that are measured.

4. The system of claim 1, wherein the controller is configured to predict an upcoming break in a coupler that mechanically couples adjacent vehicles of the vehicles in the vehicle system prior to the break based on the spatial distances that are measured.

5. The system of claim 1, further comprising an aerial controller configured to control movement of the aerial vehicle and a memory configured to store a route database representative of one or more curves or grades in a route being traveled by the vehicle system, and wherein the aerial controller is configured to change one or more of an altitude or a direction of flight of the aerial vehicle based on the one or more curves or grades in the route.

6. The system of claim 1, wherein the controller is configured to determine a number of the plural vehicles in the vehicle system based at least in part on relative movement between the distance sensor and the vehicles and based at least in part on increases and decreases in the one-or more spatial distances measured by the distance sensor.

7. A method comprising:
   flying an aerial vehicle along one or more lateral sides and flying above one or more vehicles of plural vehicles traveling together in a vehicle system;
   measuring spatial distances between a distance sensor onboard the aerial vehicle and the one or more vehicles of plural vehicles traveling together in the vehicle system using the distance sensor while the aerial vehicle flies along the one or more lateral sides and flies above the one or more vehicles in the vehicle system, wherein the vehicles in the vehicle system are one or more of mechanically or communicatively coupled with each other; and
   determining a separation distance between two or more of the vehicles in the vehicle system based on the spatial distances that are measured from onboard the aerial vehicle.

8. The method of claim 7, further comprising determining one or more of a length between opposite ends of the vehicle system, a number of the vehicles in the vehicle system, or a weight of the vehicle system based on the spatial distances that are measured.

9. The method of claim 7, wherein the spatial distances are measured by the distance sensor during flight of the aerial vehicle alongside the vehicle system and during movement of the vehicle system along one or more routes.

10. The method of claim 9, further comprising determining a number of the vehicles in the vehicle system based on the spatial distances that are measured.

11. The method of claim 7, further comprising:
    identifying a change in a length of a coupler that mechanically couples adjacent vehicles of the vehicles in the vehicle system based on the spatial distances that are measured.

12. The method of claim 7, further comprising communicating an alert signal to one or more of automatically change or direct manual change of movement of the vehicle system based on the distance that is measured.

13. The method of claim 7, wherein the spatial distances that are measured between the distance sensor and the one or more vehicles are the separation distance between the two or more vehicles are measured along different directions.

14. The system of claim 1, wherein the distance sensor is configured to measure the spatial distances and the controller is configured to determine the separation distance along different directions.

15. A system comprising:
a controller configured to automatically control movement of one or more vehicles that are one or more of mechanically coupled with each other or communicatively coupled with each other in a vehicle system traveling along one or more routes, the controller configured to receive distances to the vehicle system from an aerial vehicle flying separate from the vehicle system along one or more lateral sides and above one or more vehicles as measured by a sensor onboard the aerial vehicle while the aerial vehicle flies along the one or more lateral sides and flies above the vehicle system, wherein the controller is configured to automatically change the movement of the vehicle system based on the distances measured by the sensor onboard the aerial vehicle.

16. The system of claim 15, wherein the controller is configured to monitor changes in the distances to the vehicle system measured by the sensor onboard the aerial vehicle while the aerial vehicle is moving along the one or more lateral sides and above the vehicle system and at a speed that is faster or slower than the vehicle system.

17. The system of claim 16, wherein the controller is configured to determine a number of the vehicles in the vehicle system between opposite outer ends of the vehicle system based on the changes in the distances that are monitored.

18. The system of claim 17, wherein the controller is configured to count another vehicle in the number of the vehicles in the vehicle system responsive to the distances measured by the sensor decreasing and subsequently increasing before decreasing again.

19. The system of claim 16, wherein the controller is configured to determine a weight of the vehicle system based on the changes in the distances that are monitored.

20. The system of claim 16, wherein the controller is configured to determine a total length of the vehicle system based on the changes in the distances that are monitored.

21. The system of claim 15, wherein the controller is configured to monitor changes in the distances to the vehicle system measured by the sensor onboard the aerial vehicle while the aerial vehicle is moving along the one or more lateral sides and above the vehicle system and at a speed that is faster or slower than the vehicle system, the controller also configured to determine a number of the vehicles in the vehicle system between opposite outer ends of the vehicle system based on the changes in the distances that are monitored.

* * * * *